(12) United States Patent
Gopalan

(10) Patent No.: US 11,016,798 B2
(45) Date of Patent: May 25, 2021

(54) MULTI-HYPERVISOR VIRTUAL MACHINES THAT RUN ON MULTIPLE CO-LOCATED HYPERVISORS

(71) Applicant: The Research Foundation for the State University of new York, Binghamton, NY (US)

(72) Inventor: Kartik Gopalan, Vestal, NY (US)

(73) Assignee: The Research Foundation for The State University, Binghanton, NY (US)

(*) Notice: Subject to any disclaimer, the term of this patent is extended or adjusted under 35 U.S.C. 154(b) by 175 days.

(21) Appl. No.: 16/428,523

(22) Filed: May 31, 2019

(65) Prior Publication Data

US 2019/0370049 A1 Dec. 5, 2019

Related U.S. Application Data

(60) Provisional application No. 62/679,419, filed on Jun. 1, 2018.

(51) Int. Cl.
*G06F 9/455* (2018.01)
(52) U.S. Cl.
CPC ............. *G06F 9/45558* (2013.01); *G06F 2009/45562* (2013.01); *G06F 2009/45566* (2013.01); *G06F 2009/45579* (2013.01); *G06F 2009/45583* (2013.01)
(58) Field of Classification Search
CPC ................................................. G06F 9/45558
USPC ......................................................... 718/1
See application file for complete search history.

(56) References Cited

U.S. PATENT DOCUMENTS

| 10,275,269 | B1* | 4/2019 | Pratt | G06F 9/45558 |
|---|---|---|---|---|
| 2011/0153909 | A1* | 6/2011 | Dong | G06F 9/45558 711/6 |
| 2014/0053272 | A1* | 2/2014 | Lukacs | G06F 21/53 726/24 |
| 2014/0101657 | A1* | 4/2014 | Bacher | G06F 9/45533 718/1 |
| 2014/0310704 | A1* | 10/2014 | Cantu | G06F 9/45558 718/1 |
| 2016/0085568 | A1* | 3/2016 | Dupre | G06F 9/4812 718/1 |
| 2016/0147556 | A1* | 5/2016 | Hu | G06F 9/45558 718/1 |
| 2016/0277304 | A1* | 9/2016 | Challa | G06F 9/5077 |
| 2016/0277308 | A1* | 9/2016 | Challa | H04L 67/42 |
| 2018/0260251 | A1* | 9/2018 | Beveridge | G06F 9/45558 |

* cited by examiner

*Primary Examiner* — Mehran Kamran
(74) *Attorney, Agent, or Firm* — Hoffberg & Associates; Steven M. Hoffberg

(57) ABSTRACT

A multi-hypervisor system, comprising: a plurality of hypervisors comprising a first hypervisor and a second hypervisor, at least one of the plurality of hypervisors being a transient hypervisor; and at least one Span VM, concurrently executing on each of the plurality of hypervisors, the at least one transient hypervisor being adapted to be dynamically at least one of injected and removed under the at least one Span VM concurrently with execution of the at least one Span VM on another hypervisor, wherein the at least one Span VM has a single and consistent at least one of memory space, virtual CPU state, and set of input/output resources, shared by the plurality of hypervisors.

20 Claims, 26 Drawing Sheets

```
nested@spanvm-l1a$ sudo tcpdump -q -i br0 -n src 10.128.24.1
tcpdump: verbose output suppressed, use -v or -vv for full protocol decode
listening on br0, link-type EN10MB (Ethernet), capture size 96 bytes
17:29:31.716554 ARP, Request who-has 10.128.0.1 tell 10.128.24.1, length 28
17:29:43.824093 IP 10.128.24.1.22 > 10.128.0.9.48050: tcp 0
17:29:43.829140 IP 10.128.24.1.22 > 10.128.0.9.48050: tcp 0
17:29:43.846370 IP 10.128.24.1.22 > 10.128.0.9.48050: tcp 32
17:29:43.848073 IP 10.128.24.1.22 > 10.128.0.9.48050: tcp 0
17:29:43.849475 IP 10.128.24.1.22 > 10.128.0.9.48050: tcp 952
17:29:43.867730 IP 10.128.24.1.22 > 10.128.0.9.48050: tcp 280
17:29:44.013728 IP 10.128.24.1.22 > 10.128.0.9.48050: tcp 0
17:29:44.014700 IP 10.128.24.1.22 > 10.128.0.9.48050: tcp 0
17:29:44.015604 IP 10.128.24.1.22 > 10.128.0.9.48050: tcp 56
```

L1a: Network Monitoring

```
nested@spanvm-l1b$
nested@spanvm-l1b$ python vol.py -f /mnt/l2dump --profile=Linuxubu
ntu1204x64 plugin_name linux_psaux | tac | grep evil
Volatility Foundation Volatility Framework 2.4
883      1000    1000    ./evil
nested@spanvm-l1b$
nested@spanvm-l1b$
nested@spanvm-l1b$
nested@spanvm-l1b$
nested@spanvm-l1b$
nested@spanvm-l1b$
nested@spanvm-l1b$
```

L1b: Volatility

```
l2g@l2g:~$ cat evil.c
main(void)
{
    while(1)
        sleep(1000); 
}
l2g@l2g:~$ ./evil &
[1] 883
l2g@l2g:~$ ps -e | grep evil
l2g@l2g:~$
```

Guest infected with KBeast

Fig. 2

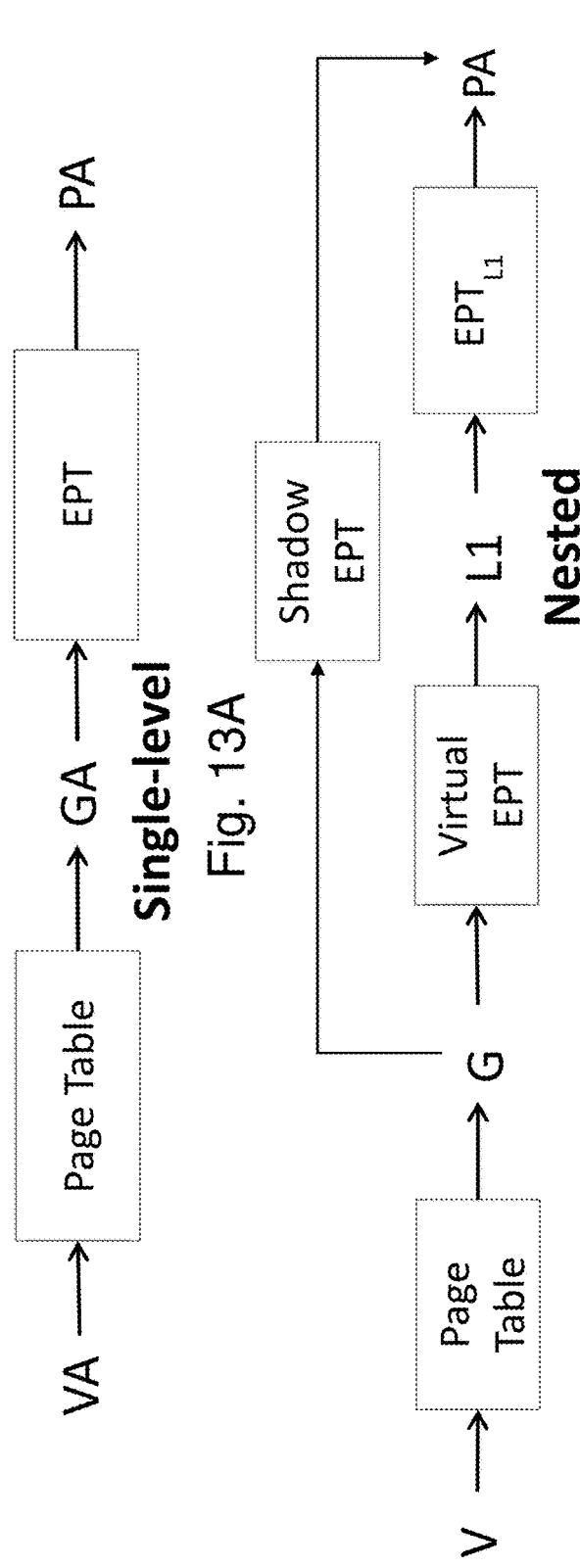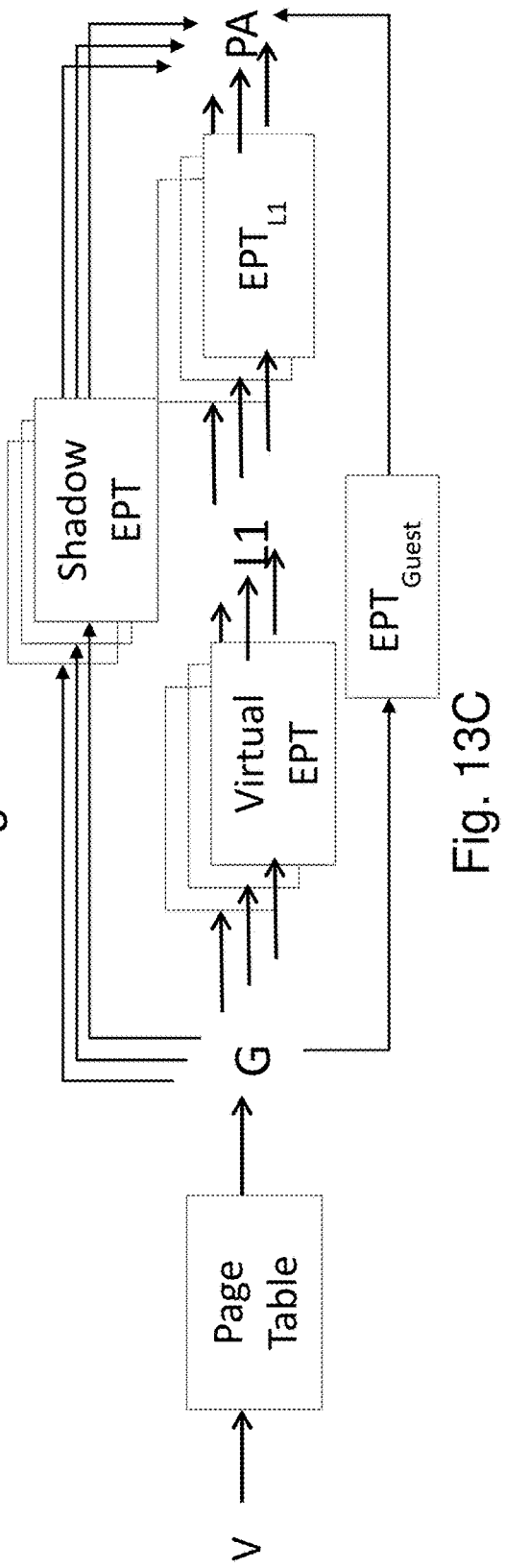
Fig. 13A Single-level
Fig. 13B Nested
Fig. 13C

MULTI-HYPERVISOR VIRTUAL MACHINES THAT RUN ON MULTIPLE CO-LOCATED HYPERVISORS

CROSS REFERENCE TO RELATED APPLICATIONS

The present application is a non-provisional of, and claims benefit of priority under 35 U.S.C. § 119 from, U.S. Provisional Patent Application No. 62/679,419, filed Jun. 1, 2018, the entirety of which is expressly incorporated herein by reference.

STATEMENT OF GOVERNMENT RIGHTS

This invention was made with government support under Contract Nos. 1527338 and 1320689 awarded by National Science Foundation. The government has certain rights in the invention.

FIELD OF THE INVENTION

The present invention relates to the field of hypervisors, and more particularly to hypervisor technology which enables multiple hypervisors to co-exist and augment the services of a single base hypervisor.

BACKGROUND OF THE INVENTION

Public cloud software marketplaces, such as the Amazon Web Services marketplace, already offer users a wealth of choice in operating systems, database systems, financial software, virtual network routers etc., all deployable and configurable at the click of a button. Unfortunately, this level of competition and innovation has not extended to emerging hypervisor-level services, such as guest monitoring, rootkit detection, high availability, or live guest patching, partly because cloud providers can only manage their infrastructure with trusted hypervisors. Adding a growing list of features to a single hypervisor is undesirable from the viewpoint of development, maintenance, and security.

Nested VMs were originally proposed by Goldberg and Popek [30, 31, 58] and refined by Belpaire and Hsu [7, 8]. IBM z/VM [54] was the first implementation of nested VMs using multiple levels of hardware support for nested virtualization. Ford et al. [27] implemented nested VMs in a microkernel environment. Graf and Roedel [32] and Ben-Yehuda et al. [9] implemented nested VM support in the KVM [40] hypervisor on AMD-V [2] and Intel VT-x [77] platforms respectively. Unlike IBM z/VM, these rely on only a single level of hardware virtualization support. Cloudvisor [90] uses nested virtualization to extract a small security kernel from a hypervisor. The security kernel runs at L0, the highest privilege level, while other management operations are de-privileged and executed in a single L1 hypervisor.

Prior platforms restrict a VM to execute on a single hypervisor at a time. The prior approaches do not allow a single VM to execute simultaneously on multiple hypervisors on the same physical machine. Although one can technically live migrate [16, 34] a nested VM from one L1 hypervisor to another L1, or between L1 and L0, the "one-hypervisor-at-a-time" restriction still applies.

A related line of research is to dis-aggregate the large administrative domain [50, 17, 13, 73] typically associated with a hypervisor, such as Domain 0 in Xen. The goal of these efforts is to replace a single large administrative domain with several small sub-domains (akin to privileged service-VMs) that are more resilient to attacks and failures due to better isolation from others. Another approach adopted in μDenali [86] is to provide an extensible and programmable hypervisor that allows programmers to extend the virtual hardware exported to VMs through event interposition, easing the task of providing new hypervisor-level services. In contrast to these systems, we propose to use nested virtualization to run Span VMs on multiple distinct hypervisors, each of which could offer specialized services. See, U.S. Pat. No. 9,798,567, expressly incorporated herein by reference.

Distributed operating systems, such as Amoeba [68, 3] and Sprite [39], aggregate the resources of multiple networked machines into a single pool. vNUMA [14], vSMP [83], and VFe [78] allow a VM to transparently run on multiple physical machines, each having its own hypervisor which coordinate using a distributed shared memory (DSM) protocol. In contrast to such systems that aggregate/coordinate resources across multiple nodes, our goal is to run Span VMs transparently on multiple co-located hypervisors.

Modern commodity hypervisors are no longer used solely for multiplexing physical hardware. They now have two, sometimes conflicting, roles: managing physical hardware and providing hypervisor-level services to VMs. The former requires hypervisors that are secure and verified whereas the latter demands continual integration of new features. Traditionally, large deployments of VMs are difficult to manage. Comprehensive strategies for management tasks such as patching, monitoring, and security require agents to be installed in every VM, often with privileged access to the guest kernel. Cloud platform providers have begun to perform such management tasks at the hypervisor-level, often eliminating the need to install guest agents.

Cloud providers have an opportunity to differentiate their service by offering rich hypervisor-level services such as rootkit detection [75], live patching [15], intrusion detection [25], high availability services [18], and a plethora of VM introspection-enabled applications [28, 65, 24, 55, 42, 74]. It is difficult, however, for a cloud provider to develop and maintain a single trusted hypervisor that exposes all the features that cloud users want. Hypervisors were originally conceived in the spirit of micro-kernels [45, 12, 33] to be lean and small. The smaller the hypervisor footprint, the less needs to be trusted.

McAfee Deep Defender uses a micro-hypervisor called DeepSafe to improve guest security. SecVisor [56] provides code integrity for commodity guests. CloudVisor guarantees guest privacy and integrity on untrusted clouds.

RTS provides a Real-time Embedded Hypervisor for real-time guests. These specialized hypervisors may not provide guests with the full slate of memory, virtual CPU (VCPU), and I/O management, but rely upon either another commodity hypervisor, or the guest itself, to fill in the missing services.

For a guest which needs multiple hypervisor-level services, the first option is for the single controlling hypervisor to bundle all services in its supervisor mode. Unfortunately, this approach leads to a "fat" feature-filled hypervisor that may no longer be trustworthy because it runs too many untrusted services. One could de-privilege some services to the hypervisor's user space as extensions that control the guest indirectly via event interposition and system calls. However, public cloud providers would be reluctant to execute untrusted third-party services in the hypervisor's native user space due to a potentially large user-kernel interface.

The next option is to de-privilege the services further in a Service VM that has a narrower interface with the hypervisor than do user space extensions, but can run a full-fledged OS for handling services. For instance, Xen (www.xen.org) uses either a single Domain0 VM running Linux that bundles services for all guests, or several disaggregated service domains for resilience. Service domains, while currently trusted by Xen, could be adapted to run third-party untrusted services. However, neither userspace extensions nor Service VMs allow control over low-level guest resources, such as guest page mappings or VCPU scheduling, which require hypervisor-level privileges.

One could use nested virtualization to vertically stack hypervisor-level services, such that a trusted base hypervisor at layer-0 (L0) controls the physical hardware and runs a service hypervisor at layer-1 (L1), which fully or partially controls the guest at layer-2 (L2). Nested virtualization is experiencing considerable interest. For example, one can use nesting [16] to run McAfee Deep Defender, which does not provide full system and I/O virtualization, as a guest on XenDesktop, a full commodity hypervisor, so that guests can use the services of both. Similarly, Bromium (www.bromium.com) uses nesting on a Xen-based micro-hypervisor for security. Ravello (www.ravellosystems.com), CloudBridge (www.cloudbridge.com), and XenBlanket uses nesting on public clouds for cross-cloud portability. However, current virtualization hardware does not allow for efficient vertical stacking of more than two hypervisors. Vertical stacking also reduces the degree of guest control and visibility to lower layers compared to the layer directly controlling the guest.

See (each of which is expressly incorporated herein by reference in its entirety): U.S. Pat. Nos. 4,694,396; 4,754,395; 4,835,685; 4,914,583; 5,014,192; 5,047,925; 5,060,150; 5,062,060; 5,109,486; 5,165,018; 5,226,172; 5,335,323; 5,502,839; 6,324,685; 6,496,871; 6,854,108; 6,976,248; 6,976,255; 7,155,606; 7,165,104; 7,212,961; 7,379,990; 7,415,703; 7,444,632; 7,467,381; 7,478,390; 7,496,917; 7,516,456; 7,523,157; 7,549,145; 7,650,599; 7,653,794; 7,653,908; 7,681,134; 7,685,566; 7,694,306; 7,725,894; 7,748,006; 7,802,249; 7,818,202; 7,861,244; 7,918,732; 7,921,151; 7,934,222; 7,984,203; 7,996,510; 8,082,228; 8,091,097; 8,108,855; 8,135,898; 8,139,590; 8,146,098; 8,150,801; 8,175,099; 8,190,881; 8,219,981; 8,233,621; 8,234,640; 8,234,641; 8,301,863; 8,311,225; 8,312,453; 8,327,350; 8,327,357; 8,346,933; 8,359,488; 8,392,916; 8,407,688; 8,417,938; 8,418,173; 8,429,269; 8,458,695; 8,463,730; 8,478,917; 8,490,090; 8,495,628; 8,499,112; 8,499,191; 8,514,854; 8,532,572; 8,539,057; 8,549,127; 8,549,521; 8,555,279; 8,578,377; 8,606,753; 8,607,067; 8,612,971; 8,631,408; 8,639,783; 8,639,789; 8,645,733; 8,667,268; 8,677,351; 8,677,449; 8,683,560; 8,687,653; 8,688,823; 8,689,292; 8,713,281; 8,713,545; 8,719,369; 8,737,262; 8,745,091; 8,752,045; 8,763,005; 8,776,050; 8,792,366; 8,799,645; 8,806,025; 8,806,186; 8,819,677; 8,832,688; 8,832,691; 8,839,246; 8,850,433; 8,856,339; 8,856,779; 8,863,113; 8,863,129; 8,893,125; 8,904,113; 8,918,512; 8,924,917; 8,935,696; 8,942,672; 8,948,184; 8,949,825; 8,949,826; 8,949,830; 8,954,562; 8,958,293; 8,958,746; 8,959,220; 8,966,020; 8,972,538; 8,984,109; 8,984,115; 8,984,330; 8,990,520; 9,003,363; 9,015,703; 9,015,709; 9,038,062; 9,047,021; 9,049,193; 9,063,772; 9,075,642; 9,081,613; 9,081,732; 9,086,917; 9,086,918; 9,088,605; 9,094,334; 9,116,874; 9,128,704; 9,128,873; 9,130,901; 9,134,988; 9,141,565; 9,141,786; 9,152,334; 9,152,450; 9,160,659; 9,170,833; 9,176,767; 9,178,908; 9,184,981; 9,189,294; 9,189,621; 9,195,496; 9,201,704; 9,203,750; 9,203,784; 9,207,872; 9,213,513; 9,218,176; 9,218,193; 9,218,194; 9,219,755; 9,223,634; 9,225,737; 9,225,772; 9,229,645; 9,229,750; 9,231,864; 9,253,016; 9,253,017; 9,256,742; 9,268,586; 9,286,105; 9,304,804; 9,313,048; 9,342,343; 9,378,133; 9,489,272; 9,501,137; 9,503,482; 9,542,216; 9,552,215; 9,589,132; 9,606,818; 9,632,813; 9,658,876; 9,727,292; 9,733,976; 9,740,519; 9,747,123; 9,769,211; 9,769,212; 9,774,602; 9,798,567; 9,798,570; 9,804,789; 9,851,995; 9,898,316; 9,898,430; 9,910,972; 9,928,010; 9,928,112; 9,942,058; 9,965,317; 9,967,288; 20040044875; 20040215749; 20050044301; 20050080982; 20050120160; 20050166183; 20060030985; 20060230219; 20060252543; 20060282247; 20070099683; 20070140266; 20070283350; 20070300220; 20070300221; 20080072224; 20080091761; 20080163171; 20080163194; 20080235769; 20080244577; 20080309665; 20090077632; 20090089300; 20090089410; 20090094316; 20090100500; 20090144222; 20090144241; 20090144242; 20090144243; 20090144265; 20090144317; 20090144318; 20090210352; 20090210358; 20090210503; 20090249222; 20090259345; 20090259875; 20090328170; 20100002875; 20100005465; 20100017530; 20100088699; 20100114833; 20100125708; 20100162236; 20100169505; 20100169514; 20100169882; 20100198742; 20100274947; 20100332428; 20110010185; 20110010695; 20110038482; 20110047544; 20110066753; 20110072428; 20110103399; 20110107008; 20110119473; 20110138072; 20110142060; 20110143663; 20110153909; 20110161716; 20110265085; 20110296411; 20120030671; 20120066681; 20120072396; 20120106365; 20120110086; 20120110154; 20120110155; 20120110164; 20120110588; 20120117565; 20120131571; 20120131574; 20120140639; 20120159232; 20120180039; 20120191948; 20120198440; 20120215921; 20120216187; 20120216254; 20120221849; 20120229428; 20120233282; 20120233331; 20120233611; 20120260247; 20120265920; 20120272241; 20120290865; 20120331134; 20130036323; 20130036417; 20130054950; 20130080641; 20130080643; 20130081047; 20130111037; 20130111478; 20130117744; 20130132951; 20130132952; 20130139153; 20130139159; 20130145362; 20130145363; 20130205044; 20130232483; 20130232486; 20130238802; 20130247038; 20130263113; 20130263118; 20130268588; 20130268643; 20130268799; 20130283364; 20130295847; 20130297769; 20130297800; 20130304704; 20130304980; 20130326335; 20130326505; 20130332363; 20130346531; 20130346971; 20140019963; 20140019968; 20140025670; 20140032382; 20140053272; 20140068703; 20140088991; 20140101398; 20140114792; 20140115137; 20140115586; 20140122659; 20140136985; 20140149768; 20140156960; 20140196130; 20140201740; 20140208045; 20140229943; 20140233568; 20140241355; 20140245069; 20140245294; 20140245423; 20140258483; 20140278453; 20140279784; 20140279937; 20140282539; 20140310704; 20140317681; 20140351545; 20140359047; 20140359267; 20140359283; 20140359613; 20140366155; 20140379775; 20140380009; 20150020065; 20150020067; 20150026684; 20150029853; 20150032756; 20150033002; 20150052253; 20150052258; 20150058841; 20150088982; 20150089292; 20150106802; 20150106803; 20150106952; 20150113552; 20150120887; 20150120936; 20150121366; 20150134707; 20150172136; 20150178330; 20150188833; 20150212956; 20150213195; 20150220355; 20150220407; 20150227192; 20150242228; 20150244568; 20150248306; 20150286490; 20150341318; 20150356641; 20150356691; 20150363180; 20150363181; 20150370596; 20160021019; 20160132443; 20160147556; 20160188359; 20160224786; 20160246636; 20160246639; 20160253198; 20160308690; 20160352682; 20160371110; 20160378348; 20170017907; 20170024241; 20170024260; 20170026470; 20170063614; 20170069004;

20170090963; 20170104755; 20170109189; 20170134426; 20170134432; 20170134433; 20170147409; 20170168865; 20170170990; 20170192815; 20170199755; 20170317914; 20170329622; 20170339070; 20170371699; 20180019948; 20180034821; 20180060107; 20180095771; 20180095776; 20180121822; 20180123830; 20180139148; 20180146020; WO2007027739;

The following references are each expressly incorporated herein by reference in their entirety:

[1] Amazon Web Services. aws.amazon.com/marketplace.

[2] AMD Virtualization (AMD-V). www.amd.com/us/solutions/servers/virtualization.

[3] Andrew S. Tanenbaum, M. Frans Kaashoek, Robbert van Renesse and Henri E. Bal. The Amoeba Distributed Operating System-A Status Report. In Computer Communications, volume 14, pages 324-335, 1991.

[4] Andrea Arcangeli, Izik Eidus, and Chris Wright. Increasing memory density by using ksm. In Proceedings of the linux symposium, pages 19-28, 2009.

[5] Paul Barham, Boris Dragovic, Keir Fraser, Steven Hand, Tim Harris, Alex Ho, Rolf Neugebauer, Ian Pratt, and Andrew Warfield. Xen and the art of virtualization. In Proc. of SOSP, Bolton Landing, N.Y., USA, pages 164-177, 2003.

[6] M. Beham, M. Vlad, and H. P. Reiser. Intrusion detection and honeypots in nested virtualization environments. In Proc. of Dependable Systems and Networks (DSN), June 2013.

[7] Gerald Belpaire and Nai-Ting Hsu. Formal properties of recursive virtual machine architectures. In Proc. of SOSP, Austin, Tex., USA, pages 89-96, 1975.

[8] Gerald Belpaire and Nai-Ting Hsu. Hardware architecture for recursive virtual machines. In Annual ACM Conference, pages 14-18, 1975.

[9] Muli Ben-Yehuda, Michael D. Day, Zvi Dubitzky, Michael Factor, Nadav Har'El, Abel Gordon, Anthony Liguori, Orit Wasserman, and Ben-Ami Yassour. The Turtles project: Design and implementation of nested virtualization. In Proc. of Operating Systems Design and Implementation, 2010.

[10] Muli Ben-Yehuda, Jon Mason, Jimi Xenidis, Orran Krieger, Leendert van Doorn, Jun Nakajima, Asit Mallick, and Elsie Wahlig. Utilizing IOMMUs for virtualization in Linux and Xen. In Ottawa Linux Symposium, July 2006.

[11] Muli Ben-Yehuda, Jimi Xenidis, Michal Ostrowski, Karl Rister, Alexis Bruemmer, and Leendert van Doorn. The price of safety: Evaluating IOMMU performance. In Ottawa Linux Symposium, July 2007.

[12] Brian N Bershad, Craig Chambers, Susan Eggers, Chris Maeda, Dylan McNamee, Przemysl-aw Pardyak, Stefan Savage, and Emin Gu¨n Sirer. Spin: An extensible microkernel for applicationspecific operating system services. ACM SIGOPS Operating Systems Review, 29(1):74-77, 1995.

[13] Shakeel Butt, H. Andr'es Lagar-Cavilla, Abhinav Srivastava, and Vinod Ganapathy. Selfservice cloud computing. In Proceedings of the 2012 ACM Conference on Computer and Communications Security, CCS'12, pages 253-264, 2012.

[14] Matthew Chapman and Gernot Heiser. vNUMA: A virtual shared-memory multiprocessor. In Proc. of USENIX Annual Technical Conference, 2009.

[15] H. Chen, R. Chen, F. Zhang, B. Zang, and P. C. Yew. Live updating operating systems using virtualization. In Proc. of ACM VEE, Ottawa, Canada, June 2006.

[16] C. Clark, K. Fraser, S. Hand, J. G. Hansen, E. Jul, C. Limpach, I. Pratt, and A. Warfield. Live migration of virtual machines. In Proc. of Network System Design and Implementation, 2005.

[17] Patrick Colp, Mihir Nanavati, Jun Zhu, William Aiello, George Coker, Tim Deegan, Peter Loscocco, and Andrew Warfield. Breaking up is hard to do: Security and functionality in a commodity hypervisor. In Proc. of SOSP, pages 189-202, 2011.

[18] Brendan Cully, Geoffrey Lefebvre, Dutch Meyer, Mike Feeley, Norm Hutchinson, and Andrew Warfield. Remus: High availability via asynchronous virtual machine replication. In Proc. of Networked Systems Design and Implementation, 2008.

[19] U. Deshpande, B. Wang, S. Hague, M. Hines, and K. Gopalan. MemX: Virtualization of cluster-wide memory. In Proc. of International Conference on Parallel Processing, September 2010.

[20] Umesh Deshpande, Unmesh Kulkarni, and Kartik Gopalan. Inter-rack live migration of multiple virtual machines. In Proc. of the 6th International Workshop on Virtualization Technologies in Distributed Computing (VTDC), June 2012.

[21] Umesh Deshpande, Brandon Schlinker, Eitan Adler, and Kartik Gopalan. Gang migration of virtual machines using cluster-wide deduplication. In Proceedings of the 13th International Symposium on Cluster, Cloud and Grid Computing (CCGrid), Delft, The Netherlands, May 2013.

[22] Umesh Deshpande, Xiaoshuang Wang, and Kartik Gopalan. Live gang migration of virtual machines. In Proceedings of the 20th international symposium on High performance distributed computing, pages 135-146. ACM, 2011.

[23] Umesh Deshpande, Yang You, Danny Chan, Nilton Bila, and Kartik Gopalan. Fast server deprovisioning through scatter-gather live migration of virtual machines. In Proceedings of the 7th IEEE International Conference on Cloud Computing (IEEE Cloud), June 2014.

[24] Artem Dinaburg, Paul Royal, Monirul Sharif, and Wenke Lee. Ether: malware analysis via hardware virtualization extensions. In 15th ACM conference on Computer and communications security (CCS), pages 51-62, 2008.

[25] George W. Dunlap, Samuel T. King, Sukru Cinar, Murtaza A. Basrai, and Peter M. Chen. ReVirt: Enabling intrusion analysis through virtual-machine logging and replay. In Proc. of USENIX OSDI, Boston, Mass., December 2002.

[26] Michael Ferdman, Almutaz Adileh, Onur Kocberber, Stavros Volos, Mohammad Alisafaee, Djordje Jevdjic, Cansu Kaynak, Adrian Daniel Popescu, Anastasia Ailamaki, and Babak Falsafi. Clearing the clouds: a study of emerging scale-out workloads on modern hardware. In Proc. of ASPLOS, 2012.

[27] Bryan Ford, Mike Hibler, Jay Lepreau, Patrick Tullmann, Godmar Back, and Stephen Clawson. Microkernels meet recursive virtual machines. In Proc. OSDI, Seattle, Wash., USA, pages 137-151, 1996.

[28] Tal Garfinkel and Mendel Rosenblum. A virtual machine introspection based architecture for intrusion detection. In Network & Distributed Systems Security Symposium, 2003.

[29] Carl Gebhardt and Chris Dalton. Lala: A late launch application. In Workshop on Scalable Trusted Computing, Chicago, Ill., USA, pages 1-8, 2009.

[30] R. P. Goldberg. Architecture of virtual machines. In Proceedings of the Workshop on Virtual Computer Systems, Cambridge, Mass., USA, pages 74-112, 1973.

[31] Robert P. Goldberg. Survey of virtual machine research. Computer, 7(9):34-45, September 1974.

[32] A. Graf and J. Roedel. Nesting the virtualized world. In Linux Plumbers Conference, September 2009.

[33] Steven Hand, Andrew Warfield, Keir Fraser, Evangelos Kotsovinos, and Daniel J Magenheimer. Are virtual machine monitors microkernels done right? In Proc. of HotOS, 2005.

[34] M. Hines, U. Deshpande, and K. Gopalan. Post-copy live migration of virtual machines. In SIGOPS Operating Systems Review, July 2009.

[35] Michael Hines and Kartik Gopalan. Post-copy based live virtual machine migration using adaptive pre-paging and dynamic self-ballooning. In Proceedings of ACM SIGPLAN/SIGOPS International Conference on Virtual Execution Environments (VEE), Washington, D.C., March 2009.

[36] Institute for Information Infrastructure Protection (I3P). www.thei3p.org/.

[37] IPSECS. Kernel Beast core.ipsecs.com/rootkit/kernel-rootkit/kbeast-v1/.

[38] Xuxian Jiang, Xinyuan Wang, and Dongyan Xu. Stealthy malware detection and monitoring through VMM-based "out-of-the-box" semantic view reconstruction. ACM Trans. Information Systems Security, 13(2):1-28, March 2010.

[39] John K. Ousterhout, Andrew R. Cherenson, Frederick Douglis, Michael N. Nelson and Brent B. Welch. The Sprite network operating system. In IEEE Computer, volume 21, pages 23-36, February 1988.

[40] A. Kivity, Y. Kamay, D. Laor, U. Lublin, and A. Liguori. KVM: the linux virtual machine monitor. In Proc. of Linux Symposium, June 2007.

[41] Con Kolivas. Kernbench: ck.kolivas.org/apps/kernbench/kernbench-0.50/.

[42] Kenichi Kourai and Shigeru Chiba. Hyperspector: Virtual distributed monitoring environments for secure intrusion detection. In ACM/USENIX International Conference on Virtual Execution Environments, pages 197-207, 2005.

[43] Michael Le and Yuval Tamir. Rehype: Enabling vm survival across hypervisor failures. In Proceedings of the 7th ACM SIGPLAN/SIGOPS International Conference on Virtual Execution Environments, 2011.

[44] John Levon. OProfile: System-wide profiler for Linux systems, oprofile.sourceforge.net/about/.

[45] Jochen Liedtke. On micro-kernel construction. ACM SIGOPS Operating Systems Review, 29(5):237-250, 1995.

[46] Zhao Lin, Kartik Gopalan, and Ping Yang. Virtual append-only storage for secure logging in virtual machines. In Proceedings of 2nd ICPP International Workshop on Security in Cloud Computing, pages 245-250, 2010.

[47] Yu David Liu and Kartik Gopalan. Interaction-based programming towards translucent clouds. In Proc. of ACM Workshop on Analysis and Programming Languages for Web Applications and Cloud Applications, 2010.

[48] Christopher Mitchell, Vikram Munishwar, Shailendra Singh, Xiaoshuang Wang, Kartik Gopalan, and Nael Abu-Ghazaleh. Testbed design and localization in mint-2: A miniaturized robotic platform for wireless protocol development and emulation. In International Conference on Communication Systems and Networks (COMSNETS), 2009.

[49] Vikram Munishwar, Shailendra Singh, Xiaoshuang Wang, Christopher Mitchell, Kartik Gopalan, and Nael Abu-Ghazaleh. On the accuracy of RFID-based localization in a mobile wireless network testbed. In IEEE PerCom Workshop on Pervasive Wireless Networking (PWN), 2009.

[50] Derek Gordon Murray, Grzegorz Milos, and Steven Hand. Improving xen security through disaggregation. In Proc. of Virtual Execution Environments, pages 151-160, 2008.

[51] Jun Nakajima. Enabling Optimized Interrupt/APIC Virtualization in KVM. In KVM Forum, Barcelona, Spain, November 2012.

[52] Gleb Natapov. Nested EPT to make nested VMX faster. In KVM Forum, Edinburgh, October 2013.

[53] Netperf. www.netperf.org/netperf/.

[54] D. L. Osisek, K. M. Jackson, and P. H. Gum. Esa/390 interpretive-execution architecture, foundation for vm/esa. IBM Systems Journal, 30(1):34-51, February 1991.

[55] Bryan D. Payne, Martim Carbone, Monirul Sharif, and Wenke Lee. Lares: An architecture for secure active monitoring using virtualization. In IEEE Symposium on Security and Privacy, pages 233-247, 2008.

[56] PCI SIG. Single Root I/O Virtualization and Sharing www.pcisig.com/specifications/iov/single root/.

[57] Phoenix Hyperspace. www.hyperspace.com/.

[58] Gerald J. Popek and Robert P. Goldberg. Formal requirements for virtualizable third generation architectures. Communications of ACM, 17(7):412-421, July 1974.

[59] Vijay Shankar Rajanna, Anand Jahagirdar, Smit Shah, and Kartik Gopalan. Explicit coordination to prevent congestion in data center networks. Journal of Cluster Computing, pages 183-200, 2012.

[60] Vijay Shankar Rajanna, Smit Shah, Anand Jahagirdar, and Kartik Gopalan. Xco: Explicit coordination for preventing congestion in data center ethernet. In Proc. of 6th IEEE International Workshop on Storage Network Architecture and Parallel I/Os, pages 81-89, 2010.

[61] Vijay Shankar Rajanna, Smit Shah, Anand Jahagirdar, Christopher Lemoine, and Kartik Gopalan. Xco: Explicit coordination to prevent network fabric congestion in cloud computing cluster platforms. In Proc. of 19th ACM International Symposium on High Performance Distributed Computing (HPDC), 2010.

[62] RedHat CloudForms. www.redhat.com/en/technologies/cloud-computing/cloudforms.

[63] Rether Networks Inc. Internet Service Management Device, www.rether.com/ISMD.htm.

[64] Rether Networks Inc. Real-time Ethernet Protocol, www.rether.com/RETHER.htm.

[65] Ryan Riley, Xuxian Jiang, and Dongyan Xu. Guest-transparent prevention of kernel rootkits with VMM-based memory shadowing. In Recent Advances in Intrusion Detection, pages 1-20, 2008.

[66] Rusty Russell. Virtio: Towards a de-facto standard for virtual i/o devices. SIGOPS Oper. Syst. Rev., 42(5):95-103, July 2008.

[67] J. Rutkowska. Subverting vista kernel for fun and profit. In Blackhat, August 2006.

[68] Sape J. Mullende, Guido van Rossum, Andrew S. Tanenbaum, Robbert van Renessey and Hans van Staveren. Amoeba: a distributed operating system for the 1990s. In IEEE Computer, volume 23, pages 44-53, May 1990.

[69] Arvind Seshadri, Mark Luk, Ning Qu, and Adrian Perrig. Secvisor: a tiny hypervisor to provide lifetime kernel code integrity for commodity OSes. In ACM SIGOPS Operating Systems Review, volume 41(6), pages 335-350, 2007.

[70] S. Sharma, J. Chen, W. Li, K. Gopalan, and T. Chiueh. Duplex: A reusable fault-tolerance extension for network access devices. In Proc. of Intl. Conference on Dependable Systems and Networks (DSN) 2003, San Francisco, Calif., June 2003.

[71] SPECjbb2005. www.spec.org/jbb2005/.

[72] Standard Performance Evaluation Corporation. Specvirt sc2010 Benchmark, www.spec.org/virt sc2010.

[73] *Udo* Steinberg and Bernhard Kauer. Nova: A microhypervisor-based secure virtualization architecture. In Proc. of EuroSys, pages 209-222, 2010.

[74] Sahil Suneja, Canturk Isci, Vasanth Bala, Eyal de Lara, and Todd Mummert. Non-intrusive, out-of-band and out-of-the-box systems monitoring in the cloud. In SIGMETRICS'14, Austin, Tex., USA, 2014.

[75] J. Toldinas, D. Rudzika, V. S˜tuikys, and G. Ziberkas. Rootkit detection experiment within a virtual environment. Electronics and Electrical Engineering—Kaunas: Technologija, (8):104, 2009.

[76] Transaction Processing Performance Council. TPC-C V5, www.tpc.org/tpcc.

[77] R. Uhlig, G. Neiger, D. Rodgers, A. L. Santoni, F. C. M. Martins, A. V. Anderson, S. M. Bennett, A. Kagi, F. H. Leung, and L. Smith. Intel virtualization technology. Computer, 38(5):48-56, 2005.

[78] Alex Vasilevsky, David Lively, and Steve Ofsthun. Linux Virtualization on Virtual Iron VFe. In Proc. of Linux Symposium, pages 235-250, 2005.

[79] vmitools. code.google.com/p/vmitools/.

[80] VMware Inc. www.vmware.com/.

[81] VMWare vRealize. www.vmware.com/products/vrealize-suite.

[82] Volatility Framework. code.google.com/p/volatility/.

[83] vSMP Foundation Architecture. www.scalemp.com/media-hub/resources/whitepapers.

[84] Jian Wang, Kwame-Lante Wright, and Kartik Gopalan. XenLoop: a transparent high performance Inter-VM network loopback. Journal of Cluster Computing—Special Issue on High Performance Distributed Computing (HPDC), 12(2):141-152, 2009.

[85] Orit Wasserman. Nested Virtualization: Shadow Turtles. In KVM Forum, Edinburgh, Spain, October 2013.

[86] A. Whitaker, R. S. Cox, and M. Shaw. Constructing services with interposable virtual hardware. In Proc. of NSDI, San Francisco, Calif., 2004.

[87] Dan Williams, Hani Jamjoom, and Hakim Weatherspoon. The Xen-Blanket: Virtualize once, run everywhere. In EuroSys, Bern, Switzerland, 2012.

[88] NSFCloud Workshop. www.chameleoncloud.org/nsfcloud-workshop/.

[89] Xen Cloud Platform. wiki.xenproject.org/wiki/XCP Overview.

[90] Fengzhe Zhang, Jin Chen, Haibo Chen, and Binyu Zang. Cloudvisor: Retrofitting protection of virtual machines in multi-tenant cloud with nested virtualization. In Proceedings of the Twenty-Third ACM Symposium on Operating Systems Principles, pages 203-216. ACM, 2011.

[91] Umech Deshpande, Yang You, Danny Chan, Nilton Bila, Kartik Gopalan, "Fast Server Deprovisioning through Scatter-Gather Live Migration of Virtual Machines", In IEEE Cloud (Research Track), Anchorage, Ak., 2014. (Acceptance rate: 20%).

[92] Yaohui Hu, Tianlin Li, Ping Yang, and Kartik Gopalan, "An Application-Level Approach for Privacy-preserving Virtual Machine Checkpointing", the 6th IEEE International Conference on Cloud Computing (CLOUD), research track, pages 59-66, 2013 (Acceptance rate: 19%)

[93] Srikant Sharma, Kartik Gopalan, S. Nanda and Tzi-cker Chiueh, "Viking: A Multi-SpanningTree Ethernet Architecture for Metropolitan Area and Cluster Networks", In INFOCOM, 2004. (Acceptance rate: 18.4%).

[94] Ashishi Raniwala, Kartik Gopalan and Tzi-cker Chiueh, "Centralized Algorithms for Multichannel Wireless Mesh Networks", ACM Mobile Computing and Communications Review, 8(2), 50-65, April 2004.

[95] BULPIN, J. Whatever happened to XenServer's Windsor architecture? xenserver.org/blog/entry/[96] Candea, G., Kawamoto, S., Fujiki, Y., Friedman, G., and Fox, A. Microreboot-a technique for cheap recovery. In OSDI (2004), vol. 4, pp. 31-44.

[97] Citrix. XenDesktop and The Evolution of Hardware-Assisted Server Technologies.www.citrix.com/articles-and-insights/trends-and-innovation/feb-2014/xendesktop-and-theevolution-of-hardware-assisted-server-technologies.html.

[98] Citrix. XenDesktop. www.citrix.com/prod-ucts/xenapp-xendesktop/.

[99] Das, B., Zhang, Y. Y., And Kiszka, J. Nested virtualization: State of the art and future directions. In Proc. of KVM Forum (2014).

[100] Engler, D. R., Kaashoek, M. F., et al. Exokernel: An operating system architecture for application-level resource management. In ACM SIGOPS Operating Systems Review (1995), vol. 29(5), ACM, pp. 251-266.

[101] Graf, A., And Roedel, J. Nesting the virtualized world. In whatever happened to xenserver's Windsor architecture. Linux Plumbers Conference (September 2009).

[102] Intel Corp. Intel 64 and IA-32 Architecture Software Developers Manual, Volume 3, System Programming Guide. Order number 325384. April 2016.

[103] Iperf: The Network Bandwidth Measurement Tool. iperf.fr/.

[104] Lowell, D. E., Saito, Y., And Samberg, E. J. Devirtualizable virtual machines enabling general, single-node, online maintenance. SIGARCH Comput. Archit. News 32, 5 (October 2004), 211-223.

[105] McAfee. Root out rootkits: An inside look at McAfee deep defender. White Paper, 45703wp rootkits 0512 fnl ETMG.

[106] Real Time Systems GmbH. RTS Real-Time Hypervisor, www.real-time-systems.com/real-time hypervisor.

[107] Shen, Z., Jia, Q., Sela, G.-E., Rainero, B., Song, W., Van Renesse, R., and Weatherspoon, H. Follow the sun through the clouds: Application migration for geographically shifting workloads. In Proceedings of the Seventh ACM Symposium on Cloud Computing (2016), pp. 141-154.

[108] Silicon Graphics, Inc. STL Quicksort, www.sgi.com/tech/stl/sort.html.

[109] Sugerman, J., Venkitachalam, G., and Lim, B.-H. Virtualizing I/O devices on vmware workstation's hosted virtual machine monitor. In Proceedings of USENIX Annual Technical Conference (2002).

[110] Williams, D., Hu, Y., Deshpande, U., Sinha, P. K., Bila, N., Gopalan, K., and Jamjoom, H. Enabling efficient hypervisor-as-a-service clouds with ephemeral virtualization. In Proceedings of the 12th ACM SIGPLAN/SIGOPS International Conference on Virtual Execution Environments (2016).

[111] Yassour, B.-A., Ben-Yehuda, M., and Wasserman, O. Direct device assignment for untrusted fully-virtualized virtual machines. Tech. rep., IBM Research, 2008.

SUMMARY OF THE INVENTION

Public cloud software marketplaces already offer users a wealth of choice in operating systems, database management systems, financial software, and virtual networking, all deployable and configurable at the click of a button. Unfortunately, this level of customization has not extended to emerging hypervisor-level services, partly because traditional virtual machines (VMs) are fully controlled by only one hypervisor at a time. Currently, a VM in a cloud platform cannot concurrently use hypervisor-level services from multiple third-parties in a compartmentalized manner. A multi-hypervisor VM is provided, which is an unmodified guest that can simultaneously use services from multiple coresident, but isolated, hypervisors. Span virtualization leverages nesting to allow multiple hypervisors to concurrently control a guest's memory, virtual CPU, and I/O resources. Span virtualization enables a guest to use services such as introspection, network monitoring, guest mirroring, and hypervisor refresh, with performance comparable to traditional single-level and nested VMs.

Span virtualization which provides horizontal layering of multiple hypervisor-level services. A Span VM, or a multi-hypervisor VM, is an unmodified guest whose resources (virtual memory, CPU, and I/O) can be simultaneously controlled by multiple coresident, but isolated, hypervisors. A base hypervisor at L0 provides a core set of services and uses nested virtualization to run multiple deprivileged service hypervisors at L1. Each L1 augments L0's services by adding/replacing one or more services. Since the L0 no longer needs to implement every conceivable service, L0's footprint can be smaller than a feature-filled hypervisor.

Guest or VM refers to a top-level VM, with qualifiers single-level, nested, and Span as needed.

L1 refers to a service hypervisor at layer-1.

L0 refers to the base hypervisor at layer-0.

Hypervisor refers to the role of either L0 or any L1 in managing guest resources.

The present technology provides an ecosystem of hypervisor-level services which provides systems support for virtual machines (VMs) that run simultaneously on multiple co-located hypervisors. The technology enables multiple, possibly third-party, hypervisors to co-exist and augment the services of a single base hypervisor, for example in cloud platforms. To utilize these diverse services, a multi-hypervisor virtual machine (VM), or Span VM, which is an unmodified VM that simultaneously runs atop multiple co-located hypervisors, is provided.

The present technology provides transparent Support for Multi-Hypervisor VMs. For example, unmodified VMs may simultaneously on multiple co-located hypervisors. Coordination mechanisms are provided to enable multiple hypervisors to simultaneously exert control over a VM's memory, virtual CPUs, and I/O devices.

Table 1 compares Span virtualization with other alternatives for providing multiple hypervisor-level services for a guest. First, like single-level and nested alternatives, Span virtualization provides L1s with control over the virtualized ISA of guests. Span L1s also support both full and partial guest control. In other words, Span L1s can range from full hypervisors that control all guest resources, like nested L1s, to specialized hypervisors that control only some guest resources, like service VMs.

Next, both Span virtualization and service VMs can provide VM-level isolation among different services for the same guest. Coresident Span L1s are unaware of each other even when they serve the same guests. In contrast, nesting provides only one deprivileged service compartment. Among userspace extensions, isolation is only as strong as the user-level privileges of the service.

In all except the single-level case, the hypervisor is protected from service failures because services are deprivileged from the hypervisor. A service failure also impacts only those guests that use the failed service, as opposed to system-wide impact with single-level feature-filled hypervisors. Thus, horizontal layering provides modularity among services in that only the L1 services that a guest needs constitute its trusted computing base.

Finally, in terms of performance, services in a single-level hypervisor can provide the best performance (least overhead) among alternatives because these services execute in the most privileged level. With user-space extensions, guests experience context switching overhead among services. Service VMs introduce the overhead of "world" switches, or switching processor among VMs, which is inherently more expensive than inter-process context switching. Nesting adds the overhead of emulating all privileged guest operations in L1. Span virtualization, since it supports partial guest control by L1s, inherits the nesting overhead only for those resources that L1s control.

TABLE 1

Table 1: Comparison of alternatives for providing multiple hypervisor-level services to a common guest. Span virtualization combines the benefits of both Service VMs and Nested virtualization, while incurring nesting overhead only for those guest resources that L1s control.

| | Level of Guest Control | | Inter-Service | Service Failure Impact | | |
|---|---|---|---|---|---|---|
| | Virtual ISA | Full/Partial | Isolation[a] | L0 | Guest | Performance Overheads |
| Single-level | Yes | Full | No isolation | Fails | All | Least |
| Userspace | No | Partial | Process-level | Protected | Attached | Context switches |
| Service VM | No | Partial | VM-level | Protected | Attached | World switches |
| Nested | Yes | Full | VM-level[b] | Protected | Attached | World switches + nesting |
| Span | Yes | Full/Partial | VM-level | Protected | Attached | World switches + nesting[c] |

[a]Isolation among services for a common guest, assuming one service runs per user extension, service VM, or L1.
[b]Only one service isolated in L1 in Nested setting. Others run in L0.
[c]Nesting overhead only for guest resources controlled by an L1.

Mechanisms are provided for the co-existence of various hypervisor-level services; demonstrate a multi-hypervisor ecosystem for services such as high availability for VMs, hypervisor fault-tolerance, deduplication, VM introspection, and live guest patching.

Nested virtualization [32, 9, 54, 27] allows providers to control the physical hardware with a trusted root-level hypervisor (layer-0 or L0), and run additional hypervisors (layer-1 or L1), possibly owned by third parties, as guests. FIG. 1 illustrates this concept: V1 is a standard non-nested VM running on L0, whereas V2 is a nested VM running on an L1 hypervisor H1 which in turn runs on L0. Nested virtualization is experiencing considerable research interest for services such as cross-cloud migration [87], firmware embedding [29, 57], security [90, 67, 65, 69, 38, 6], development, and testing. Nested VMs are expected to gain wider adoption as their performance overheads are rapidly resolved [9], particularly for I/O workloads.

State-of-the-art virtualization platforms restrict a VM to run on only one hypervisor at a time. Presently, a VM cannot simultaneously use hypervisor-level services offered by multiple co-located hypervisors; its world-view is limited to the services offered by a single hypervisor.

A Span VM, or a multi-hypervisor VM, is therefore provided as an enabler of an ecosystem of hypervisors-level services. A Span VM is an unmodified VM that runs simultaneously on multiple co-located, but isolated, hypervisors. A base hypervisor at L0 uses virtualization to run multiple hypervisors at L1. Each L1 hypervisor exports one or more features missing from L0. The Span VM can pick and choose one or more hypervisors on which it runs. This provides a modular framework for hypervisor-level features, both in the sense that only the features a Span VM uses are in its trusted computing base and only the features it uses affect its performance. The L0 hypervisor is thus relieved from having to support a laundry-list of features, and can focus on its core responsibilities of resource scheduling and protection. The L1 hypervisors need not be full-fledged existing commodity hypervisors; they can be a new class of "feature" hypervisors that specialize in offering one or more services.

FIG. 1 illustrates various possible configurations of Span VMs. A single L0 hypervisor runs multiple L1 hypervisors (H1, H2, H3, and H4) and multiple user VMs (V1, V2, V3 and V4).

V1 is a traditional non-nested VM that runs on the base hypervisor L0.

V2 is a traditional nested VM that runs on only one hypervisor (H1).

V3, V4 and V5, are multi-hypervisor nested VMs.

V3 runs on two hypervisors (L0 and H1).

V4 runs on three hypervisors (L0, H2, and H3).

V5 is a fully nested Span VM that runs on two L1 hypervisors (H3, and H4).

It is therefore an object to provide systems support for Span VMs. The Span VM is an unmodified, or minimally modified VM which runs simultaneously on multiple co-located hypervisors. This includes support for two types of hypervisor-level services: those that need continuous access to the Span VM (Persistent Hypervisors) and those that need occasional access (Transient Hypervisors). The present technology enables multiple hypervisors to cooperatively exert control over a Span VM's memory, virtual CPU (vCPU), and I/O resources, but without modifying the VM. For transient hypervisors, which can be dynamically injected or removed under a Span VM, the injection/removal process is transparent to the VM and the latency minimized or unnoticeable.

An ecosystem of L1 hypervisors that augment the base L0 hypervisor in a cloud platform provide diverse services for Span VMs. Such services include, but are not limited to, high availability for VMs, hypervisor fault-tolerance, deduplication, VM introspection, and live guest patching.

In order to provide these services, a set of common underlying abstractions and inter-hypervisor coordination mechanisms are defined as needed to support these services.

In addition, the Span VMs can provide network monitoring and VM introspection, from co-located hypervisors with low performance overheads for common benchmarks.

The two key challenges in designing systems support for Span VMs are (1) to maintain transparency for the Span VM, and (2) to devise clear coordination mechanisms between the underlying hypervisors. The first requires that the guest OS and applications of a Span VM remain unmodified and oblivious to the fact that it runs on multiple hypervisors simultaneously. For clarity, the following discussion is mostly limited to a Span VM that runs on two hypervisors, L0 and L1 (V3 in FIG. 1), since the design for other modes (V4 and V5) are generalizations of this design.

In order for a hypervisor to provide any functionality to a VM, it must exert control over the VM. For a Span VM, the underlying hypervisors cooperate to enable a virtual resource abstraction that is indistinguishable from that of a single hypervisor. There are three resources on which multiple hypervisors can simultaneously exert control:

Memory: Each hypervisor has a consistent view of the VM's memory throughout its execution.

vCPUs: All or a subset of the VM's virtual CPUs (vCPUs) may be scheduled by different hypervisors.

I/O devices: All or a subset of the VM's virtual I/O devices may be controlled by different hypervisors.

FIG. 3 illustrates this resource control for a Span VM that runs on two hypervisors, L0 and L1 (as in V3). Memory of the Span VM is shared across the two hypervisors, whereas its vCPUs and virtual devices may be distributed, possibly asymmetrically.

There are two broad categories of hypervisor-level services: (a) those that require continuous access to or full control of the guest VMs (Persistent Control), and (b) those that require occasional or periodic access (Transient Control). Both categories require direct control over guest's memory, vCPUs, and I/O devices by feature hypervisors.

For services requiring continuous access, such as event-interposition, Span VMs can execute simultaneously on multiple persistent hypervisors, i.e., feature hypervisors that maintain continuous control over a subset of Span VM's resources. The base L0 hypervisor partitions the set of vCPUs of the Span VM and delegates subset independently across feature hypervisors. Delegation is transparent to the Span VM and each vCPU set can be partitioned iteratively to accommodate new feature hypervisors at runtime.

For hypervisor services that can work with occasional access to the Span VM, transient hypervisors are supported, i.e., feature hypervisors which can be injected under a Span VM when needed and removed when no longer needed. When no feature hypervisor requires access, the VM runs directly on the L0 hypervisor, e.g., in a cloud computing environment. The result is that performance degradation of nested virtualization is limited to only the duration in which a feature hypervisor performs access operations. Many services, such as root-kit detection [75] and near field monitoring [74], require only periodic memory scans of the guest VM, and unlike Remus [18], the VM replication-based high availability system, they operate passively and don't control the guest VM's page tables.

FIG. 4 shows a high-level architecture of one embodiment of the system. All underlying hypervisors include components for the initialization and runtime management of Span VM's memory, vCPU, and I/O resources. Additionally, the L0 hypervisor provides two major services to facilitate coordination between all hypervisors that control a Span VM: (a) Inter-hypervisor memory mapping, and (b) Inter-hypervisor event relay.

The memory mapper in L0 allows the hypervisors to share the physical memory of the Span VM at initialization time and to jointly manage it during runtime. Specifically, it allows the hypervisors to map Span VM's "virtual" view of physical memory, or Guest Physical Address (GPA) space, to a common set of physical memory pages managed by L0. A Span VM begins as a regular VM at one of the hypervisors, say L0 for simplicity. The L1 hypervisor also initiates its own instance of a VM (specifically a nested VM at L2), but maps its memory and execution state to that of the VM already initialized by L0. The two VM instances thus created are considered as sub-VMs of the Span VM. Once the initialization is complete, all hypervisors work as peers.

The event relay in L0 is meant to facilitate runtime coordination between all hypervisors of a Span VM. Event messages of mutual interest include I/O requests, device interrupts, inter-processor interrupts, or memory-related events. There are many ways to realize the event relay, such as traps, hypercalls, network connection between hypervisors forwarded through L0 kernel, serial virtual devices exported from L0 to each hypervisor or inter-hypervisor shared buffers dedicated for event communication. For example, a prototype system described below uses UDP sockets to relay events between the two hypervisors.

A Span VM has a single memory address space on which all of its underlying hypervisors exercise control. Each hypervisor may independently manipulate the guest memory while ensuring that all hypervisors (and the guest) observe a consistent view of the memory. At the same time, the Span guest and its applications remain unmodified. This requires that (a) initialization of a Span VM correctly maps its guest memory with all its hypervisors, and (b) runtime coordination maintains consistent page translations for the Span VM across the various hypervisors. A guest virtual address is translated to the same physical address, irrespective of which guest vCPU accesses the virtual address. Thus, any memory write performed by a guest vCPU controlled one hypervisor must be immediately visible to guest vCPUs controlled by other hypervisors.

In modern x86 processors, hypervisors manage the physical memory resources a guest can access using a virtualization feature called extended page tables (EPT). In a standard non-nested virtualization, shown in FIG. 5A, the guest uses standard page tables to map virtual addresses (VA) to guest physical addresses (GPA). The hypervisor uses an EPT (one per guest) to map guest-physical addresses (GPA) to host physical addresses (HPA).

In a nested environment, as shown in FIG. 5B, the L2 guest similarly maintains page tables that map the L2 VA to L2 GPA and the L1 hypervisor maintains a Virtual EPT to map the L2 GPA to L1 GPA. However, one more translation is required: from L1 GPA to L0 HPA. Manipulations to the Virtual EPT by L1 trigger traps to L0 which in turn, constructs a Shadow EPT that directly maps L2 GPA to L0 HPA by compacting the Virtual EPT and L1's own EPT. Whenever L1 activates a Virtual EPT for a Span VM, L0 receives a trap and activates the appropriate Shadow EPT. This style of nested page table management is also variously known as multi-dimensional paging or nested EPT [9, 52, 85]. (An alternative called shadow-on-EPT mode is known to be inefficient) EPT faults caused by the nested VM against the shadow EPT are intercepted by L0 and forwarded to L1 to handle.

For Span VMs, as shown in FIG. 5C, the Shadow EPT management is extended to VMs that span multiple hypervisors (in FIG. 5C, the L0 and two L1s). A VA in a Span VM lead to the same HPA irrespective of which hypervisor controls the vCPU that accesses the VA. A Span VM is initially created directly on L0 as a non-nested guest. The L0 constructs a regular EPT for the Span VM. In order for one or more new hypervisors (L1s) to manage the memory of the Span VM, L0 first maps Span VM's pages into each hypervisor's L1 GPA. Then, each hypervisor constructs a Virtual EPT for the Span VM. L0 maintains a single Unified Shadow EPT for the Span VM in such a way as to ensure consistency with the Virtual EPTs maintained by multiple L1 hypervisors.

During initialization, each L1 and the L0 agrees upon what pages in the L1 GPA should be populated with the Span VM's pages. This could be accomplished by L1 reserving a memory range of appropriate size in the L1 GPA and then passing a scatter-gather list to L0. The physical memory range can be populated by L0 adjusting the memory mapping in the L1's EPT. At this point, L1 can construct and populate a Virtual EPT for the Span VM. When L1 schedules a Span VM's VCPU to run, it loads the Virtual EPT into the VCPU. During initialization, only memory space sufficient for the currently present guest memory pages is reserved; future memory allocations are dynamically populated in the L1 EPT, Virtual EPT, and Unified Shadow EPT.

This design allows L1 hypervisors to modify the Virtual EPT they maintain for the Span VM in the course of performing memory management. However, the Virtual EPT will be protected by L0: all virtual EPT manipulations will cause vmexits (traps), and a Virtual EPT trap handler in L0 will validate and process the traps. The above approach is similar to the writable page tables [5] approach proposed in Xen for shadow paging. A more efficient alternative is to use hypercalls from L1 to L0 that batch Virtual EPT updates for validation.

L0 maintains a memory event subscription service to let multiple L1 hypervisors independently subscribe to EPT manipulation events. Conceptually, the memory event subscription service maintains a list for each page, specifying the events each L1 hypervisor is subscribed to. When L0 receives an event, it delivers the event to the appropriate L1 hypervisors. L0 ensures that it receives all events the L1 hypervisors are subscribed to, by installing the least permissive page permission of all L1 Virtual EPT entries for that page in the Unified Shadow EPT.

An EPT fault is generated by the processor whenever pages in the L2 GPA are accessed that are either not present in L0 HPA or are protected. Usually, when a single hypervisor is performing memory management for a guest, it is that hypervisor's responsibility to handle it by mapping a new page, emulating an instruction, or taking other actions. For a Span VM, every EPT fault will trap directly to L0, where the memory event subscription service propagates the EPT fault to ensure that events are delivered in a safe, serialized manner to each hypervisor that is interested in them. In this way, each hypervisor can take independent memory management actions.

The primary overhead in memory management for a Span VM will typically be from two sources: one-time overhead to set up a Span VM and runtime overhead to resolve page-faults. Measurements using the two-hypervisor prototype described below show that one-time overhead to set up a 2 GB Span VM is around 230 ms; it takes about 150 ms to scan and map memory addresses and about 95 ms to distribute and initialize vCPUs across hypervisors. During runtime, Span VMs experience an average of 1.4 µs more time than standard nested VMs to resolve a fault in the L1 GPA and about 0.7 µs more to resolve a fault in the L2 GPA. These overheads can be reduced.

A hypervisor exports one or more virtual CPU (vCPUs) to a VM. The vCPUs are scheduled on physical CPUs (pCPUs) through spatial scheduling (vCPU-to-pCPU assignment) and temporal scheduling (when and how long does a vCPU remain mapped to a pCPU). Stating that a Span VM "runs" on multiple hypervisors simultaneously really means that the responsibility for temporal and spatial scheduling of Span VM's vCPUs is distributed among multiple hypervisors.

The distribution of a Span VM's vCPUs among hypervisors could be equal, where each hypervisor controls the same number of vCPUs, or unequal, where each hypervisor controls different number of vCPUs. The vCPU distribution could also be static (fixed at initialization time) or could vary dynamically during execution.

A Span VM's vCPUs may be distributed among its hypervisors as follows. The L0 begins by initiating the Span VM, it initializes the memory state as discussed above, and initializes all the vCPUs as it would for regular VMs. The guest OS in the VM boots up normally over L0. When a L1 hypervisor registers to provide services to the Span VM, L0 hands over the control of a subset of the guest vCPUs to L1. Thus L1 does not initialize any guest vCPUs from scratch; rather it accepts a pre-initialized subset of vCPUs from L0. For example, if the Span VM is configured with two vCPUs, then after vCPU distribution, one vCPU will be active on L0 and the second will be active on L1.

One method to transfer vCPU state is using a variant of VM migration between physical hosts, wherein only the vCPU and device states are transferred, but memory transfer is skipped (since Span VM's memory is already shared by its hypervisors).

A key challenge in distributing the vCPU control across different hypervisors is dealing with Inter-processor Interrupts (IPIs). When the Span VM's guest OS tries to migrate a process from one vCPU under the control of, e.g., L0 to another vCPU under the control of, e.g., L1, this issue is important. Moving a process across vCPUs should just be an update operation on kernel data structures that are kept in the guest OS memory. Ideally, the existing scheduling mechanisms in the guest OS for changing vCPU assignment for processes should work inside a Span VM as well. However, architecture-level issues such as flushing stale TLB entries (TLB shootdown) for the migrating process from the old vCPU, require an inter-processor interrupt (IPI) from the new vCPU to the old vCPU. In the above example, these IPIs and any similar notifications are forwarded from one hypervisor to another when a process inside a Span VM is migrated to a vCPU on another hypervisor.

In standard nested VMs, IPIs between vCPUs are intercepted and delivered by the Kernel-based Virtual machine (KVM) kernel module. For Span VMs, cross-hypervisor IPIs are delivered using the event relay in L0. For example, if an IPI from a Span VM's vCPU running on L0 is meant for a vCPU running on L1 then KVM at L0 will transfer the IPI information to the KVM at L1 via the event relay. The KVM at L1 will then inject the IPI into the target vCPU.

Another issue to consider in a Span VM is what happens when concurrently executing guest vCPUs on different hypervisors attempt to access (read/write) common memory locations such as guest kernel data structures. The Span VM's memory image typically entirely resides in the DRAM of a single machine. So it is acceptable if two different vCPUs controlled by two different hypervisors access common memory locations. Existing locking mechanisms in the Span guest work correctly because the locks themselves are stored in the guest memory. Thus memory consistency is not compromised by distributing vCPUs across hypervisors because the Span VM's memory is shared by L0 and L1.

I/O processing in Span VMs needs to account for the fact that a single VM is now associated with two hypervisors. Control of each I/O device may be delegated to a single hypervisor. Consequently, paravirtual I/O (virtio) drivers [66] may be used in the Span VM. L1 hypervisors can either use direct device assignment [10, 11, 56] or virtio drivers. Direct device assignment to Span VM may also be employed, and, for example, may be provided as in standard nested VMs in the mainline KVM.

FIG. 6 shows the high level overview of standard virtio architecture. The guest OS in the VM runs para-virtual frontend drivers, one for each virtual device, such as virtual block and network devices. The QEMU process hosts the corresponding virtio backends. The frontend and the backend exchange I/O requests and responses via a vring, which is basically a shared buffer. When an I/O request is placed in the vring, the frontend notifies QEMU through a kick operation, i.e. a trap leading to VM Exit. The kick is redirected to QEMU via the KVM kernel module. The QEMU process retrieves the I/O request from the vring and issues the request to the native drivers as an asynchronous I/O. Once the I/O operation completes, QEMU injects an I/O completion interrupt to the guest OS. When the VM resumes, the I/O completion interrupt is delivered to a vCPU according to the IRQ affinity rules in the guest OS. The interrupt handler in the guest invokes the frontend driver, which picks up the I/O response from the vring. The rest of this section described three I/O design issues that we will address for Span VMs.

Since a Span VM runs on multiple hypervisors, it is associated with multiple QEMU processes, one in each hypervisor. FIG. 7 shows a two-hypervisor case. As shown, a single virtio frontend with one vring is associated with multiple virtio backends. If both virtio backends access the vring concurrently, race conditions would result in corruption of the vring buffers. To solve this problem, only one virtio backend may be designated to pick up I/O requests and deliver I/O responses through the vring.

For example, assume that the virtio backend at the L0 is designated to interact with the vring. If one of Span VM's vCPUs under L0's control issues an I/O request, then the corresponding kick is handled by L0 QEMU. However, if a vCPU under L1's control issues an I/O request, then the corresponding kick is redirected to the QEMU at L1. The backend in L1 QEMU will not access the vring to fetch the I/O request. Instead, it redirects the kick via the event relay in FIG. 4 to the QEMU at L0. At this point, the QEMU backend at L0 can fetch the I/O request from the vring for processing. Once the I/O completes, the L0 QEMU injects an I/O completion interrupt into the guest to notify the frontend.

Multiple hypervisors pause a complementary set of vCPUs for the Span VM during vCPU distribution and this affects I/O interrupt processing. For example, assume that a Span VM has two vCPUs: L0 runs vCPU0 and pauses vCPU1, whereas L1 runs vCPU1 and pauses vCPU0. Assume that IRQ affinity rules for a device in the Span guest permit I/O interrupt delivery to only vCPU1. Let's say an I/O operation completes on L0. Normally, KVM in L0 would follow the affinity rules and inject the I/O completion interrupt to vCPU1. Since vCPU1 is paused on L0, the interrupt would never be processed by the Span guest, and the I/O would never complete. To avoid this problem, L0 redirects such interrupts to L1 via the event relay. L1 then injects the redirected interrupt into the active vCPU1.

Posted Interrupts [51] may be employed, which allow interrupts to be injected into guests directly without any VM Exits, based the support of Posted Interrupts for nested VMs.

The Span VM has only one network identity (IP address, MAC address). Assume that a bridged mode network configuration is used, where a software bridge in L0 determines where each incoming packet should be delivered. Theoretically, incoming packets for a Span VM are delivered through either L0 or L1. Which path the L0 software bridge chooses depends upon the reverse learning algorithm. If outgoing packets from Span VM consistently exit through L0, then incoming packets will be delivered through L0 as well. Likewise, for L1. However, if outgoing packets switch back and forth between L0 and L1 as exit paths, then the L0 software bridge may simply broadcast the incoming packets for Span VM to both paths, which would lead to duplicate packet deliveries to the Span VM. To address this duplication, one may designate the responsibility of managing virtio-net device to one of the hypervisors (say L0), in which case all the outgoing packets from Span VM will exit only via L0 and not through L1. As a result, the reverse learning L0 software bridge will deliver all incoming packets for Span VMs (and the corresponding RX interrupts) only to L0, which in turn will inject the RX interrupt according to IRQ affinity.

As discussed above, a transient hypervisor is an L1 hypervisor which can be dynamically injected or removed under a running Span VM as needed. For example, an administrator might use an L1 hypervisor to profile system activity of a Span VM only when a specific application runs in it, and not at other times. In such cases, control of one or more vCPUs is transferred from L0 to L1 for the duration of profiling and returned back to L0 after the profiling completes. A technique to transfer control of specific vCPUs across different hypervisors is provided. This involves serializing and migrating the execution states of only the targeted vCPUs of the Span VM, much like how standard VM migration serializes and transfers the state of all vCPUs of VM. A transient L1 hypervisor has the Span VM's memory mapped permanently, whereas its vCPUs could be selectively migrated into L1 from L0 (for injection) and from the L1 to L0 (for removal) as and when needed. The injection/removal process is kept transparent to the Span VM and minimizes the performance overhead.

Public cloud software marketplaces, such as the AWS marketplace [1], offer users a wealth of choice in operating systems, database management systems, financial software, virtual network routers, etc., all deployable and configurable at the click of a button. Unfortunately, this level of competition and innovation has not extended to emerging hypervisor-level services, partly because cloud providers can only manage their infrastructure with trusted hypervisors. The technology behind multi-hypervisor VMs, enables such an ecosystem of hypervisor-level services that augment the services of the base L0 hypervisor.

Third-party L1 hypervisors could provide local and long-distance high availability services for Span VMs. High availability protects unmodified VMs from failure of the physical machine on which it runs. Solutions, such as Remus [18], typically work by continually transferring incremental checkpoints of the VM to a backup server. When the primary machine fails, the backup VM image is activated, and the VM continues running as if failure never happened. To perform incremental checkpoints of memory, high availability solutions use a feature, called dirty page tracking, to track which pages were written since the last checkpoint. For Span VMs, the L1 hypervisor providing the high availability service maintains continuous control over the memory; in other words, a persistent hypervisor. In addition, the memory event subscription service in L0 traps and relays page-dirtying events from the peer L1 hypervisors back to the L1, providing high availability.

Memory deduplication may be provided as a L1 hypervisor service in a multi-hypervisor ecosystem alongside other L1 services. Deduplication techniques, such as KSM [4], allow the hypervisor to maintain a single copy-on-write page, in place of multiple identical memory pages among different VMs. Besides access to each VM's memory, deduplication relies on trapping VMs' write operations to deduplicated pages to detect content changes. In a multi-hypervisor ecosystem, a Span VM uses such a deduplication service from L1. As with high availability services above, the deduplication service subscribes to the L0, to be notified of write events on a Span VM's memory by vCPUs running on peer L1 hypervisors. It makes copies of pages upon a copy-on-write fault and conveys mapping updates to the unified shadow EPT in L0 and virtual EPTs of relevant peer L1s.

Multi-hypervisor VMs may be used to protect a VM from L1 hypervisor crashes due to software bugs. Techniques such as ReHype [43] enable a VM to survive across hypervisor failures by booting a new instance of a hypervisor to preserve the state of VMs. In contrast, Span VMs can allow switching over the VM execution to another pre-existing hypervisor (L1 or L0) on the same host, achieving smaller recovery latency. Such protection may provide for graceful recovery: if the primary L1 hypervisor crashes then the L0 can first try to fail-over the Span VM to a backup hypervisor on the same machine which already maps the VM's memory, vCPU, and I/O state. Only if the intra-host failover doesn't work, then inter-host failover to another machine is triggered. Intra-host fail-over is much faster as the first resort than inter-host failover because the VM's memory image doesn't need to be copied.

Virtual Machine Introspection (VMI) refers to the act of a hypervisor inspecting a VM's internal state without the VM's knowledge, in order to analyze is behavior. For example, a simple VMI service, discussed above, detects a rootkit inside a Span VM. However, more complex VM introspection services such as vmitools [79] can co-exist with other L1 hypervisor services. More general intrusion detection systems that go beyond just inspecting the VM's memory, to traffic monitoring and system call interposition, may also be provided.

Other L1 services for Span VMs may be implemented, such as live guest patching [15], real-time scheduling, specialized file systems, virtual networking, firewalling, and protocol acceleration.

Coordination among multiple hypervisors of a Span VM is required to resolve potential conflicts because each hypervisor can exercise control over the Span VM's resources. For example, if one hypervisor performs dirty-page tracking over a Span VM's memory for high availability [18], then it relays relevant access information to other hypervisors mapping the same memory pages. Similarly, vCPU events and I/O events can cause potential conflicts. A memory event subscription service, vCPU event subscription service, and I/O event subscription service, may each be maintained by the L0, to provide such coordination. Alternately, e.g., when such co-operation is not feasible between any two hypervisors, administrative policies may exclude them from controlling the same Span VM.

In a marketplace for hypervisor-level services, users may control the permissions granted, to provide control over how each L1 hypervisor is allowed to manipulate the Span VM's resources. For instance, some hypervisors may be allowed only to inspect the memory, others may be allowed only to intercept network traffic, yet others may have full control over resource management.

Any virtualization technology preferably integrates well with cloud operations management systems which include analytics, automation, planning, and security. A multi-hypervisor service ecosystem may be managed by modifications of existing tools for cloud operations [81, 89, 62]. This may include ways to simplify inter-hypervisor coordination, identify security vulnerabilities, resolve policy conflicts, and automate data collection and troubleshooting across multiple hypervisors.

One aspect of the technology enables an ecosystem of specialized "feature" hypervisors at L1, and thus these may be competitive in terms of providing a similar set of functions, and/or unique functions. A Span VM may be executed on a hypervisor that provides an identical/consistent virtual resource abstraction to the Span VM s. Different hypervisors present different hardware representations to the guest OS. For instance, a guest may need to have paravirtual I/O drivers appropriate for each underlying hypervisor. Span VMs may provide a common hardware abstraction for which an additional software layer emulates to the abstraction exposed by the underlying commodity hypervisors. Due to the multi-hypervisor capability, Span VM supports specialized hypervisors at L1 that focus on providing a narrow set of services, and therefore relieve the trusted L0 hypervisor to focus on, e.g., multiplexing and protection. Further, this permits updating of a hypervisor environment for missing functionality, compatibility, etc. Further, in some cases, the existing L0 hypervisor is itself inefficient, and the Span VM permits a more efficient implementation of a required function, without replacing the entire hypervisor.

The present technology provides a multi-hypervisor virtual machine (MHVM) that enables a VM to simultaneously execute on multiple co-located hypervisors.

The present technology enables cloud providers to co-locate multiple third-party hypervisors that provide different services on the same physical machine. A VM can thus simultaneously use the diverse L1 services such as VM introspection, intrusion detection, deduplication, or real-time CPU or I/O scheduling. A new cloud architecture is provided in which cloud providers can enable third parties to execute multiple-independently developed or maintained-hypervisors, each contributing different features. Indeed, because a VM can employ multiple hypervisors, new hypervisor may be provided which provides only new functions, and may rely on another hypervisor platform or platforms for complete support of execution by the VM. Therefore, VMs may be modular, and may be provided as a set of optional alternates.

Lean hypervisors are therefore possible that specialize in providing specific services. VMs could then pick and choose any (and only the) hypervisors they need.

Even hypervisors from a single source may have different versions, which may impose compatibility issues with respect to legacy code. Therefore, the present technology permits these various hypervisors to coexist and concurrently operate.

The present technology enables cloud users to run guest VMs simultaneously on multiple colocated, but isolated, hypervisors. Cloud providers execute the hypervisors, each potentially developed and/or maintained by a different entity, and each exposing one or more hypervisor-level features the cloud user.

Span VMs presently run with virtio devices, but can be implemented to support direct device assignment and Single Root I/O Virtualization and Sharing (SR-IOV). The use of virtio may impacts the I/O performance of the benchmarked system, and therefore a direct-device assignment to L1 hypervisors may improve performance.

According to the present technology, the multiple hypervisors may be provided with distinct levels of privilege or restrictions within the operating environment, distinct from their functionality. In some cases, the VM may execute on various hypervisors that have different respective privileges and/or security models. It is also possible for the VMs to execute on distinct hardware.

The Span technology may also be used in conjunction with other technologies, such as swapping, virtual memory schemes, live migration, and the like.

VM introspection (VMI) is a powerful tool to move management functionality from guest OS agents into the hypervisor. For example, VMI enables guest process monitoring, which can also be used for forensics. Process monitoring can be implemented using a VM memory inspection tool, such as Volatility [82]. Running in a hypervisor, Volatility continuously inspects a guest VM's memory (obtained using a tool such as pmemsave) to extract an accurate list of all processes running inside the guest VM. Thus even if a guest OS is infected by a rootkit, such as Kernel Beast [37], which can hide malicious activity and present an inaccurate process list to the compromised guest, Volatility running in the hypervisor can extract an accurate guest process list using VM introspection.

It is common for operators of large VM deployments to monitor network traffic. This enables them to track the load on the machine, as well as inspect incoming and outgoing connections, which are useful for forensics in case of intrusion. Implementing such a service in a hypervisor can be simple: a tool such as tcpdump can be executed in the host, capturing on the virtual network interface of the guest. More complex network services that a hypervisor can provide include virtual networking, NAT, firewalling, or protocol acceleration.

While the implemented prototype supports one Span VM running on two hypervisors, this is not an architectural limitation. A more comprehensive design scales to support multiple Span VMs using services from multiple hypervisors, with potential overlap in the hypervisor services they use (basically a many-to-many relationship).

A key overhead concern for Span VMs is the cost of forwarding IPIs between hypervisors. Measurements indicate that it takes around 292 μs in redirecting IPIs between two vCPUs on different hypervisors over traditional IPI delivery between two co-located vCPUs in a standard VM. The overheads arise from implementing event relays using UDP packets, which is relatively inefficient, but may be optimized, for example by using different protocols.

The performance of SPECjbb [71], a CPU intensive multi-tier application benchmark, was compared. SPECjbb faces a 0.73% degradation when running in Span VMs compared against standard nested VMs, and 8.76% degradation compared to standard guests. While these overheads are reasonably small, they too are subject to optimization to support more than one Span VM and more than two hypervisors, and provide more efficient event relays.

While Span typically resides on a single physical machine running one L0 hypervisor, by, for example, extending distributed virtual memory technology and live migration technology, Span can employ a distributed or multiple L0 platform. Therefore, a single physical machine is not a limitation of the technology. However, embodiments of the technology typically employ a single physical machine running one L0 hypervisor.

It is therefore an object to provide a multi-hypervisor system, comprising: a plurality of hypervisors comprising a first hypervisor and a second hypervisor, at least one of the plurality of hypervisors being a transient hypervisor; and at least one Span VM, concurrently executing on each of the plurality of hypervisors, the at least one transient hypervisor being adapted to be dynamically at least one of injected and removed under the at least one Span VM concurrently with execution of the at least one Span VM on another hypervisor; wherein the at least one Span VM has a single and consistent at least one of memory space, virtual CPU state, and set of input/output resources, shared by the plurality of hypervisors.

It is also an object to provide a method of operating a virtualized execution environment, comprising: providing a plurality of hypervisors, comprising at least one transient hypervisor; dynamically injecting at least one of the at least one transient hypervisor under a Span VM during execution of the Span VM; concurrently executing portions of the Span VM, on at least a portion of the plurality of hypervisors comprising the at least one transient hypervisor, wherein the Span VM has a consistent at least one of virtual memory, virtual CPU state, and input/output communication stream, coordinated by the plurality of hypervisors; and dynamically removing at least one transient hypervisor from under the Span VM during execution of the Span VM on the plurality of hypervisors.

It is a further object to provide a computer readable memory, storing thereon non-transitory instructions for operating a virtualized execution environment, comprising instructions for defining a plurality of hypervisors, comprising at least one transient hypervisor; and concurrently executing portions of at least one Span VM, on at least a portion of the plurality of hypervisors, wherein the at least one Span VM has a single and consistent at least one of virtual memory, virtual CPU state, and input/output communication stream, coordinated by the plurality of hypervisors; dynamically injecting the at least one transient hypervisor under the at least one Span VM concurrently with at least one of execution and control of the at least one Span VM on another hypervisor; and dynamically removing the at least one transient hypervisor from under the at least one Span VM concurrently with execution of the at least one Span VM on another hypervisor.

The plurality of hypervisors may comprise at least two hypervisors having respectively different sets of execution privileges.

Existence of the plurality of hypervisors may be transparent to an application and/or operating system executing on the at least one Span VM.

The at least one Span VM may comprise a plurality of Span VMs, concurrently executing on each of the plurality of hypervisors The plurality of hypervisors may offer different services to the at least one Span VM.

One of the hypervisors, may executes under another of the hypervisors. For example, the transient hypervisor may execute on top of a higher privilege hypervisor.

The Span VM may have a single and consistent memory space shared by the plurality of hypervisors; a single and consistent set of I/O resources distributed across the plurality of hypervisors, and/or consistent states of virtual CPUs shared by the plurality of hypervisors.

A memory state, input-output resources, and/or virtual CPU scheduling for a plurality of virtual machines, comprising the at least one Span VM, may be managed by at least two of the plurality of hypervisors.

A first hypervisor may relay input/output requests on behalf of the at least one Span VM to a second hypervisor, which controls an input/output resource dependent thereon.

The first hypervisor may relay interrupts to the at least one Span VM on behalf of the second hypervisor.

Each of the plurality hypervisors may have a consistent view of the at least one Span VM's memory throughout execution.

The plurality of hypervisors may distribute responsibility for scheduling virtual CPUs and/or controlling input/output devices employed by the at least one Span VM.

The at least one Span VM may comprise a plurality of SpanVMs.

The plurality of hypervisors may comprise a plurality of transient hypervisors, and the at least one Span VM may be configured to execute on the plurality transient hypervisors, wherein the multi-hypervisor system is configured to remove a first transient hypervisor on which the at least one Span VM executes and inject a second transient hypervisor on which the at least one Span VM executes, thus permitting a transition of execution of the at least one Span VM substantially without interruption from the first transient hypervisor to the second hypervisor on a single multi-hypervisor system.

BRIEF DESCRIPTION OF THE DRAWINGS

FIG. 2 shows a screenshot of Span VM simultaneously using different services from two hypervisors.

FIGS. 13A-13C show Memory translation in single-level, nested, and Span VM. VA=Virtual Address; GA=Guest Address; L1A=L1 Address; PA=Physical Address.

DETAILED DESCRIPTION OF THE PREFERRED EMBODIMENTS

An important aspect of Span VMs is transparency. The guest OS and its applications can be unmodified and oblivious to being simultaneously controlled by multiple hypervisors, which includes L0 and any attached L1s. Hence the guest sees a virtual resource abstraction that is indistinguishable from that with a single hypervisor. For control of individual resources, this requirement is as follows.

Memory: All hypervisors must have the same consistent view of the guest memory.

VCPUs: All guest VCPUs must be controlled by one hypervisor at a given instant.

I/O Devices: Different virtual I/O devices of the same guest may be controlled exclusively by different hypervisors at a given instant.

Control Transfer: Control of guest VCPUs and/or virtual I/O devices can be transferred from one hypervisor to another, but only via L0.

[attach L1, Guest, Resource]: Gives L1 control over the Resource in Guest.

Resources include guest memory, VCPU, and I/O devices. Control over memory is shared among multiple attached L1s whereas control over guest VCPUs and virtual I/O devices is exclusive to an attached L1. Attaching to guest VCPUs or I/O device resources requires attaching to guest memory resource.

[detach L1, Guest, Resource]: Releases L1's control over Resource in Guest. Detaching from guest memory resource requires detaching from guest VCPUs and I/O devices.

[subscribe L1, Guest, Event, <GFN Range>] Registers L1 with L0 to receive Event from Guest. The GFN Range option specifies the range of frames in guest address space on which to track the memory event. Presently we support only memory event subscription. Other guest events of interest could include SYSENTER instructions, port-mapped I/O, etc.

[unsubscribe L1, Guest, Event, <GFN Range>] Unsubscribes L1 Guest Event.

Figure 11:
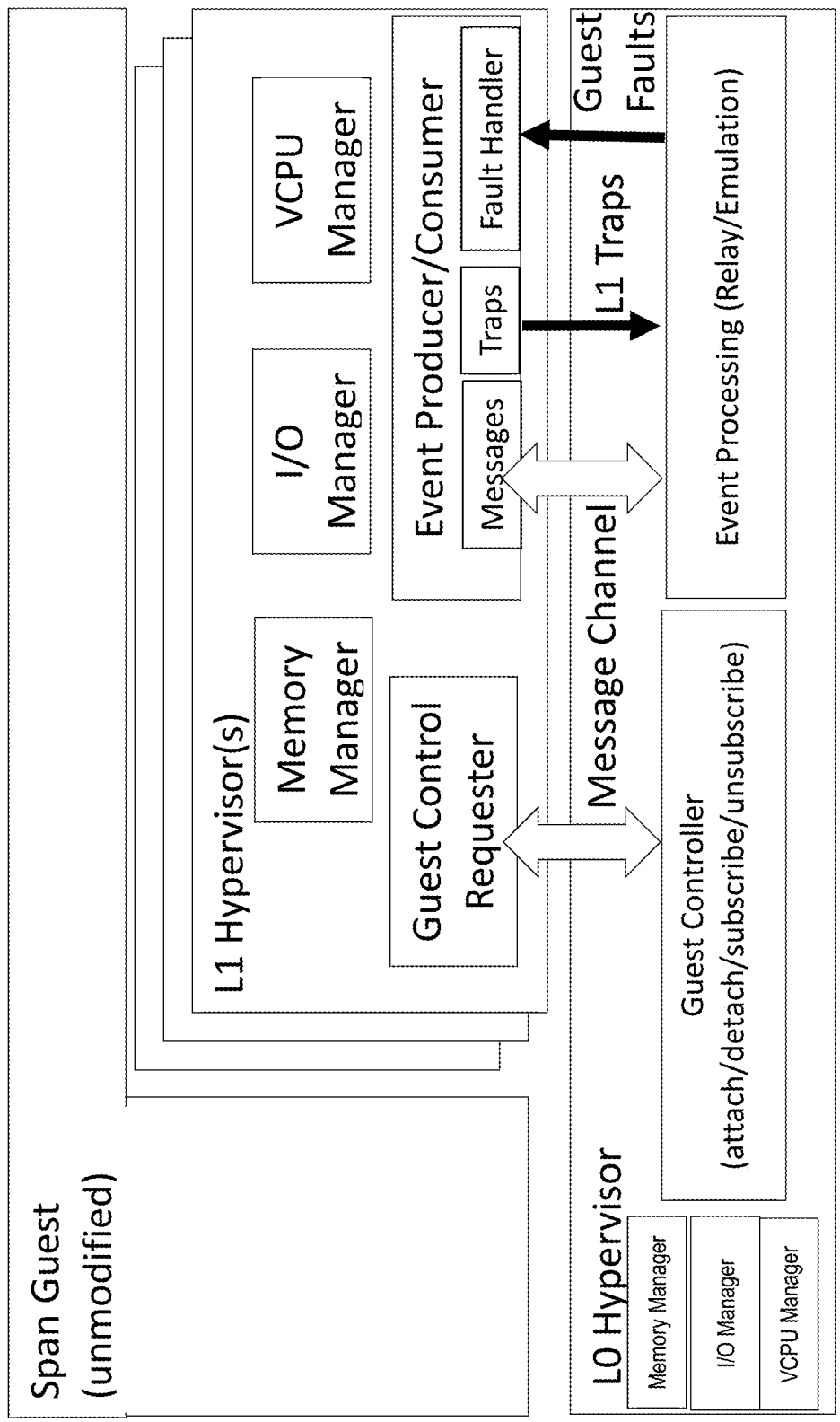
FIG. 11 shows a high-level architecture for Span virtualization.
Figure 12:
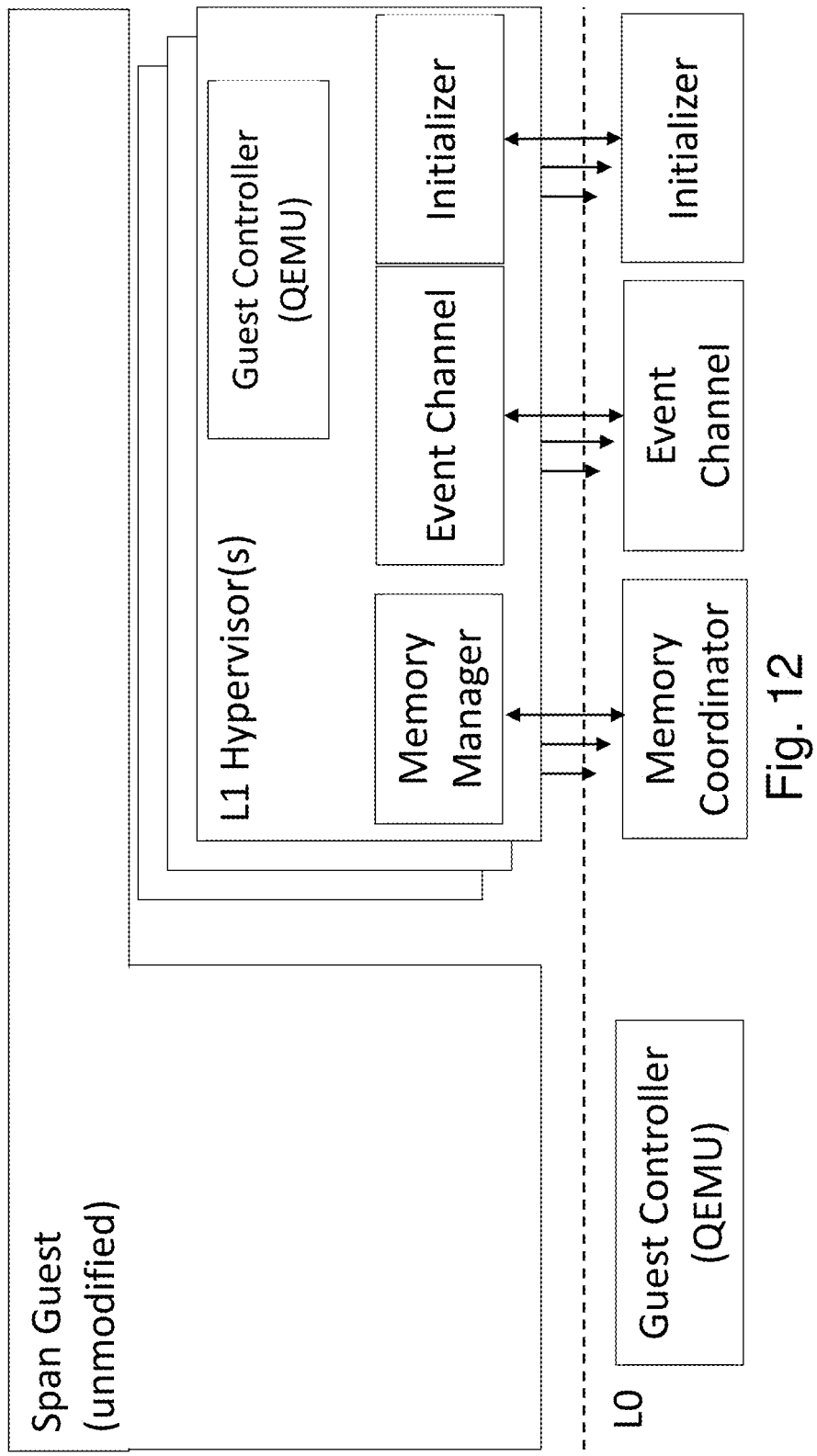
FIG. 12 shows a schematic drawings of a Span VM implementation.

FIG. 11 shows the high-level architecture for Span virtualization, and FIG. 12 shows a Span virtualization implementation. A Span guest begins as a single-level VM on L0. One or more L1s can then attach to one or more guest resources and optionally subscribe with L0 for specific guest events.

Guest Control Operations: The Guest Controller in L0 supervises control over a guest by multiple L1s through the following operations.

The Guest Controller also uses administrative policies to resolve a priori any potential conflicts over a guest control by multiple L1s. While this paper focuses on mechanisms rather than specific policies, we note that the problem of conflict resolution among services is not unique to Span. Alternative techniques also need ways to prevent conflicting services from controlling the same guest.

Isolation and Communication: Another design goal is to compartmentalize L1 services, from each other and from L0. First, L1s must have lower execution privilege compared to L0. Secondly, L1s must remain isolated from each other. These two goals are achieved by depriviliging L1s using nested virtualization and executing them as separate guests on L0. Finally, L1s must remain unaware of each other during execution. This goal is achieved by requiring L1s to receive only via L0, any subscribed guest events that are generated on other L1s. There are two ways that L0 communicates with L1s: implicitly via traps and explicitly via messages. Traps allow L0 to transparently intercept certain memory management operations by L1 on the guest. Explicit messages allow an L1 to directly request guest control from L0. An Event Processing module in L0 traps runtime updates to guest memory mappings by any L1 and synchronizes guest mappings across different L1s. The event processing module also relays guest memory faults that need to be handled by L1. A bidirectional Message Channel relays explicit messages between L0 and L1s including attach/detach requests, memory event subscription/notification, guest I/O requests, and virtual interrupts. Some explicit messages, such as guest I/O requests and virtual interrupts, could be replaced with implicit traps.

Continuous vs. Transient Control

Span virtualization allows L1's control over guest resources to be either continuous or transient. Continuous control means that an L1 exerts control over one or more guest resources for an extended period of time. For example, an intrusion detection service in L1 that must monitor guest system calls, VM exits, or network traffic, would require continuous control of guest memory, VCPUs, and network device. Transient control means that an L1 acquires full control over guest resources for a brief duration, provides a short service to the guest, and releases guest control back to L0. For instance, an L1 that must periodically checkpoint the guest would need transient control of guest memory, VCPUs, and I/O devices.

Memory Management

A Span VM has a single guest address space which is mapped into the address space of all attached L1s. Thus any memory write on a guest page is immediately visible to all hypervisors controlling the guest. Thus horizontal layering provides the same visibility into the guest memory for all L1s, unlike vertical stacking which somewhat obscures the guest to lower layers.

Traditional Memory Translation

In modern x86 processors, hypervisors manage the physical memory that a guest can access using a virtualization feature called Extended Page Tables (EPT) [34], also called Nested Page Tables in AMD-V [1].

Single-Level Virtualization

FIGS. 13A-13C show memory translation in single-level, nested, and Span VM. VA=Virtual Address; GA=Guest Address; L1A=L1 Address; PA=Physical Address.

FIG. 13A shows that for single-level virtualization the guest page tables map virtual addresses to guest addresses (VA to GA). The hypervisor uses an EPT (one per guest) to map guest addresses to physical addresses (GA to PA). Guest memory permissions are controlled through the combination of permissions in the guest page table and EPT.

Whenever the guest attempts to access a page that is either not present or protected in the EPT, the hardware generates an EPT fault and traps into the hypervisor, which handles the fault by mapping a new page, emulating an instruction, or taking other actions. On the other hand, the hypervisor grants complete control over the traditional paging hardware (e.g., cr3) to the guest. A guest OS is free to maintain the mappings between its virtual and guest address space and update them as it sees fit, without trapping into the hypervisor.

Nested Virtualization:

FIG. 13B shows that for nested virtualization, the guest is similarly granted control over the traditional paging hardware to map virtual addresses to its guest address space. L1 maintains a Virtual EPT to map the guest pages to pages in L1's addresses space (or L1 pages). Finally, one more translation is required: L0 maintains another EPT ($EPT_{L1}$) to map L1 pages to physical pages. However, x86 processors can translate only two levels of addresses in hardware (from guest virtual to guest physical to host physical address). Hence the Virtual EPT maintained by L1 needs to be shadowed by L0, meaning that the Virtual EPT and $EPT_{L1}$ must be compacted by L0 during runtime into a Shadow EPT that directly maps guest pages to physical pages. To accomplish this, manipulations to the Virtual EPT by L1 trigger traps to L0. Whenever L1 loads a Virtual EPT, L0 receives a trap and activates the appropriate Shadow EPT. This style of nested page table management is also called multi-dimensional paging.

EPT faults on guest memory can be due to (a) the guest accessing its own pages that have missing/invalid Shadow EPT entries, and (b) the L1 directly accessing guest pages that have missing/invalid $EPT_{L1}$ entries to perform tasks such as I/O processing and VM introspection (VMI). Both kinds of EPT faults are first intercepted by L0. L0 examines a Shadow EPT fault to further determine whether it is due to missing/invalid Virtual EPT entry; such faults are forwarded to L1 for processing. Otherwise, faults due to missing/invalid $EPT_{L1}$ entries are handled by L0.

Memory Translation for Span VMs

In Span virtualization, L0 extends nested EPT management to guests that are controlled by multiple hypervisors. FIG. 13C shows that a Span guest has multiple Shadow EPTs, one per L1. A virtual address in a Span guest leads to the same physical address irrespective of which Virtual EPT is used for the translation. A Virtual EPT in L1 and its corresponding Shadow EPT in L0 are used when an L1 acquires control over guest VCPUs. In addition, an $EPT_{Guest}$ is maintained by L0 for direct guest execution on L0. These multiple Shadow EPTs and $EPT_{Guest}$ are kept synchronized by L0 so that every hypervisor sees a consistent mapping of guest memory.

Memory Attach and Detach

A Span VM is initially created directly on L0 as a single-level guest for which the L0 constructs a regular EPT. To attach to the guest memory, a new L1 requests L0 to map guest pages into L1 address space.

Figure 14:
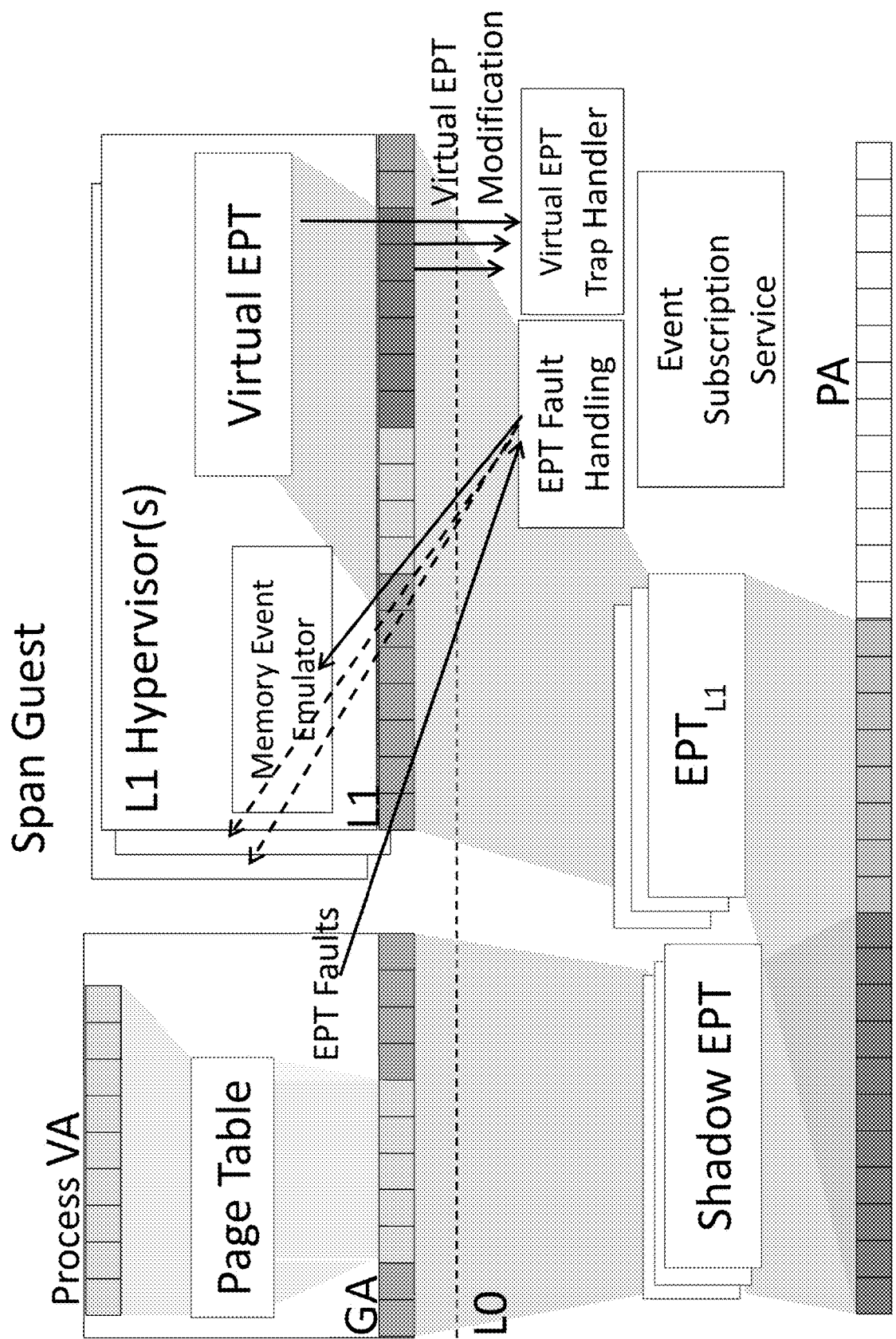
FIG. 14 shows memory organization of a span guest.

FIG. 14 shows this is accomplished by L1 reserving a range in L1 address space for guest memory and then informing L0 of this range. Next, L1 constructs a Virtual EPT for the guest which is shadowed by L0 (as in the nested case). Note that the reservation in L1 address space does not immediately allocate physical memory.

Rather, physical memory is allocated lazily upon guest memory faults. L0 dynamically populates the reserved address range in L1 by adjusting the mappings in $EPT_{L1}$ and Shadow EPT. A memory-detach operation correspondingly undoes the $EPT_{L1}$ mappings for guest and releases the reserved L1 address range.

Figure 15A:
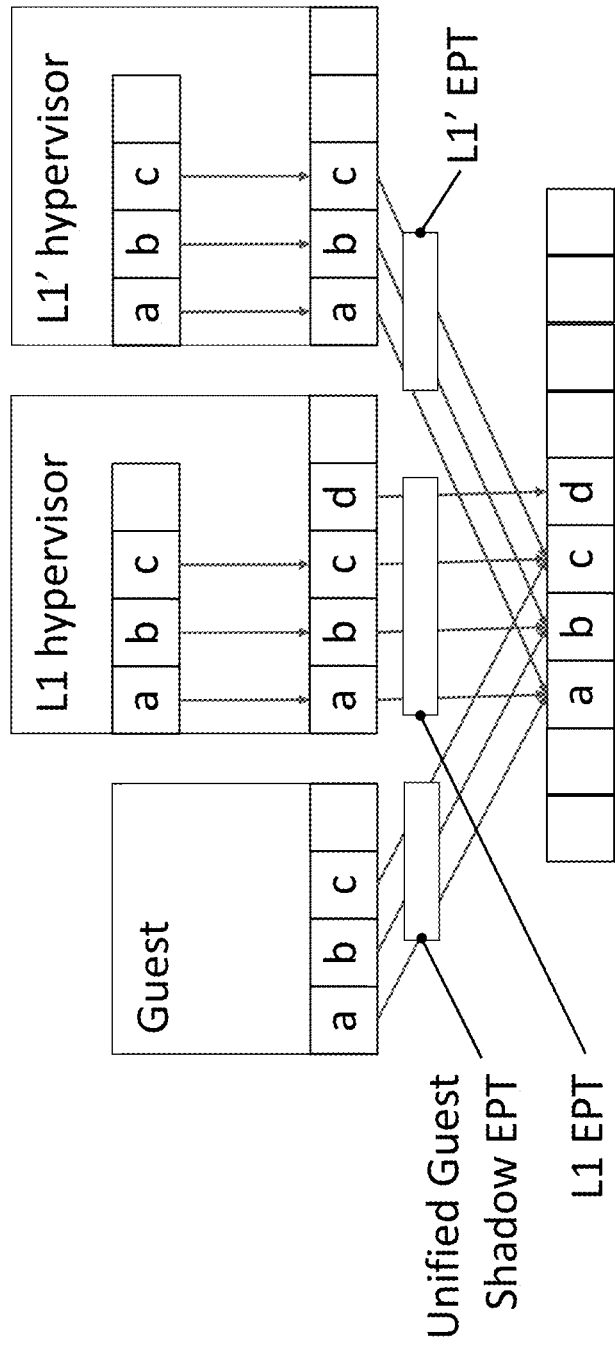
FIG. 15A shows how a Span VM's memory pages are co-mapped by multiple co-located hypervisors.

FIG. 15A shows how a Span VM's memory pages are co-mapped by multiple co-located hypervisors.

Figure 15B:
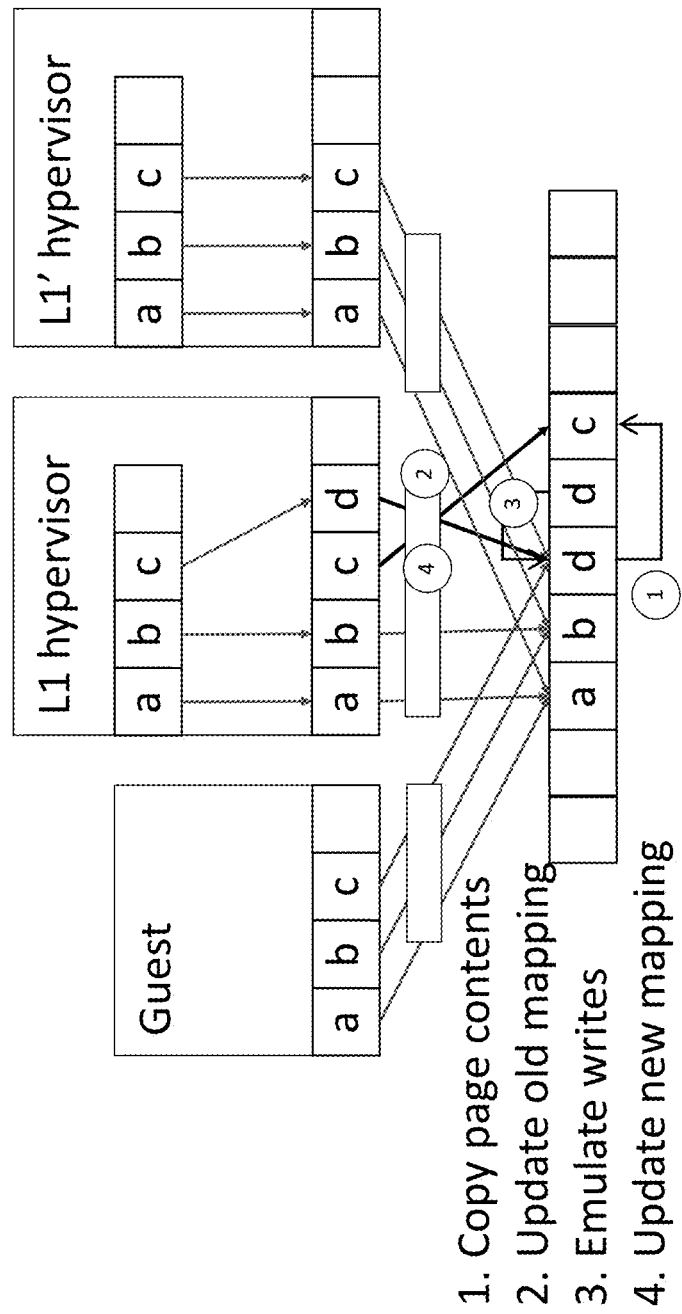
FIG. 15B shows how the L0 hypervisor coordinates the remapping of a Span VM's memory pages by an L1 hypervisor.

FIG. 15B shows how the L0 hypervisor coordinates the remapping of a Span VM's memory pages by an L1 hypervisor.

Synchronizing Guest Memory Maps

To enforce a consistent view of guest memory, L0 synchronizes guest memory mappings across all L1s upon two events: (a) faults on guest pages, and (b) modifications of Virtual EPT (in L1) or regular guest EPT (in L0).

Faults on Guest Pages

A "not present" fault on a guest page can be triggered against either a Shadow EPT (fault by guest) or an EPT (fault by L1). Fault handling for Span VMs extends the corresponding mechanism for nested VMs described earlier. The key difference in the Span case is that the L0 first checks if a host physical page has already been mapped to the faulting guest page. If so, the existing physical page mapping is used to resolve the fault, else a new physical page is allocated. Thus all parties—the guest, its L1s, and L0 will see identically mapped guest pages regardless of where they are accessed.

Virtual EPT Modifications

Figure 4:
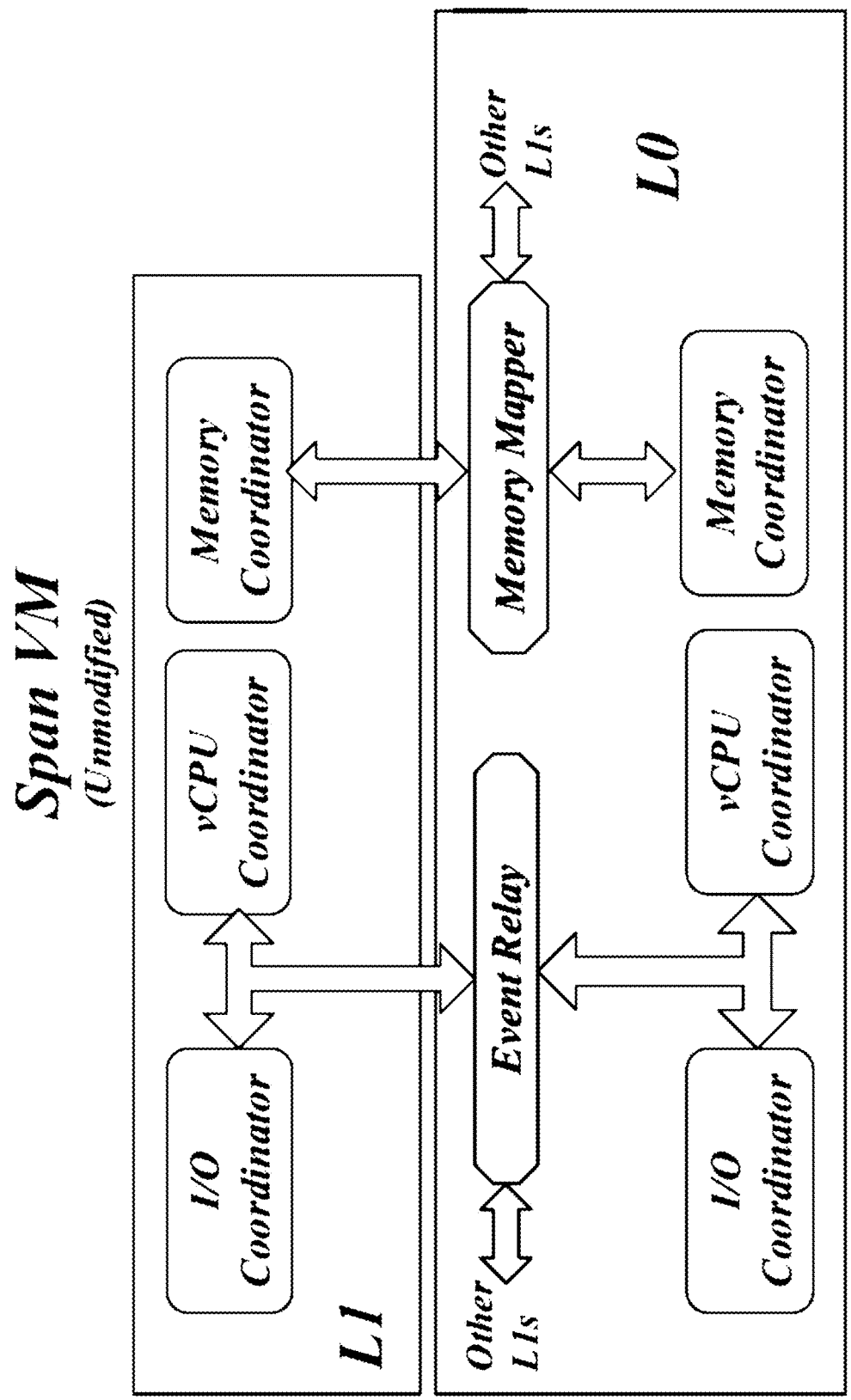
FIG. 4 shows a schematic diagram of a high-level architecture for Span VM running on 2 hypervisors; L0 and L1.
Figure 5:
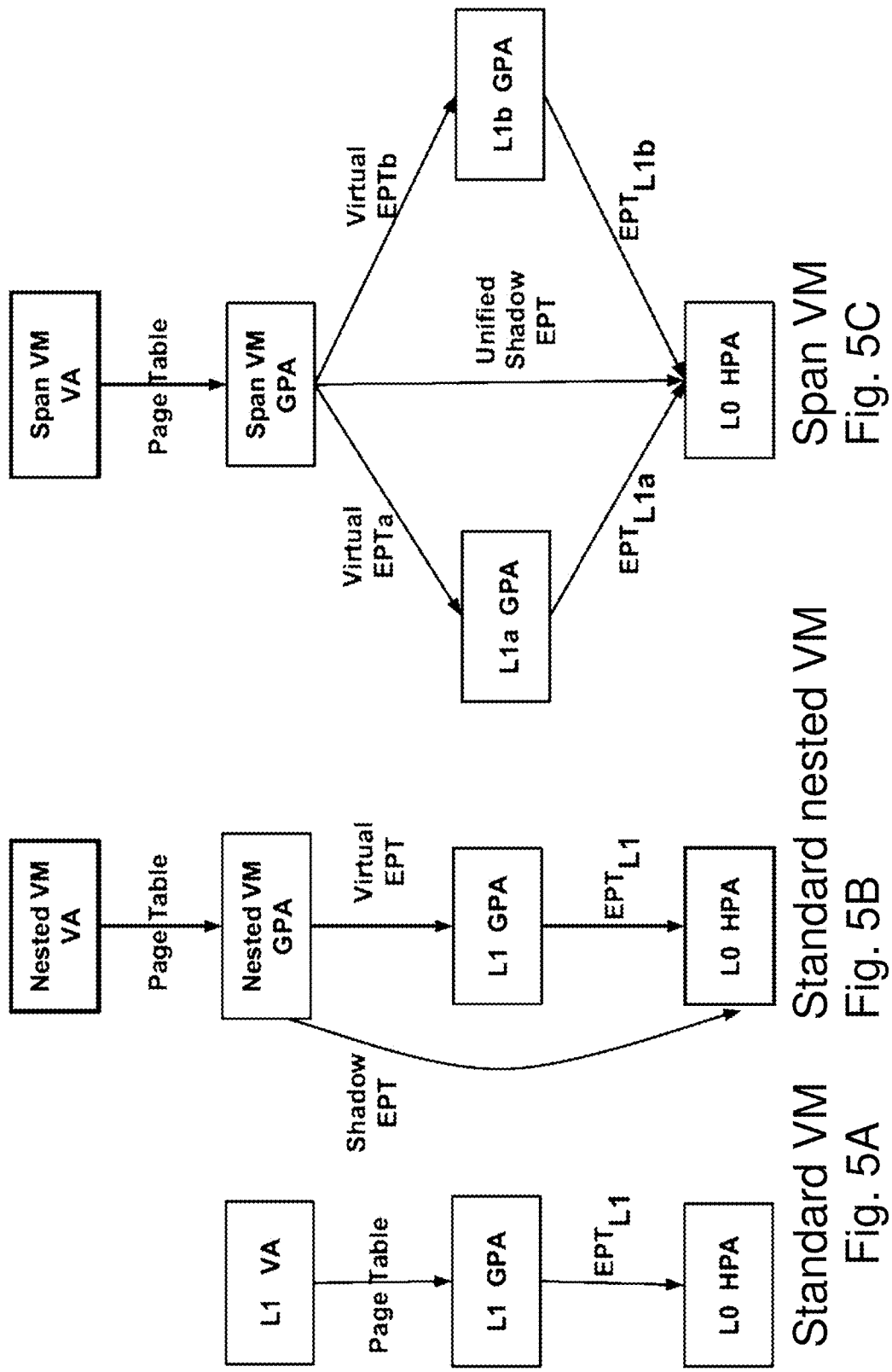
FIGS. 5A, 5B and 5C show schematic diagrams of memory translation in a standard VM, a standard nested VM, and a span VM, respectively (VA=Virtual Address; GPA=Guest Physical Address; HPA=Host Physical Address).

L1 may modify the Virtual EPT it maintains for the guest in the course of per performing its own memory management. However, since the Virtual EPT is shadowed by L0, all Virtual EPT modifications cause traps to L0 for validation. A Virtual EPT trap handler in L0, shown in FIG. 4, checks these modifications to ensure that the reserved L1 page backing a given guest page is backed by the same physical page across all attached L1s. When L0 traps a Virtual EPT permission modification, it updates the guest page permissions in the Shadow EPT and $EPT_{L1}$ s entries to the new least permissive combination.

Memory Event Subscription

An L1 attached to a guest may wish to monitor and control memory-related events of a guest to provide certain service. For instance, an L1 that provides live check-pointing or guest mirroring may need to perform dirty page tracking in which pages written to by the guest are periodically recorded so they can be incrementally copied. An L1 performing intrusion detection using introspection might wish to monitor pages from which guest attempts to execute code.

In Span virtualization, since multiple L1s can be attached to a guest, the L1 controlling the guest VCPUs may differ from the L1s requiring memory event notification. Hence L0 provides Memory Event Subscription to enable L1s to independently subscribe to guest memory events. L1 sends L0 a subscription request of the form [L1 ID, Guest ID, event type, guest page range] through the message channel. For example, to perform dirty page tracking, a subscription request from L1 would be [L1 ID, Guest ID, write event, all guest pages]. Or to monitor and validate kernel code execution the request would be [L1 ID, Guest ID, execute event, kernel pages]. When L0 receives an event, it delivers the event to the L1 subscribers as the tuple {Guest ID, guest page number, event type} via the message channel. Upon receiving a notification, a memory event emulator in L1 handles the event and responds back to L0 with the tuple {allow/disallow, maintain/cancel}. The response fields tell L0 whether to allow or disallow guest memory access to the page and whether to maintain or discontinue L1's event subscription on the notified guest page. For example, upon receiving a write event notification for dirty page tracking, an L1 will reply to L0 with {allow,cancel}, which means allow guest to write to the page and cancel the subscription on this page.

L0 concurrently delivers event notifications to all L1 subscribers. Guest memory access is allowed to proceed only if all attached L1s allow the event in their response. To intercept a subscribed memory event, L0 updates the guest page permissions in every Shadow EPT with the corresponding event mask. L0 also applies the event mask to guest page entries in each attached L1's EPTL1 to accurately capture accesses to guest memory generated by an L1 instead of the guest. For instance, to track write events on a guest page, either the permission bits for write access in the EPT entries could be turned off, or the EPT entry could be marked invalid. The original permissions are saved for later restoration when all subscriptions on the page are canceled.

I/O Control

Guests use para-virtual devices, which provide better performance than device emulation and provide greater physical device sharing among guests than direct device assignment.

Traditional I/O Virtualization

For single-level, the guest OS runs para-virtual frontend drivers, one for each virtual device, such as block and network devices. The hypervisor runs the corresponding backend driver. The frontend and the backend communicate via a shared ring buffer to issue I/O requests and receive responses. The frontend places an I/O request in the ring buffer and notifies the backend through a kick event, which triggers a VM exit to the hypervisor. The backend removes the I/O request from the ring buffer, completes the request, places the I/O response in the ring buffer, and injects an I/O completion interrupt to the guest. The interrupt handler in the frontend picks up the I/O response from the ring buffer for processing. For nested guests, para-virtual drivers are used at both levels.

Span I/O Virtualization

Figure 8:
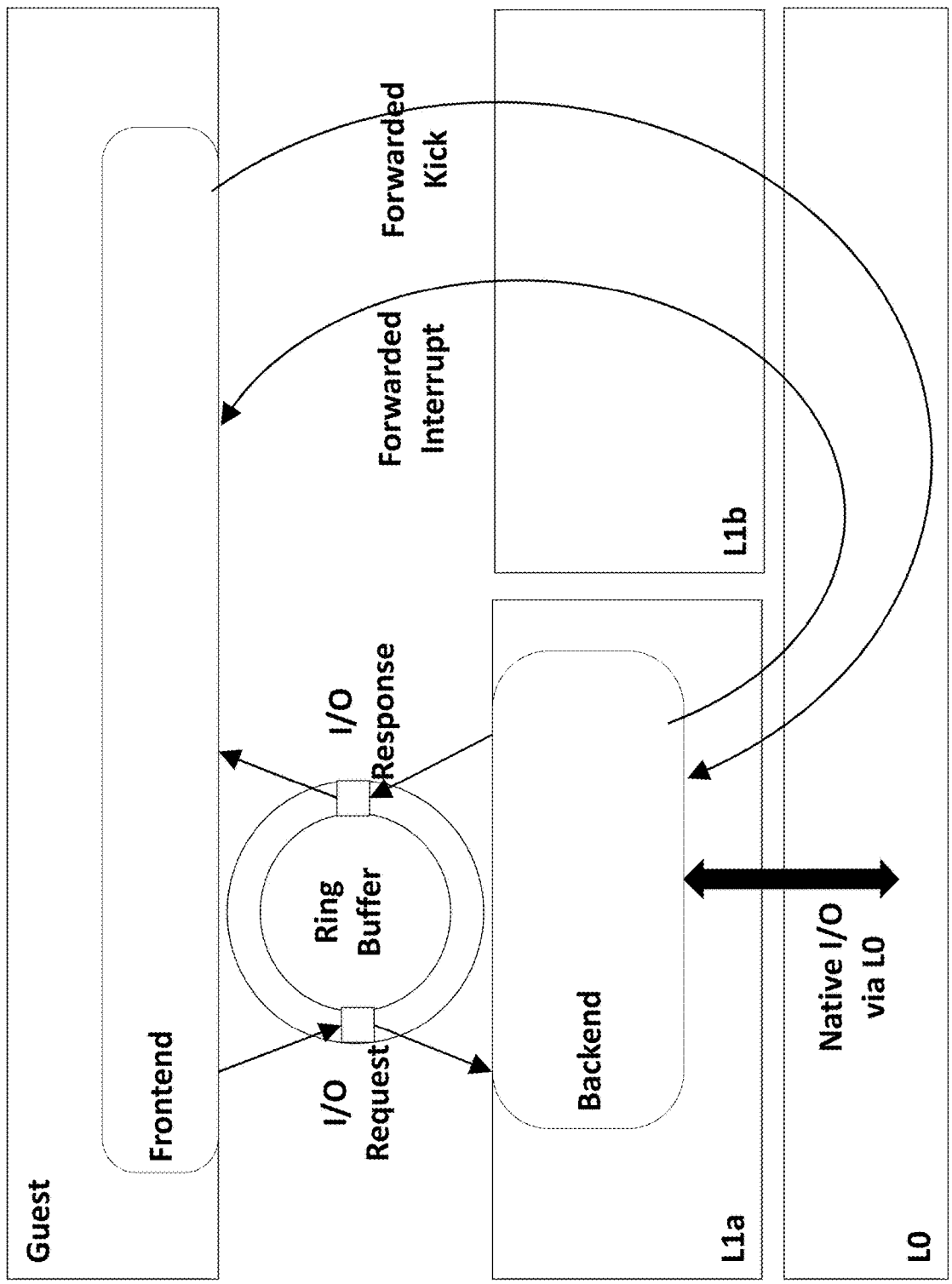
FIG. 8 shows paravirtual I/O for Span VMs. L1a controls the guest I/O device and L1b controls the VCPUs. Kicks from L1b and interrupts from L1a are forwarded via L0.

For Span guests, same or different L1s may control guest VCPUs and I/O devices. If the same L1 controls both guest VCPUs and the device backend then I/O processing proceeds as in the nested case. FIG. 8 illustrates the other case when different L1s control guest VCPUs and backend. L1a controls the backend and L1b controls the guest VCPUs. The frontend in guest and backend in L1a exchange I/O requests and responses via the ring buffer. However, I/O kicks are generated by guest VCPUs controlled by L1b, which forward the kicks to L1a. Likewise, L1a forwards any virtual device interrupt from the backend to L1b, which injects the interrupt to guest VCPUs. Kicks from the frontend and virtual interrupts from backend are forwarded between L1s via L0 using the Message Channel.

VCPU Control

In single-level virtualization, the L0 controls guest VCPUs via both spatial scheduling—VCPU to physical CPU (PCPU) assignment—and temporal scheduling—when and how long a VCPU remain mapped to a PCPU. In nested virtualization, L0 delegates guest VCPU scheduling to L1. L1 schedules guest VCPUs on L1's own VCPUs and L0 schedules L1's VCPUs on PCPUs. This hierarchical scheduling provides L1 some degree of control over customized scheduling for its guests. For a Span guest, all VCPUs may be controlled by any one of the hypervisors at an instant. When L0 initiates a Span VM, it initializes the memory state and all the VCPUs as it would for single-level guests. After the guest OS boots up, the control of guest VCPUs can be transferred to an L1 upon an attach request. L1s can relinquish control over guest VCPUs by sending a detach request. The L0 determines who controls the guest VCPUs based on the needs of the guest.

Implementation Details

Platform and Modifications

Figure 1:
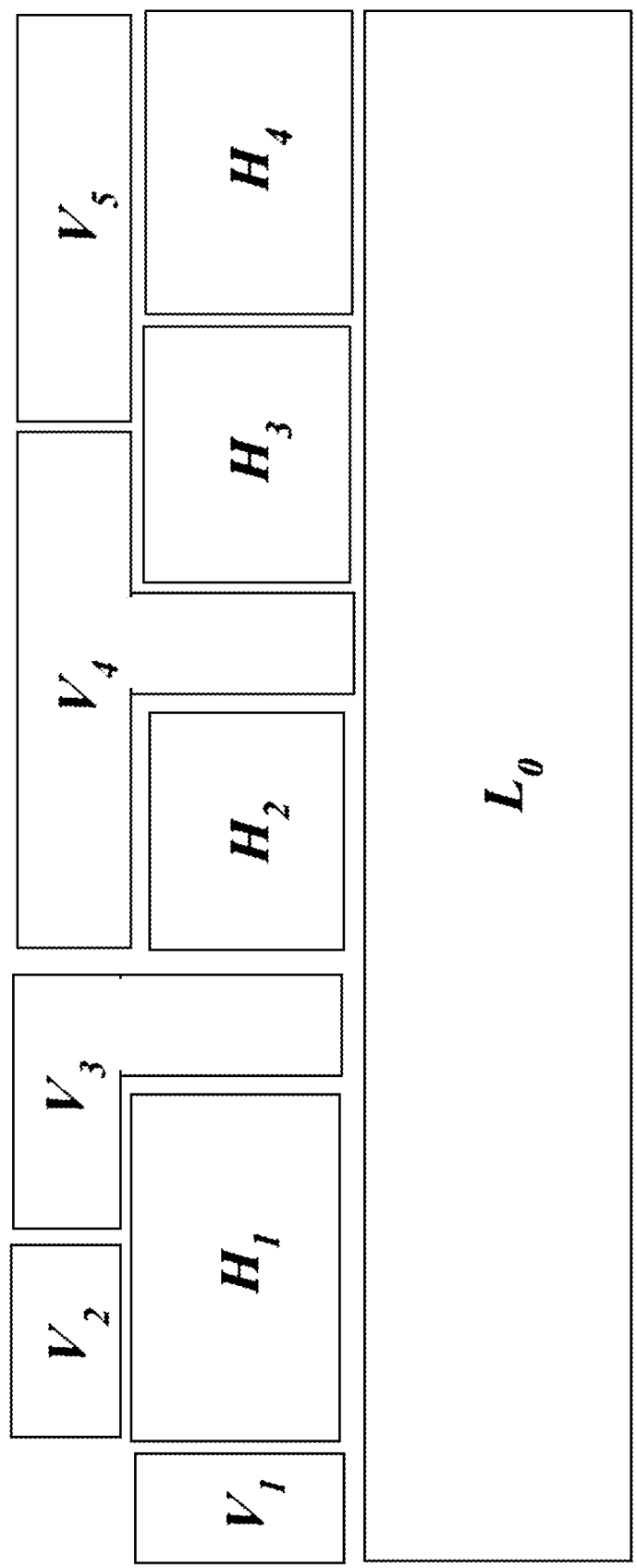
FIG. 1 shows a schematic diagram of VMs, in which V1 is a non-nested VM, V2 is a nested VM, and V3, V4, V5 are Multi-hypervisor VMs.
Figure 3:
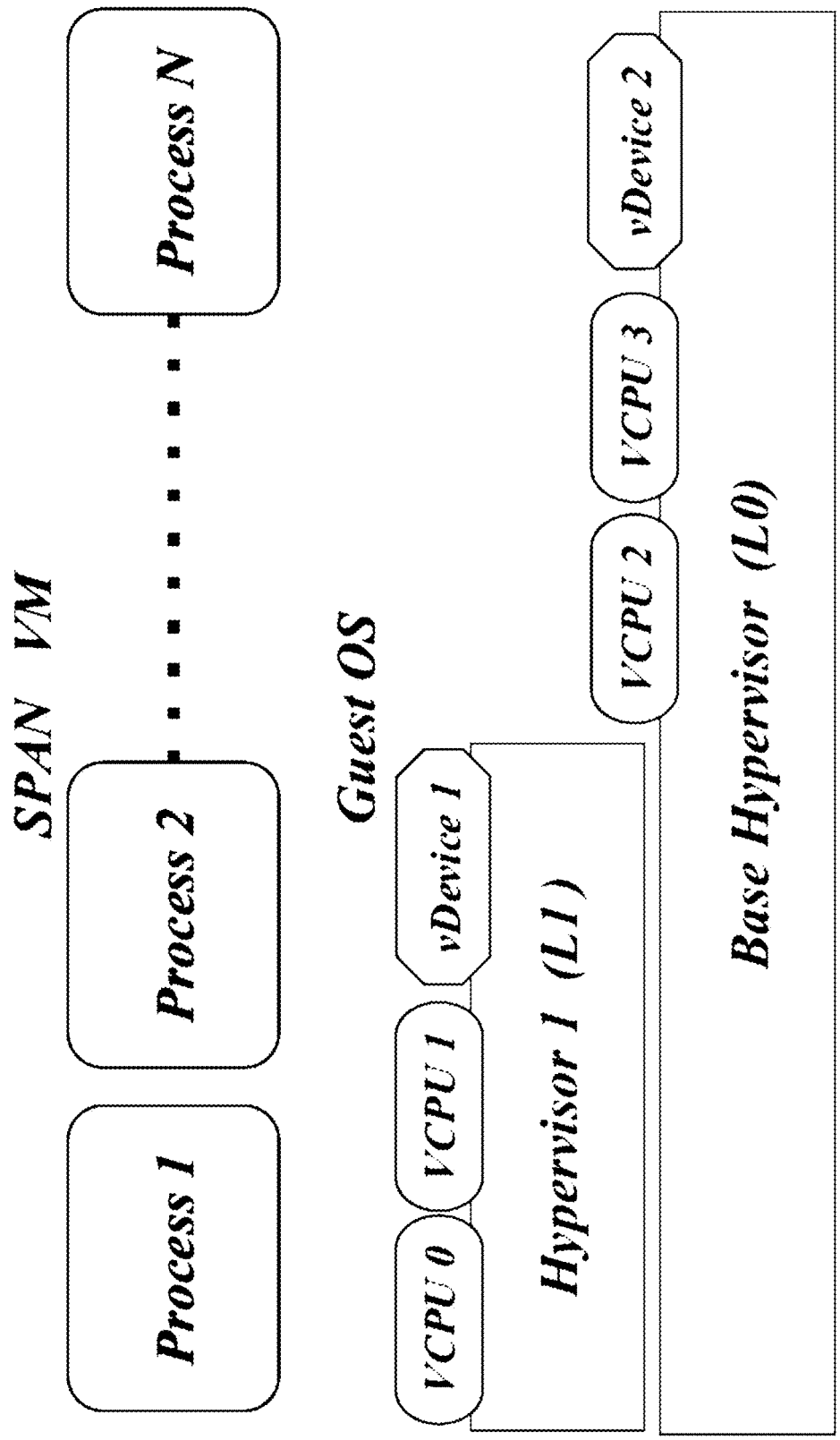
FIG. 3 shows a schematic diagram of resource control for Span VM running on 2 hypervisors: L0 and L1.
Figure 10:
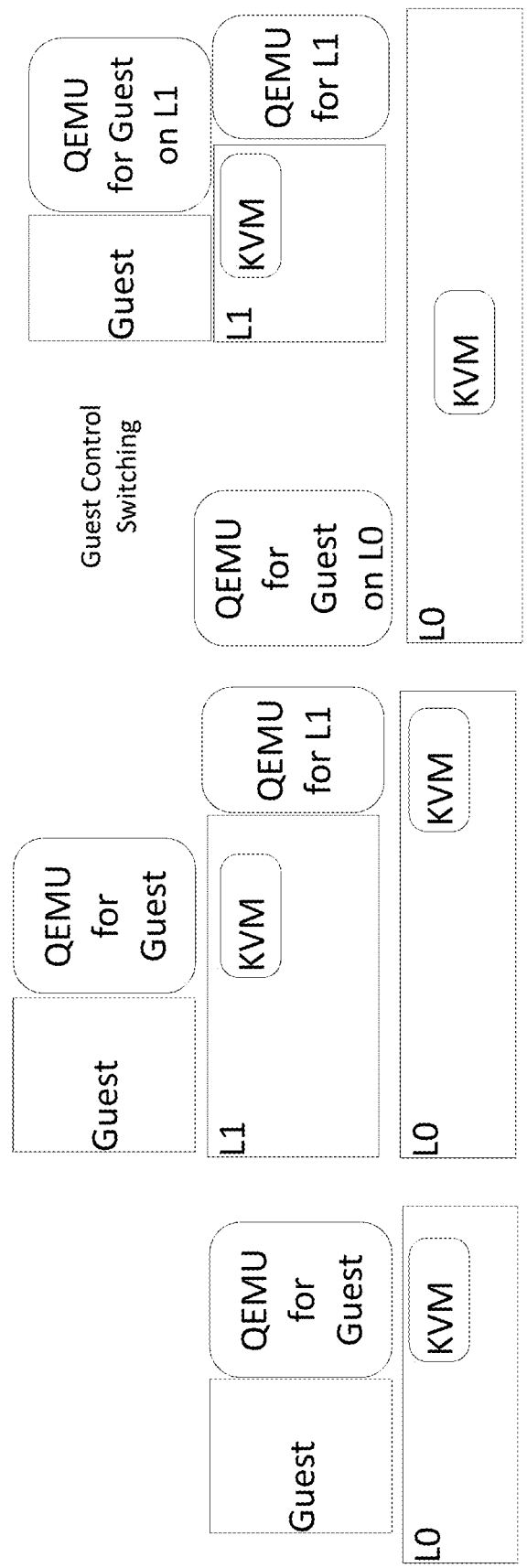
FIGS. 10A-10C, show a standard VM (10A), a standard nested VM (10B), guest control switching (10C) a Span VM.

A prototype implemented in accordance herewith supports running an unmodified Linux guest as a Span VM in modes V3, V4, and V5 from FIG. 1. The guest runs an Ubuntu 15.10 with Linux 4.2.0. The prototype for Span virtualization is implemented by modifying the KVM/QEMU nested virtualization support that is built into standard Linux distributions. See FIG. 10A. Currently both L0 and L1 use modified KVM/QEMU hypervisors in Linux, specifically QEMU-1.2.0, kvm-kmod-3.14.2 and Linux 3.14.2. The modifications are different for L0 and L1 layers. Ideally, we would prefer L1 to be unmodified to simplify its interface with L0. However, current hypervisors assume complete and exclusive guest control whereas Span allows L1s to exercise partial control over a subset of guest resources. Supporting partial guest control necessarily requires changes to L1 for attaching/detaching with a subset of guest resources and memory event subscription. In implementing L1 attach/detach operations on a guest, we tried, as much as possible, to reuse existing implementations of VM creation/termination operations.

Code Size and Memory Footprint

The implementation required about 2200 lines of code changes in KVM/QEMU, which is roughly 980+ lines in the L0 KVM, 500+ in L0 QEMU, 300+ in L1 KVM, 200+ in L1 QEMU, and 180+ in Virtio backend. Unnecessary kernel components were disabled in both L0 and L1 to reduce their footprint. An idle L0 was observed to have 600 MB usage at startup. When running an idle 4 GB Span guest attached to an idle 8 GB L1, the L0's memory usage increased to 1756 MB after excluding usage by the guest and the L1. The 8 GB L1's initial memory usage, as measured from L0, was 1 GB after excluding the guest footprint. This is an initial prototype to validate our ideas. The footprints of L0 and L1 could be further reduced using one of many lightweight Linux distributions.

Guest Controller

Figure 6:
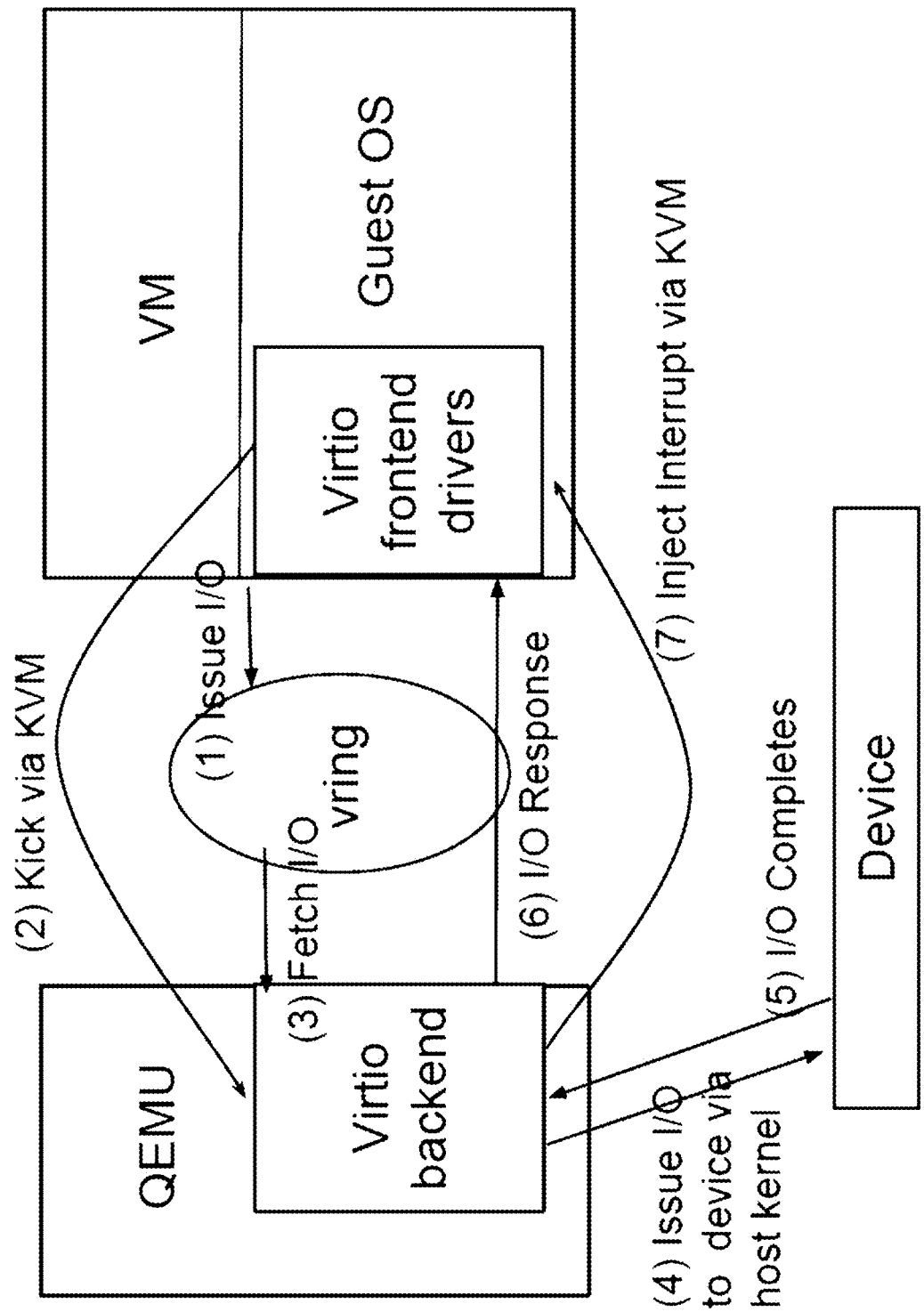
FIG. 6 shows a schematic diagram of standard paravirtual I/O operation
Figure 7:
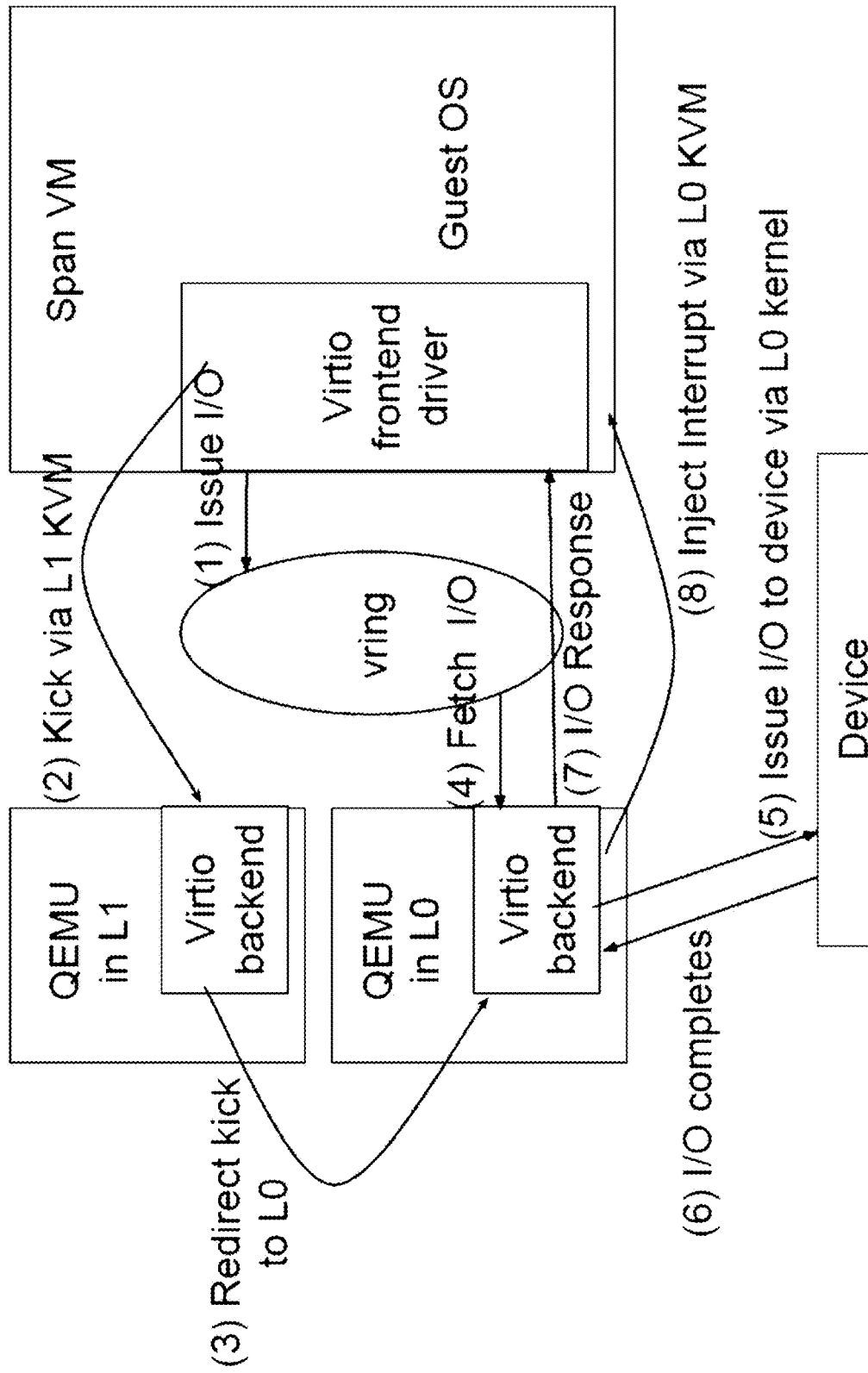
FIG. 7 shows a schematic diagram of paravirtual I/O operation with Span VMs. Kicks generated by the Span VM via L1 are redirected to QEMU at L0.
Figure 9:
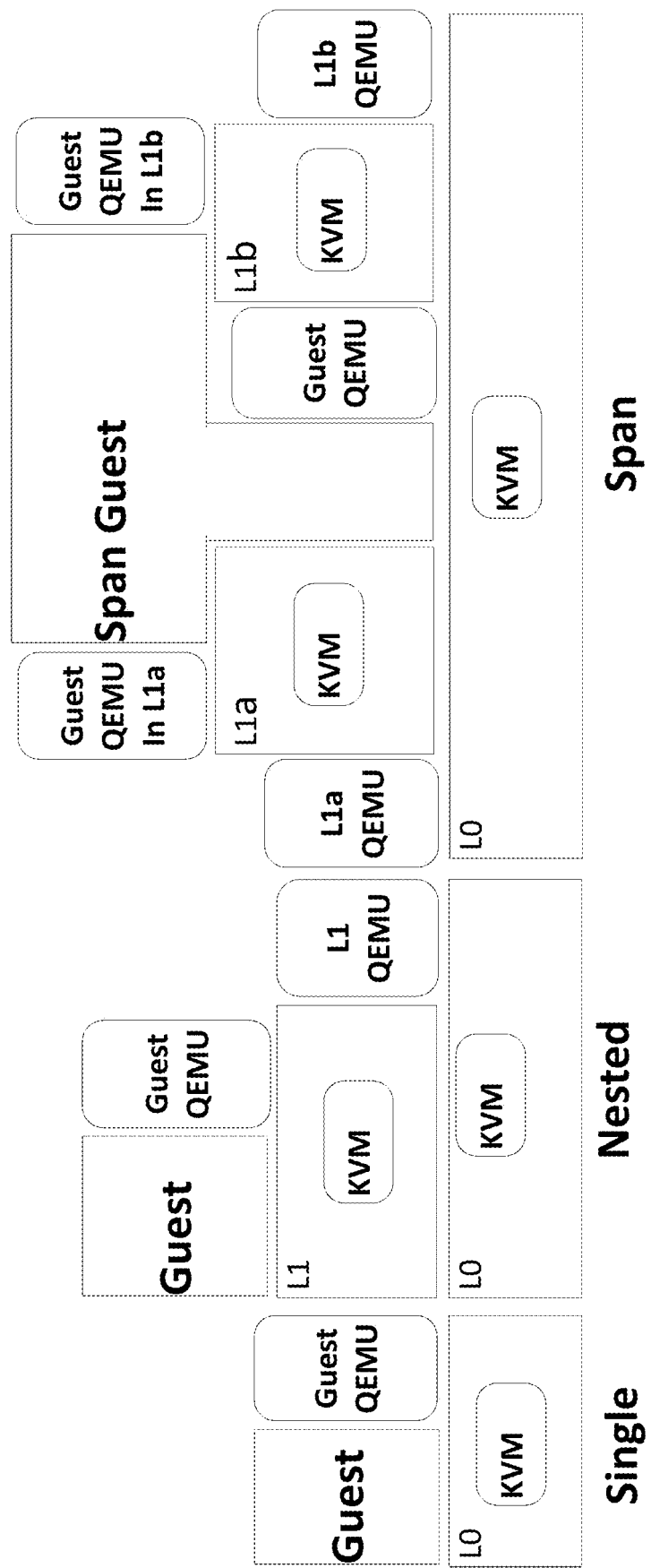
FIG. 9 shows Roles of QEMU (Guest Controller) and KVM (hypervisor) for Single-level, Nested, and Span VMs.

A user-level control process, that we call Guest Controller, runs on the hypervisor alongside each guest. See, FIG. 10B. In KVM/QEMU, the Guest Controller is a QEMU process which assists the KVM hypervisor with various control tasks on guest, including guest initialization and I/O emulation. FIG. 6 shows the position of Guest Controller in different virtualization models. In both single-level and nested virtualization, there is only one Guest Controller per guest, since each guest is completely controlled by one hypervisor. Additionally, in the nested case, each L1 has its own Guest Controller that runs on L0. See FIG. 10C. In Span virtualization, each guest is associated with multiple Guest Controllers, one per attached hypervisor. For instance, the Span Guest in FIG. 9 is associated with three Guest Controllers, one each on L0, L1a, and L1b. During attach/detach operations, the Guest Controller in L1 initiates the mapping/unmapping of guest memory into L1 address space and, if needed, acquiring/releasing control over guest's VCPU and virtual I/O devices. In addition, the Guest Controller can assist L1s with certain hypervisor-level services such as, checkpointing, migration, and dirty-page tracking.

Para-Virtual I/O Architecture

The QEMU Guest Controller also performs I/O emulation of virtual I/O devices controlled by its corresponding hypervisor. The para-virtual device driver is called Virtio in KVM/QEMU [54]. For nested guests, the Virtio drivers are used at two levels: once between L0 and L1 and again between L1 and guest. This design is also called virtio-over-virtio. Kick is implemented in Virtio as a software trap from the frontend leading to a VM exit to KVM, which delivers the kick to QEMU as a signal. Upon I/O completion, QEMU requests KVM to inject a virtual interrupt into the guest. Kicks and interrupts are forwarded across hypervisors using Message Channel. Redirected interrupts are received and injected into the guest by modifying KVM's virtual IOAPIC code.

VCPU Control

The Guest Controllers in different hypervisors communicate with the Guest Controller in L0 in acquiring or relinquishing guest VCPU control. The Guest Controller represents each guest VCPU as a user space thread. A newly attached L1 hypervisor does not initialize guest VCPU state from scratch. Rather, the Guest Controller in the L1 accepts a checkpointed guest VCPU state from its counterpart in L0 using a technique similar to that used for live VM migration between physical hosts. Unlike VM migration though, a subset of VCPUs can be transferred (instead of all) and memory transfer is replaced by the guest memory mapping mechanism described earlier. After guest VCPU states are transferred from L0 to L1, the L1 Guest Controller resumes the guest VCPU threads while the L0 Guest Controller pauses its VCPU threads. A VCPU detach operation similarly transfers a checkpoint of guest VCPU states from L1 to L0. Transfer of guest VCPU states from one L1 to another is presently accomplished through a combination of detaching the source L1 from the guest VCPUs followed by attaching to the destination L1 (although a direct transfer could be potentially more efficient).

Message Channel

The message channel between L0 and each L1 is implemented using a combination of hypercalls and UDP messages. Hypercalls from L1 to L0 are used for attach/detach operations on guest memory. UDP messages between L1 to L0 are used for relaying I/O requests, device interrupts, memory event subscription, attach/detach operations on guest VCPU and I/O devices. UDP messages are presently used for ease of implementation and will be replaced by better alternatives such as hypercalls, callbacks, or shared buffers.

Evaluation

Unmodified Span VMs can simultaneously use services from multiple L1s. Span guests perform comparably to traditional single-level and nested guests.

The experimental setup consists of a server containing dual six-core Intel Xeon 2.10 GHz CPUs, 128 GB memory and 1 Gbps Ethernet. The software configurations for L0, L1, and Span guest are as described earlier in Section 7. Each experimental data point is a mean (average) over at least five or more runs.

Span VM Demonstration

Span VM can transparently utilize services from multiple L1s.

An unmodified guest is controlled by three hypervisors, namely, the L0 and two L1s, L1a and L1b.

Use Case 1—Network Monitoring and VM Introspection

In the first use case, the two L1s passively examine the guest state, while L0 supervises resource control. L1a controls the guest's virtual network device whereas L1b controls the guest VCPUs. L1a performs network traffic monitoring by running the tcpdump tool to capture packets on the guest's virtual network interface.

Tcpdump is used as a stand-in [for more other more complex] packet filtering, and analysis tools.

L1b performs VM introspection (VMI) using a tool called Volatility that continuously inspects a guest's memory using a tool such as pmemsave to extract an accurate list of all processes running inside the guest.

The guest OS is infected by a rootkit, Kernel Beast, which can hide malicious activity and present an inaccurate process list to the compromised guest. Volatility, running in L1b, can nevertheless extract an accurate guest process list using VM introspection.

FIG. 2 shows a screenshot of this use case. The top window shows the tcpdump output in L1a, specifically the SSH traffic from the guest. The bottom right window shows that the rootkit KBeast in the guest OS hides a process "evil", i.e. it prevents the process "evil" from being listed using the ps command in the guest. The bottom left window shows that Volatility, running in L1b, successfully detects the process "evil" hidden by the KBeast rootkit in the guest.

This use case demonstrates several salient features of the Span VM design. First is that an unmodified guest executes correctly even though its resources are controlled by multiple hypervisors. Secondly, an L1 can transparently examine guest memory. Thirdly, an L1 controlling a guest virtual device (here network interface) can examine all I/O requests specific to the device even if the I/O requests are initiated from guest VCPUs controlled by another L1. This shows that I/O device can be delegated to an L1 that does not control the guest VCPUs.

Use Case 2—Guest Mirroring and VM Introspection

In this use case, we demonstrate an L1 that subscribes to guest memory events from L0. Hypervisors can provide a high availability service that protects unmodified guests from the failure of the physical machine.

Solutions, such as Remus, typically work by continually transferring live incremental checkpoints of the guest to a remote backup server, an operation called Guest Mirroring. When the primary VM fails, its backup image is activated, and the VM continues running as if failure never happened. To perform incremental checkpoints, hypervisors use a feature called dirty page tracking. The hypervisor maintains a dirty bitmap, i.e. the set of pages that were dirtied since the last checkpoint. The dirty bitmap is constructed by marking all guest pages read-only and recording dirtied pages upon write traps. The pages in the dirty bitmap are incrementally copied to backup server and the bitmap is reset.

As a first approximation of high availability, we implemented periodic Guest Mirroring as an L1 service by modifying the pre-copy live migration code in KVM/QEMU. In our setup, L1a performs Guest Mirroring for the Span guest while L1b runs Volatility. When L1b controls guest VCPU, L1a uses memory event subscription to track dirty guest pages. When L1a controls guest VCPU, it uses the standard approach of invalidating virtual EPT entries. L1a uses the dirty bitmap to periodically copy dirty guest pages to the backup server.

To compare the overhead of dirty page tracking using memory event subscription versus virtual EPT modification, the average bandwidth reported by iPerf client running in the guest when L1a performs Guest Mirroring was measured. The overhead varies based on checkpointing frequency. With a checkpointing frequency of 12 seconds, iPerf delivers 800 Mbps average bandwidth in both the cases. When checkpointing occurs every second, the average bandwidth is 800 Mbps when VCPU is controlled by L1a and 600 Mbps when VCPU is controlled by L1b, representing a 25% overhead due to memory event subscription with very high frequency checkpointing.

Use Case 3—Proactive Refresh

Hypervisor-level services may contain latent bugs, such as memory leaks, or other vulnerabilities that become worse over time, making a monolithic hypervisor unreliable for guests. Techniques like Microreboot and ReHype have been proposed to improve hypervisor availability, either proactively or post-failure. Span virtualization can compartmentalize unreliable hypervisor-level services in an isolated deprivileged L1.

Unreliable L1s can be proactively replaced with a fresh reliable instance while the guest and the base L0 hypervisor keep running. An old L1 (L1a) was attached to a 3 GB Span guest. To perform hypervisor refresh, a new (pre-booted) replacement hypervisor (L1b) was attached to the guest memory. Then L1a was detached from the guest by transferring guest VCPU and I/O devices to L1b via L0. The entire refresh operation from attaching L1b to detaching L1a completes on the average within 740 ms. Of this 670 ms is spent in attaching L1b to guest memory while the guest is running. The remaining 70 ms is the guest downtime due to the transfer of VCPU and I/O states. Thus Span virtualization achieves sub-second L1 refresh latency. If the replacement L1b was attached to guest memory well in advance, then the VCPU and I/O state transfer can be triggered on-demand by events, such as unusual memory pressure or CPU usage, yielding sub-100 ms guest downtime and event response latency. In contrast, using pre-copy to live migrate a guest from L1a to L1b takes tens to hundreds of seconds, depending on guest size and load.

Macro Benchmarks

Performance of macro benchmarks in Span VM were compared against native host (no guests), single-level, and nested guests. Table 2 shows the memory and processor assignments at each layer for each case. The guest always has 3 GB memory and one VCPU. L0 always has 128 GB and 12 physical CPU cores. In Nested configuration, L1 has 16 GB memory and 8 VCPUs. Finally, the guest VCPU in Span0 configuration is controlled by L0, and in Span1 by an L1. In both Span0 and Span1, L1a and L1b each have 8 GB memory and 4VCPUs, so their sums match L1 in Nested setting.

TABLE 2

Memory and CPU assignments for experiments.

| | L0 | | L1 | | L2 | |
|---|---|---|---|---|---|---|
| | Mem | CPUs | Mem | VCPUs | Mem | VCPUs |
| Host | 128 GB | 12 | N/A | N/A | N/A | N/A |
| Single | 128 GB | 12 | 3 GB | 1 | N/A | N/A |
| Nested | 128 GB | 12 | 16 GB | 8 | 3 GB | 1 |
| Span0 | 128 GB | 12 | 8 GB | 4 | 3 GB | 1 on L0 |
| Span1 | 128 GB | 12 | 8 GB | 4 | 3 GB | 1 on L1 |

The guest runs one of the following three benchmarks: (a) Kernbench compiles the Linux kernel. (b) Quicksort sorts 400 MB of data in memory. (c) iPerf measures network bandwidth to another host.

The benchmarks run in two modes: No-op Mode, when no hypervisor-level services run, and Service Mode, when network monitoring and VM introspection services run at either L0 or L1s. The figures report each benchmark's normalized performance against the best case, and system-wide average CPU utilization, measured in L0 using atop command each second during experiments.

Figure 16A:
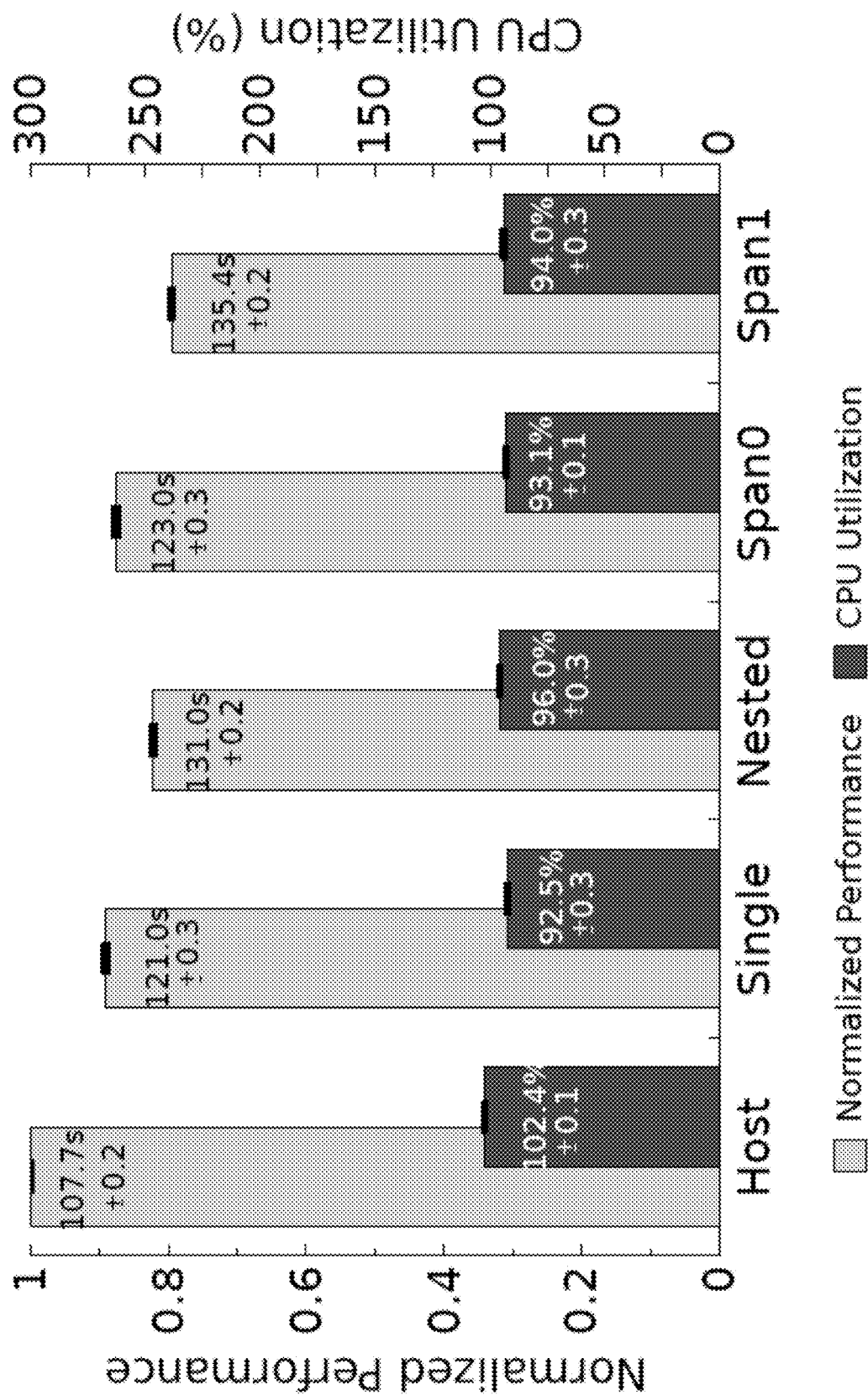
FIGS. 16A-16C show a No-op Mode: Normalized performance when no services run in host, L0, or L1s. The L0 controls the virtio block and network devices of the guest.
Figure 16B:
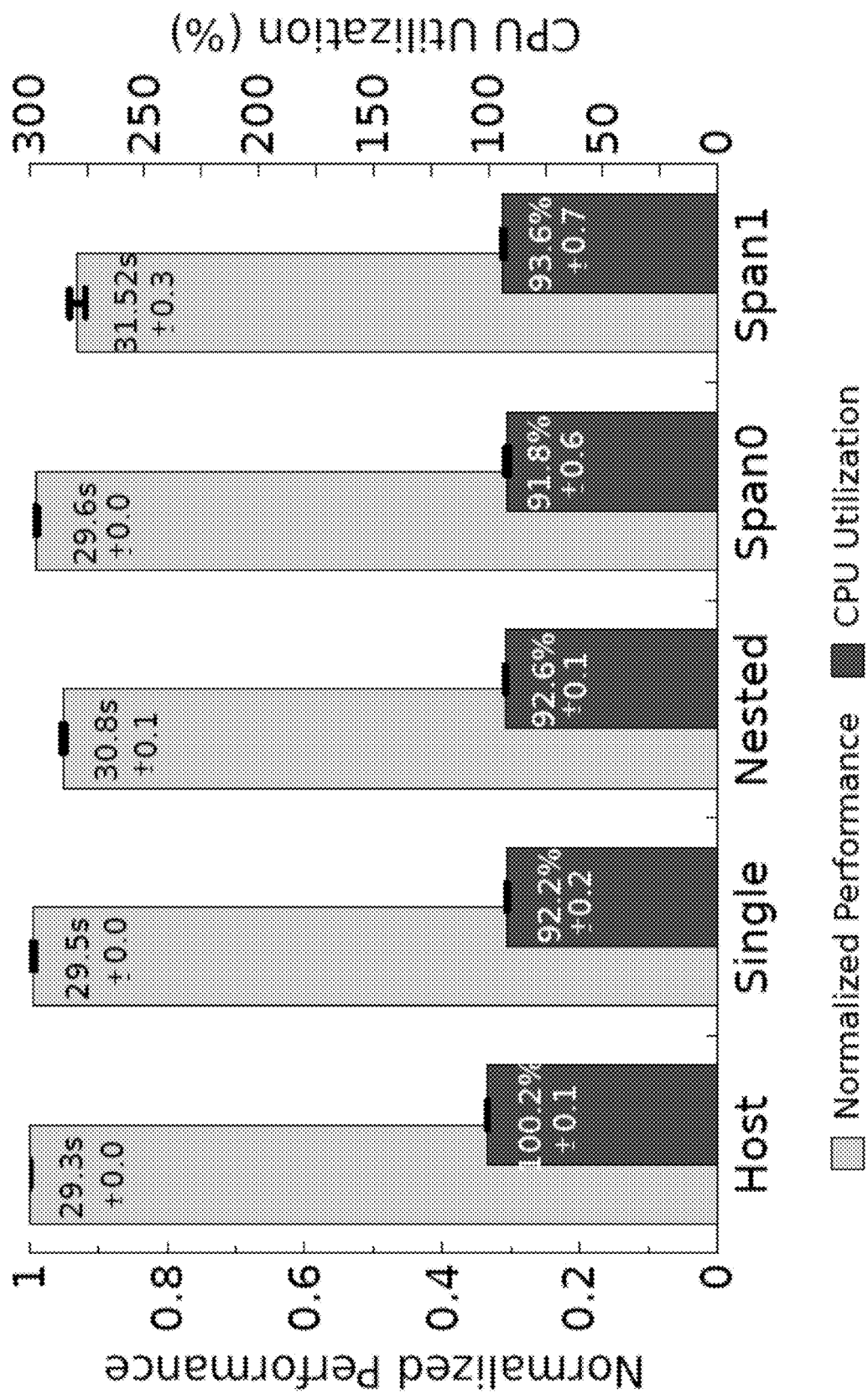

In both No-op mode (FIGS. 16A-16C) and Service mode (FIG. 17A-17C), all benchmarks perform comparably for Span0 and single-level guest with similar CPU utilization. Likewise, for Kernbench and Quicksort in both modes (FIGS. 16A, 16B and FIG. 17A, 17B, Span1 performs comparably with Nested setting.

For iPerf in No-op mode (FIG. 16C), The Span1 guest experiences about 6% degradation over the Nested guest with notable bandwidth fluctuation and 7% more CPU utilization. This is because guest's VCPU in Span1 is controlled by L1a, but guest's network device is controlled by L0. Hence, guest I/O requests (kicks) and responses are forwarded from L1a to L0 via the Message Channel. The Message Channel is currently implemented using UDP messages which compete with guest's iPerf client traffic on the L1's virtio interface with L0. If L1a controls the guest network device as well, then iPerf in Span1 guest performs as well as in Nested guest.

For iPerf in Service mode (FIG. 17C), Nested, Span0, and Span1 guests perform about 14-15% worse than the Single-level guest, mainly due to the combined effect of virtio-over-virtio and tcpdump running in L1. Further, for Span0, guest VCPU is controlled by L0 whereas the network device is controlled by L1a. Thus forwarding of I/O kicks and interrupts between L0 and L1a (via UDP-based Message Channel) balance out any gains from guest VCPUs running on L0.

Figure 16C:
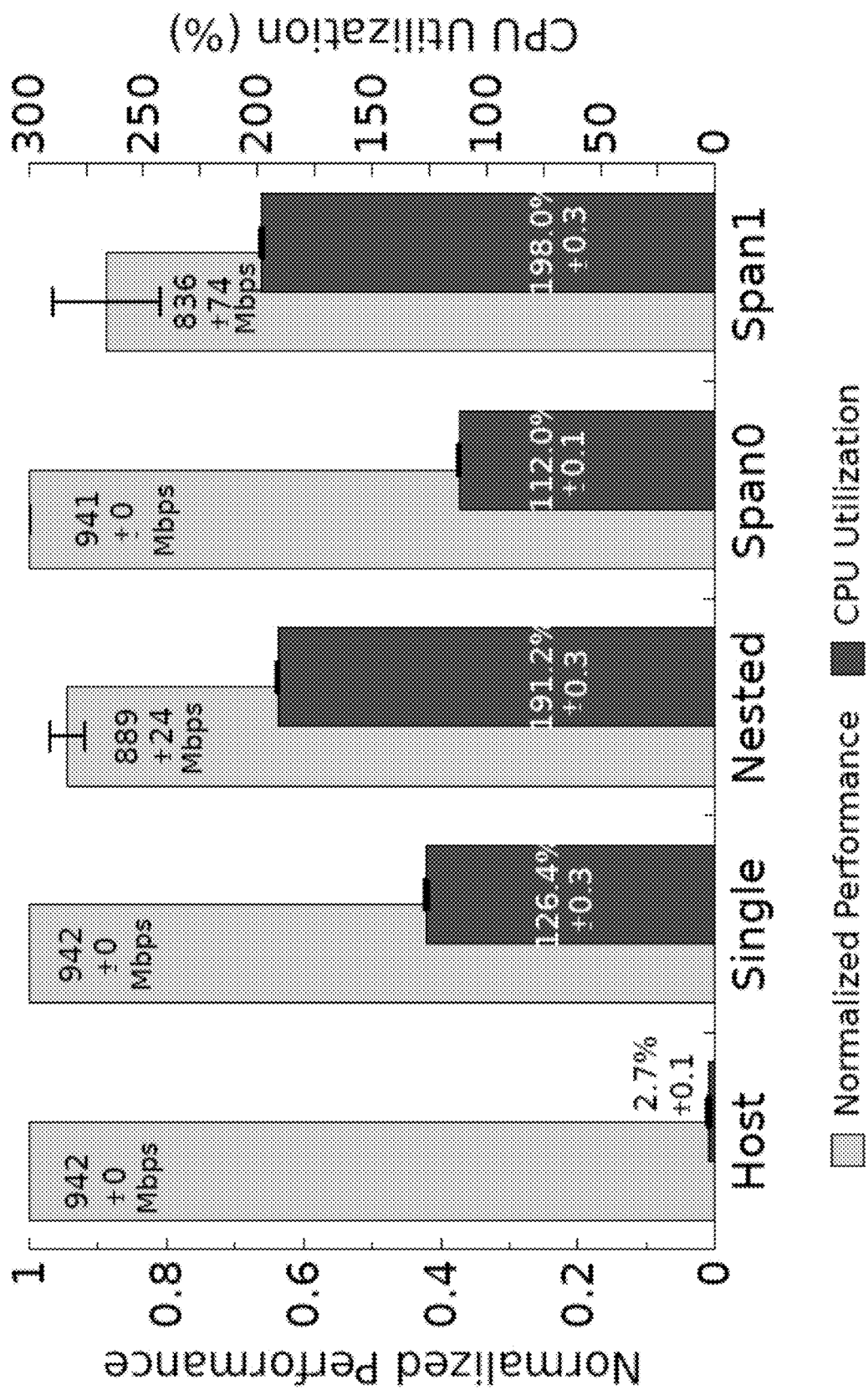
Figure 17A:
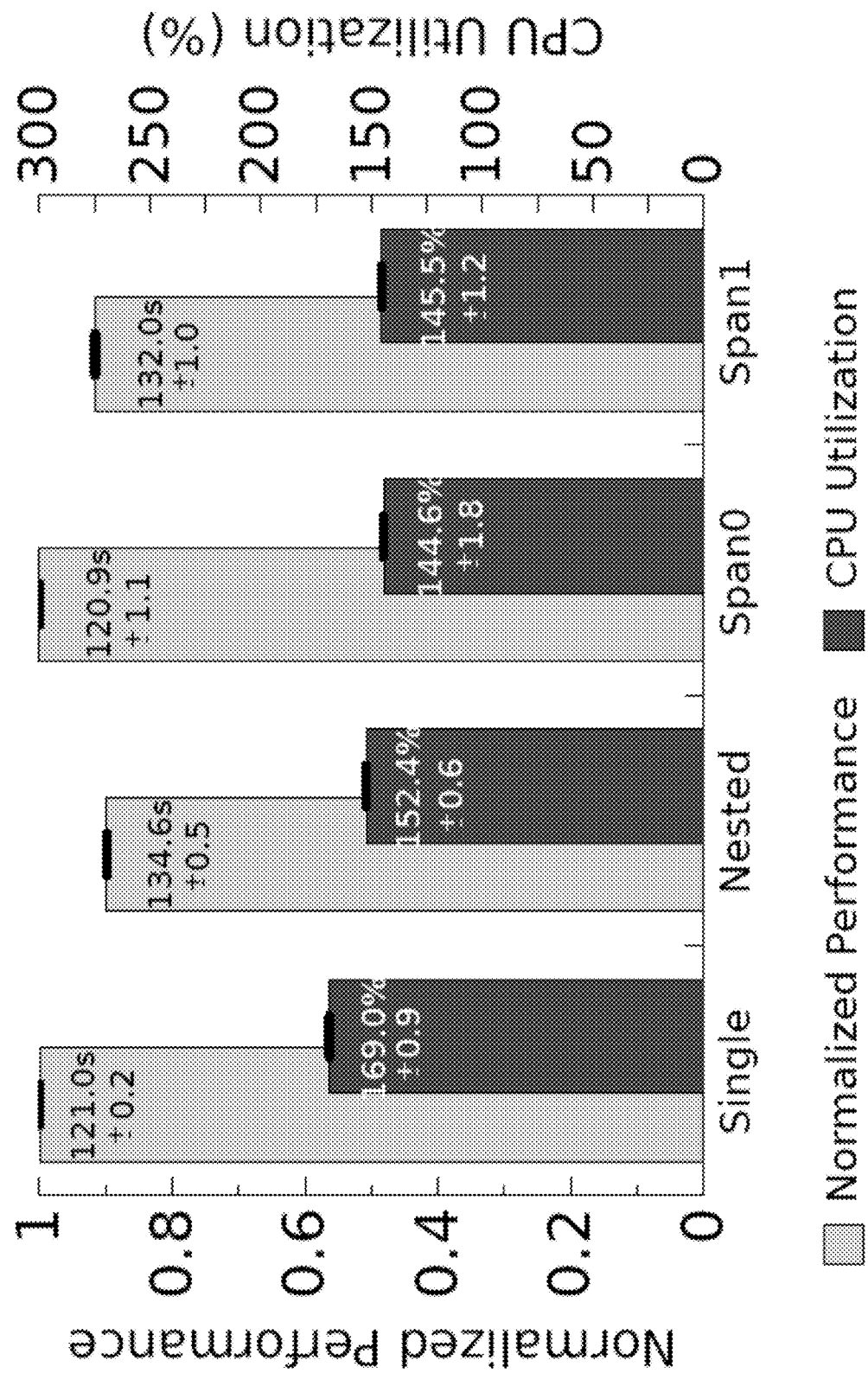
FIGS. 17A-17C show a Service Mode: Normalized performance with hypervisor-level services network monitoring and Volatility. For single-level, L0 runs both services. For nested, L1 runs both services. For Span0 and Span1, L1a runs network monitoring and controls the guest's network device; L1b runs Volatility; L0 controls guest's block device.
Figure 17B:
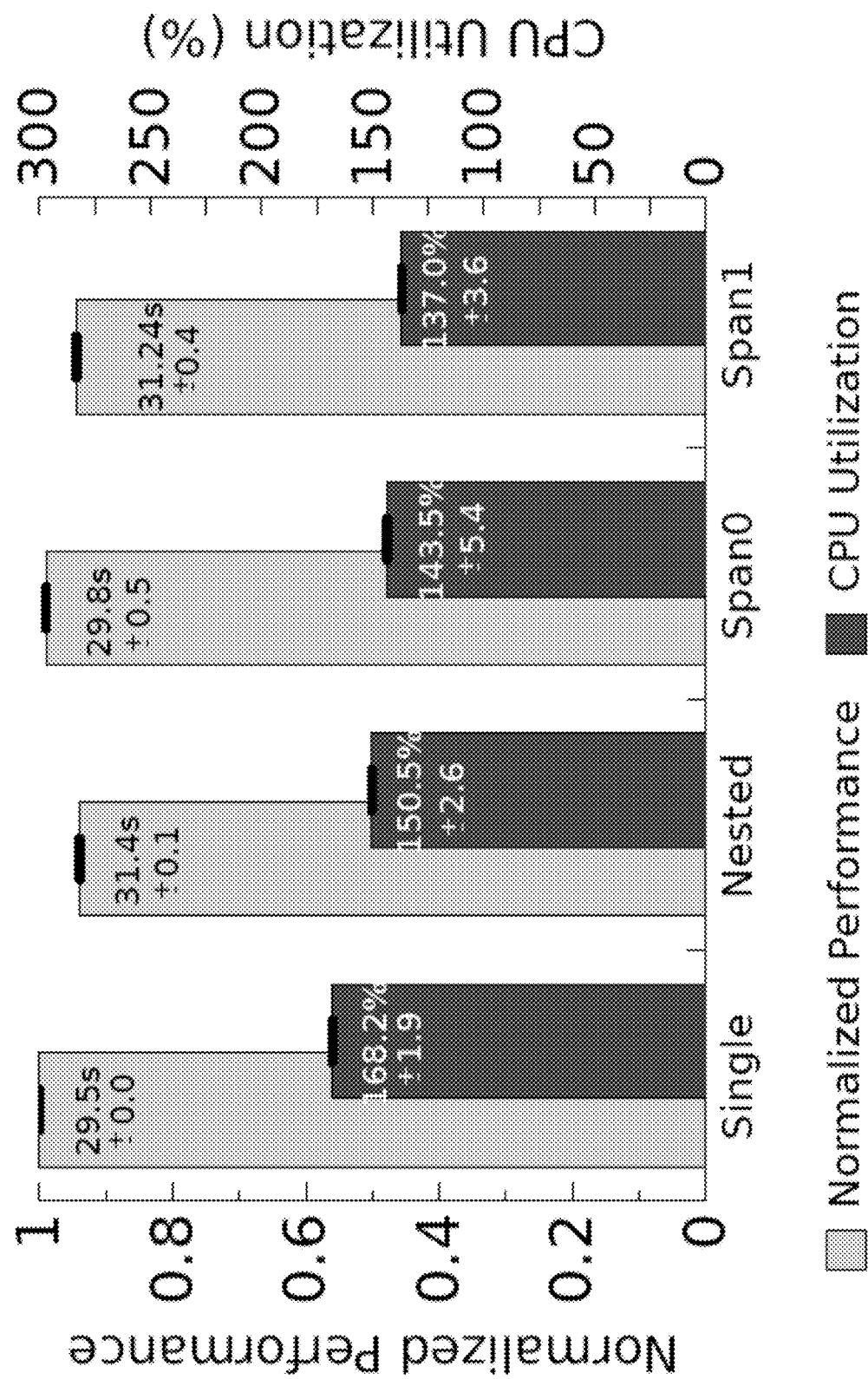
Figure 17C:
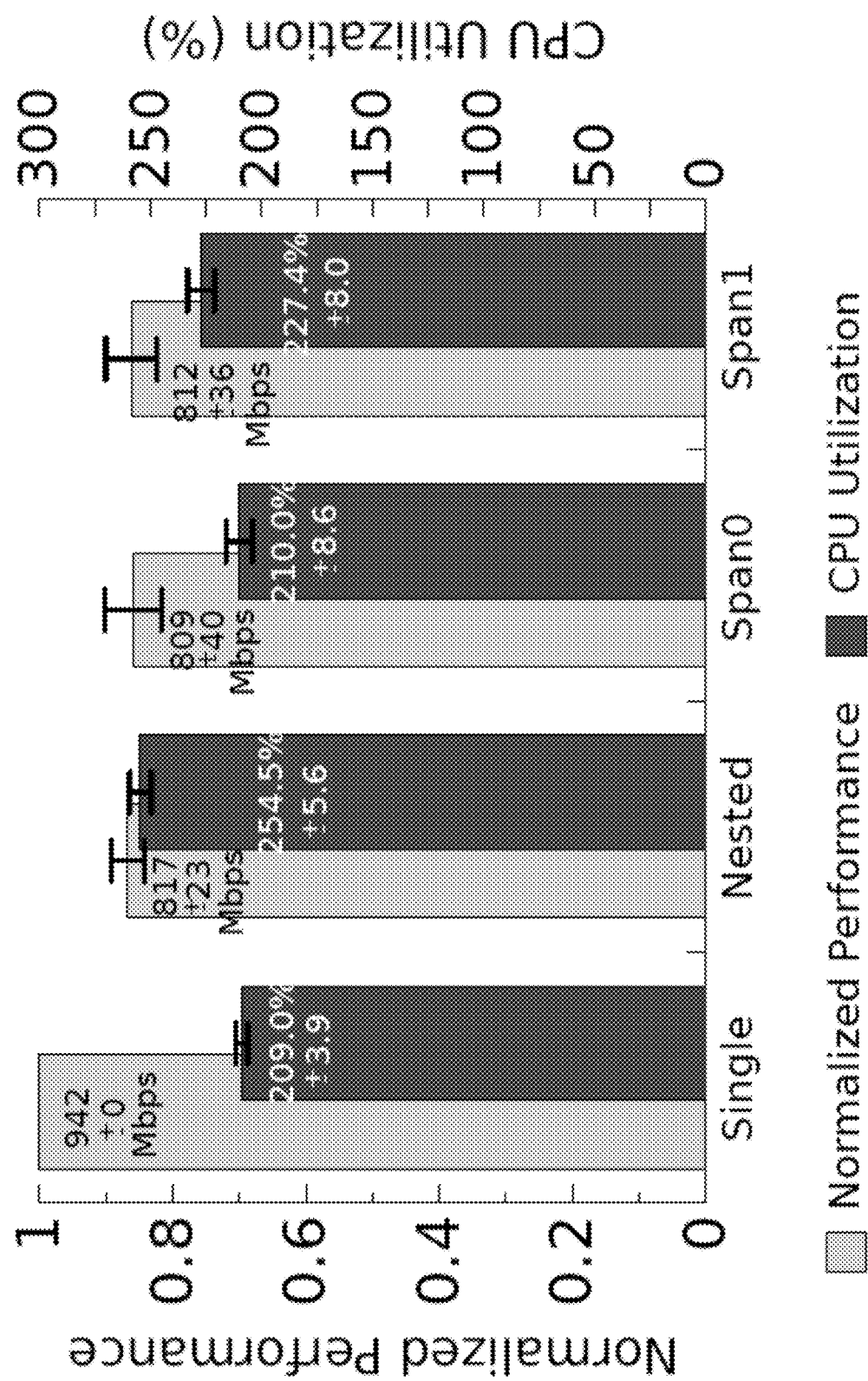

FIG. 16C shows that the average CPU utilization increases significantly for iPerf in No-op mode—from 3.1% for native Host to 100+% for Single and Span0 and 180+% for Nested and Span1. The increase appears to be due to virtio network device implementation in QEMU, since we observed this higher CPU utilization even with newer versions of unmodified QEMU (v2.7) and Linux (v4.4.2). FIGS. 16C and 17C also show higher CPU utilization for Nested and Span1 compared to Single-level, since guest VCPUs are controlled by L1s, thereby making VM exits more expensive.

Micro Benchmarks

Attach Operation

Figure 18:
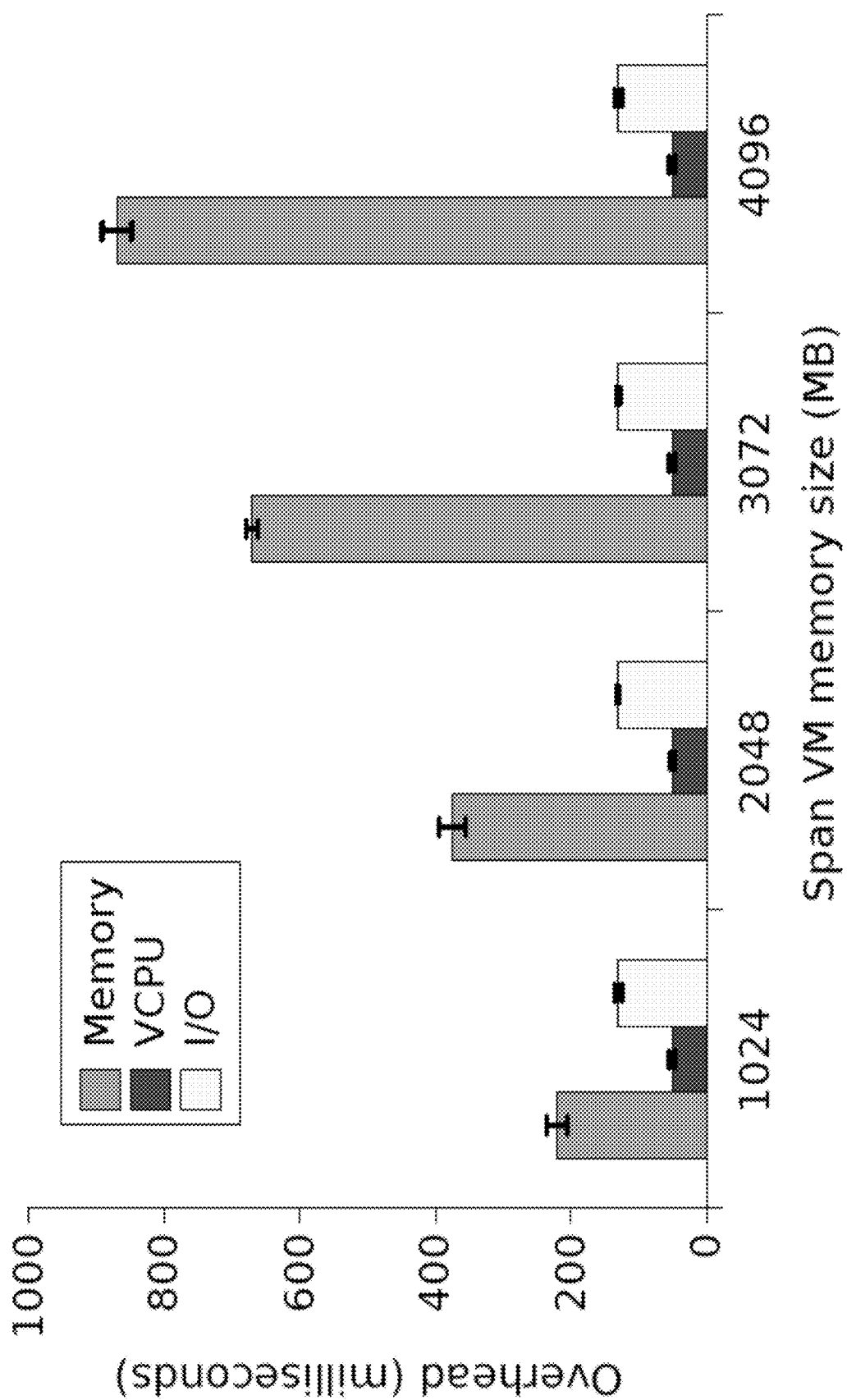
FIG. 18 shows a graph of overhead of attaching an L1 to a guest.

FIG. 18 shows the time taken to attach an L1 to a guest's memory, VCPU, and I/O devices as the guest memory size is increased. The time taken to attach memory of a 1 GB Span guest is about 220 ms. Memory attach overhead increases with guest size because each page that L1 has allocated for Span needs to be remapped to the Span physical page in L0.

TABLE 3

Low-level latencies(μs) in Span virtualization.

|  | Single | Nested | Span |
|---|---|---|---|
| EPT Fault | 2.4 | 2.8 | 3.3 |
| Virtual EPT Fault | — | 23.3 | 24.1 |
| Shadow EPT Fault | — | 3.7 | 4.1 |
| Message Channel | — | — | 53 |
| Memory Event Notify | — | — | 103.5 |

Attaching VCPUs to one of the L1s takes about 50 ms. Attaching virtual I/O devices takes 135 ms. When I/O control has to be transferred between hypervisors, the VCPUs have to be paused. The VCPUs could be running on any of the L1 s and hence L0 has to coordinate pausing and resuming the VCPUs during the transfer. Detach for VCPUs and I/O devices have similar overheads.

Page Fault Servicing

Table 3 shows the latency of page fault handling and message channel. The average servicing times for EPT fault in Span VM were measured at both levels of nesting. It takes on the average 3.3 μs to resolve a fault caused against EPTL1 and on the average 24.1 μs to resolve a fault against Virtual EPT. In contrast, the corresponding values measured for the nested case are 2.8 μs and 23.3 μs. For the single-level case, EPTfault processing takes 2.4 μs. The difference is due to the extra synchronization work in the EPT-fault handler in L0 which ensures that a Span VM's faulting guest physical address maps to the same host physical address, irrespective of whether it is accessed through L0, L1a, or L1b.

Message Channel and Memory Events

The message channel is used by Span virtualization to exchange events and requests between L0 and L1s. It takes on the average 53 μs to send a message between L0 and L1. The overhead of notifying L1 subscribers from L0 for write events on a guest page was measured. Without any subscribers, the default write-fault processing takes on the average 3.5 μs in L0. Notifying the write event over the message channel from L0 to an L1 subscriber adds around 100 μs, including a response from L1.

Distributing Guest VCPUs

As an optional feature, the ability to distribute multiple guest VCPUs to different L1s was implemented. A possible use case of this feature could be to perform customized CPU scheduling (e.g. real-time scheduling) on a subset of guest VCPUs on one L1 and to use a commodity scheduler (e.g. Linux CFS) on the remaining VCPUs on another hypervisor.

Figure 19A:
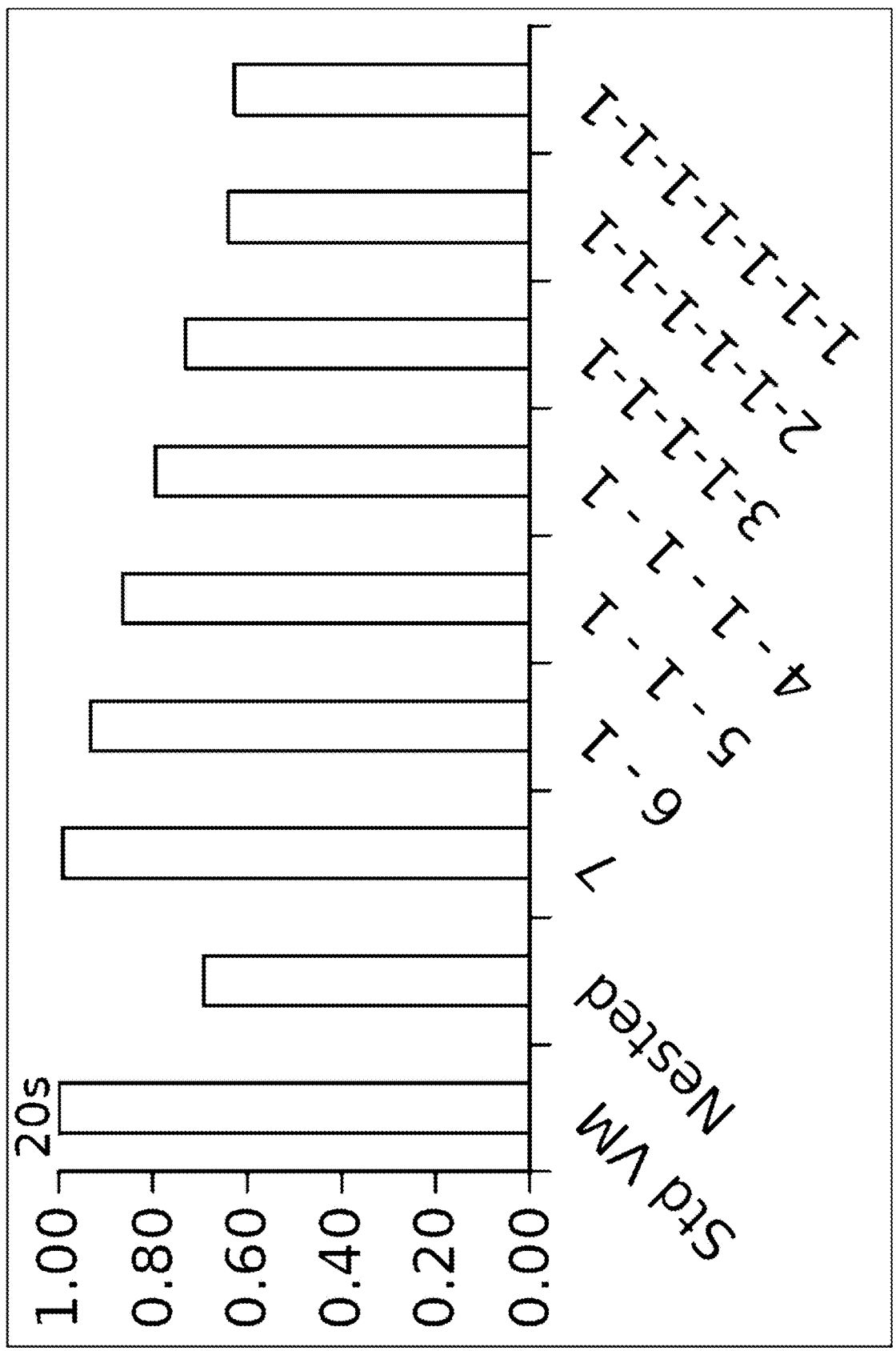
FIGS. 19A-19C show graphs of normalized performance comparison of Span VM with increasing number of L1s against single-level and nested guests, for 20s (19A), 31.1s (19B), and 941 Mbps. Guest has 7 VCPUs in all configurations. VCPU distribution for Span VM varies from L0 controlling all VCPUs (configuration labeled 7) to the L0 and the six L1s controlling 1 VCPU
Figure 19B:
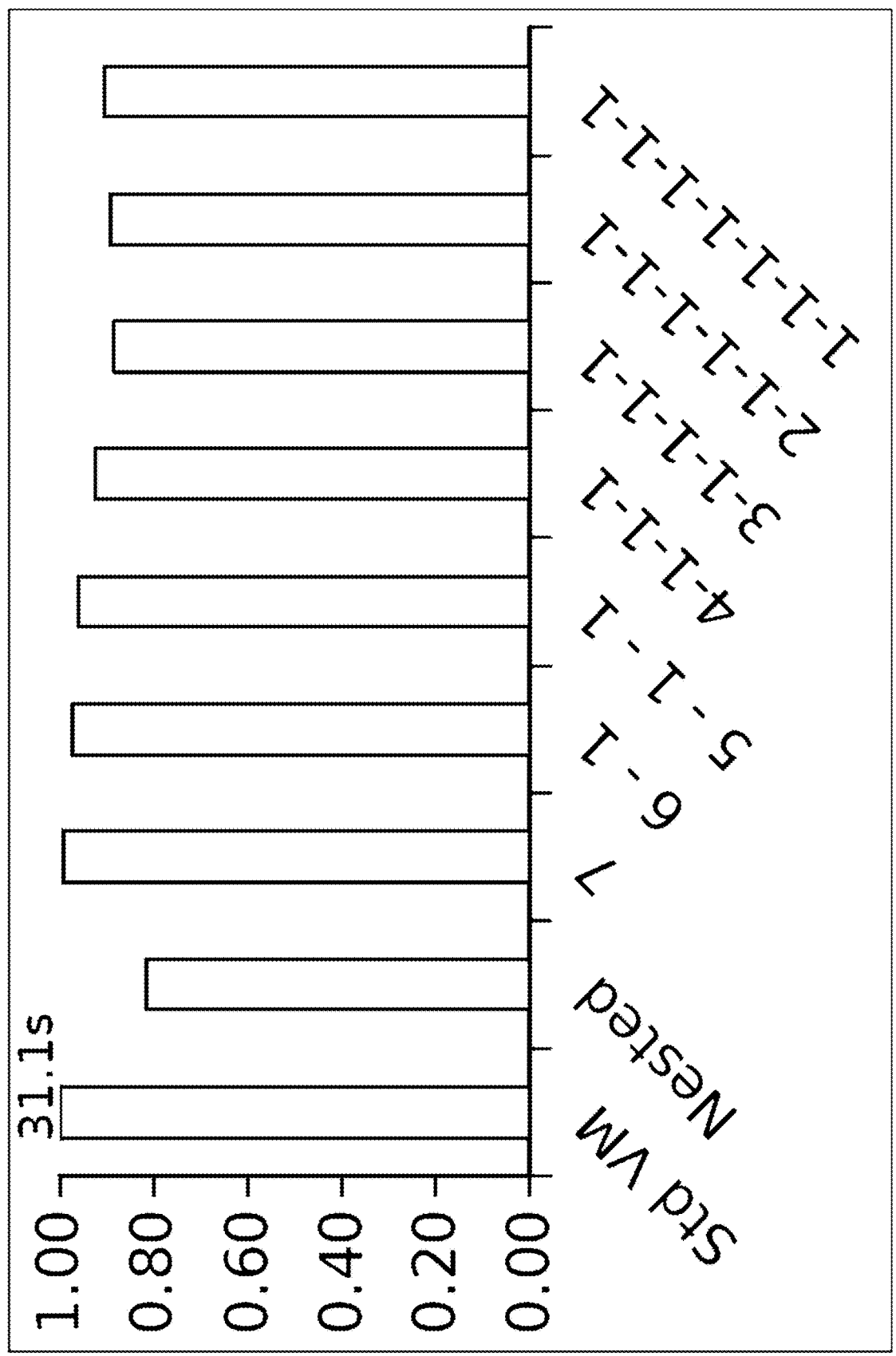
Figure 19C:
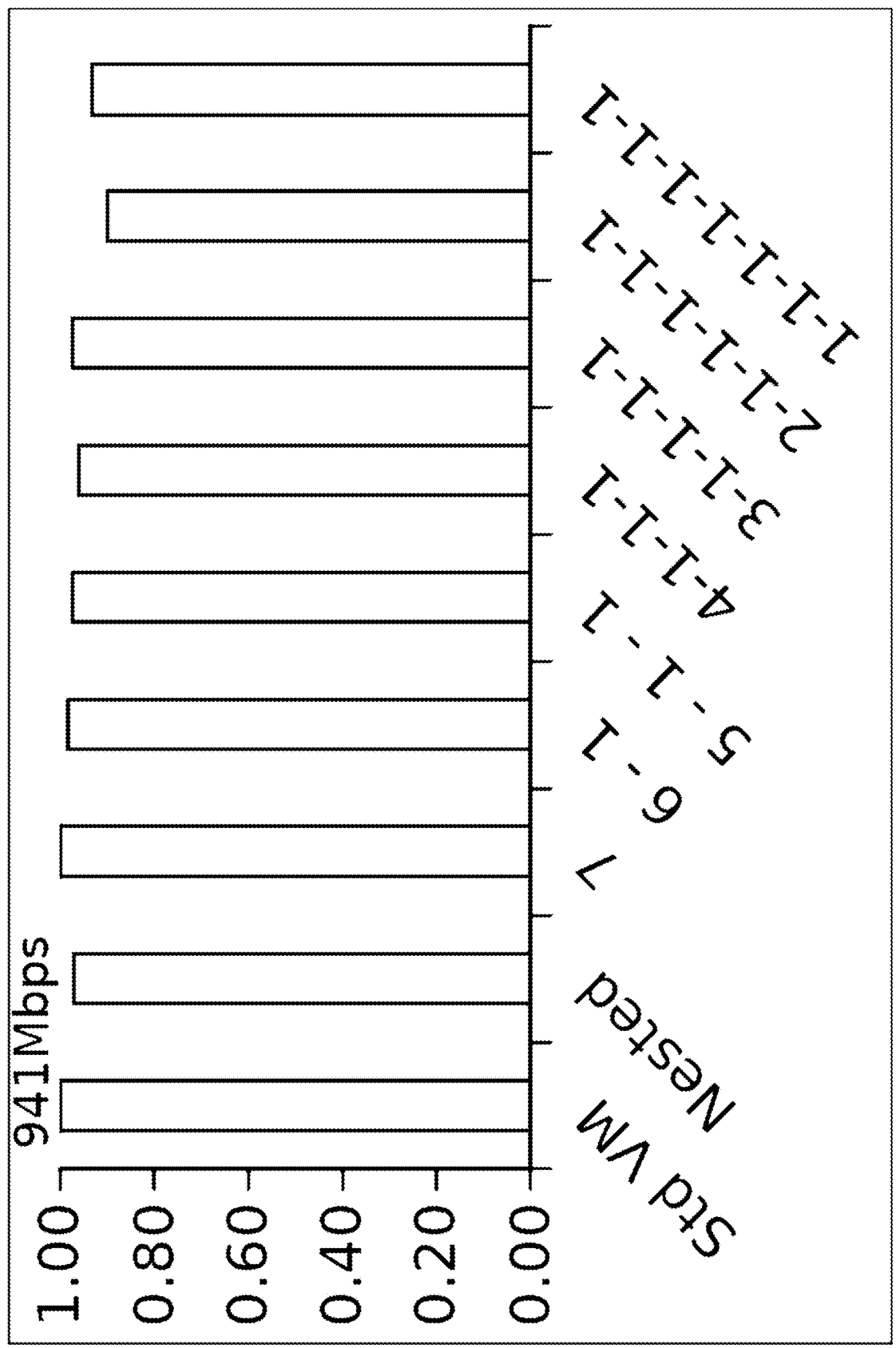

This feature is demonstrated by increasing the number of L1s attached to a guest, with each L1 controlling one guest VCPU. FIGS. 19A-19C compare performance of single-level, nested and Span VMs with varying number of L1s controlling one VCPU each for Kernbench, Quicksort, and iPerf. Kernbench suffers greater performance degradation as number of L1s increase because the kernel compilation threads are not pinned to a specific VCPU. As the threads float among VCPUs they trigger TLB shootdown IPIs (Inter Processor Interrupts). The prototype uses message channels to redirect IPIs between guest VCPUs controlled by different L1s. This redirection cost increases as more VCPUs are distributed across hypervisors. Quicksort threads are pinned to one VCPU each reducing the number of IPIs, so the increase in L1s has smaller effect compared to Kernbench. iPerf performance decreases only slightly with more L1s. It should be noted that attaching more L1 to guest memory without further distributing VCPUs does not further impact the performance. Thus frequent redirection of IPIs via the message channel is a major source of performance overhead as more guest VCPUs are distributed across L1s. Further optimizing the Message Channel based delivery should alleviate some of these costs.

Span virtualization is compared against three alternatives to the feature-filled (single-level) hypervisor for providing hypervisor-level services, namely, userspace extensions, service VMs, and nested virtualization (vertical stacking).

Userspace Extensions

This alternative refers to implementing guest services in processes that run in the hypervisor's userspace. Microkernels and library operating systems have a long history of providing traditional OS services in user space. μDenali allows programmers to use event interposition to extend the hypervisor with new user-level services such as disk and network I/O. In the KVM/QEMU platform, each guest is associated with a dedicated userspace management process, namely QEMU. A single QEMU process bundles multiple services for its guest such as VM launch/exit/pause, para-virtual I/O, migration, and checkpointing. One can associate different variants of QEMU with different guests, allowing some degree of service customization. While userspace extensions can map guest memory, they lack direct control over lowlevel guest resources such as EPT mappings and VCPU scheduling, unlike L1s in Nested and Span virtualization. Further, while userspace extensions run in a less privileged mode (Root mode, Ring 3 in x86/VTx) than the hypervisor (Root mode, Ring 0), their interface with the hypervisor can be large. For instance, QEMU's interface with KVM hypervisor consists of system calls, signals, and shared buffers with kernels. which increases the hypervisor's exposure to untrusted services.

Service VMs

Another option is to provide guest services via specialized Service VMs that run alongside the guest. For instance, Xen platform runs a trusted service VM called Dom0 which runs para-virtualized Linux, controls all guests via hypercalls to the Xen hypervisor, and provides guests with services related to lifecycle management and I/O. To avoid a single point of failure or vulnerability, Xoar project proposed decomposing Dom0 into smaller service domains, one per service, that can be replaced or restarted. Possible support for third-party service domains has been discussed, but its status is unclear. Nova minimizes the size of hypervisor by implementing VMM, device drivers, and special-purpose applications in user space. Self-service clouds [13] allows users to customize control over services used by their VMs on untrusted clouds. Services, such as storage and security, can be customized by privileged service domains, whereas the hypervisor controls all low-level guest resources, such as VCPUs and EPT mappings.

Span virtualization is more general than Service VMs in allowing L1s to share control over guest at a lowerlevel resource abstraction. Span L1s can be tailored in spectrum from full hypervisors that control all guest resources to narrow ones that exercise partial control. The tradeoff is that Span's generality of guest control comes with the implementation complexity and overhead of nested virtualization in L0. When some guest I/O devices or VCPUs are controlled directly by L0, Span avoids nesting overhead for those resources.

Nested Virtualization

Nested virtualization was originally proposed and refined in 1970s and has experienced renewed interest in recent years. Recent support, such as VMCS Shadowing and direct device assignment aim to reduce nesting overheads related to VM exits and I/O. Nesting enables vertical stacking of two layers of hypervisor-level services. Third parties such as Ravello, CloudBridge, and XenBlanket leverage nesting to offer hypervisor-level services (in L1) over public cloud platforms (L0) such as EC2 and Azure, often pitching their service as a way to avoid lock-in with a cloud provider. However, this model also leads to a different level of lock-in, where a guest is unable use services from more than one third party. Further, these third-party services are not fully trusted by the base hypervisor (L0) of the cloud provider, necessitating the use of nesting, rather than userspace extensions, in the first place. Span virtualization prevents guest lock-in at all levels by adding L0 support for multiple third-party L1s to concurrently service a common guest, while maintaining the isolation afforded by nesting.

Ephemeral virtualization was proposed, which leverage nesting and optimized live migration to enable transient control over guest by L1s. Specifically, a guest can be switched back-and-forth rapidly between a base hyperplexor (L0) and a featurevisor (L1) by co-mapping guest memory. Ephemeral virtualization allows only one L1 at a time to exercise full control over the guest. In contrast, Span allows multiple L1s to exercise simultaneous and partial control over a guest, in either continuous or transient modes.

Implementation

Exemplary hardware for performing the technology includes at least one automated processor (or microprocessor) coupled to a memory. The memory may include random access memory (RAM) devices, cache memories, non-volatile or back-up memories such as programmable or flash memories, read-only memories (ROM), etc. In addition, the memory may be considered to include memory storage physically located elsewhere in the hardware, e.g. any cache memory in the processor as well as any storage capacity used as a virtual memory, e.g., as stored on a mass storage device.

The hardware may receive a number of inputs and outputs for communicating information externally. For interface with a user or operator, the hardware may include one or more user input devices (e.g., a keyboard, a mouse, imaging device, scanner, microphone) and a one or more output devices (e.g., a Liquid Crystal Display (LCD) panel, a sound playback device (speaker)). To embody the present invention, the hardware may include at least one screen device. Hardware executing in a data center may lack a traditional user interface, or provide communications using a virtual terminal device.

For additional storage, as well as data input and output, and user and machine interfaces, the hardware may also include one or more mass storage devices, e.g., a hard disk drive, hard drive array, cluster storage, a Direct Access Storage Device (DASD), an optical drive (e.g. a Compact Disk (CD) drive, a Digital Versatile Disk (DVD) drive) and/or a tape drive, among others. Furthermore, the hardware may include an interface with one or more networks (e.g., a local area network (LAN), a wide area network (WAN), a wireless network, and/or the Internet among others) to permit the communication of information with other computers coupled to the networks. It should be appreciated that the hardware typically includes suitable analog and/or digital interfaces between the processor and each of the components is known in the art.

The hardware operates under the control of an operating system, and executes various computer software applications, components, programs, objects, modules, etc. to implement the techniques described above. Moreover, various applications, components, programs, objects, etc., collectively indicated by application software, may also execute on one or more processors in another computer coupled to the hardware via a network, e.g. in a distributed computing environment, whereby the processing required to implement the functions of a computer program may be allocated to multiple computers over a network.

In general, the routines executed to implement the embodiments of the present disclosure may be implemented as part of an operating system, hypervisor, virtual machine implementation, etc., or a specific application, component, program, object, module or sequence of instructions referred to as a "computer program." A computer program typically comprises one or more instruction sets at various times in various memory and storage devices in a computer, and that, when read and executed by one or more processors in a computer, cause the computer to perform operations necessary to execute elements involving the various aspects of the invention. Moreover, while the technology has been described in the context of fully functioning computers and computer systems, those skilled in the art will appreciate that the various embodiments of the invention are capable of being distributed as a program product in a variety of forms, and may be applied equally to actually effect the distribution regardless of the particular type of computer-readable media used. Examples of computer-readable media include but are not limited to recordable type media such as volatile and non-volatile memory devices, removable disks, hard disk drives, optical disks (e.g., Compact Disk Read-Only Memory (CD-ROMs), Digital Versatile Disks (DVDs)), flash memory, etc., among others. Another type of distribution may be implemented as Internet downloads. The technology may be provided as ROM, persistently stored firmware, or hard-coded instructions. Typically, instructions are stored in a non-transitory form in a physical medium.

While certain exemplary embodiments have been described and shown in the accompanying drawings, it is understood that such embodiments are merely illustrative and not restrictive of the broad invention and that the present disclosure is not limited to the specific constructions and arrangements shown and described, since various other modifications may occur to those ordinarily skilled in the art upon studying this disclosure. The disclosed embodiments may be readily modified or re-arranged in one or more of its details without departing from the principals of the present disclosure.

Implementations of the subject matter and the operations described herein can be implemented in digital electronic circuitry, computer software, firmware or hardware, including the structures disclosed in this specification and their structural equivalents or in combinations of one or more of them. Implementations of the subject matter described in this specification can be implemented as one or more computer programs, i.e., one or more modules of computer program instructions, encoded on one or more computer storage medium for execution by, or to control the operation of data processing apparatus. Alternatively, or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Accordingly, the computer storage medium may be tangible and non-transitory. All embodiments within the scope of the claims should be interpreted as being tangible and non-abstract in nature, and therefore this application expressly disclaims any interpretation that might encompass abstract subject matter.

The present technology provides analysis that improves the functioning of the machine in which it is installed, and provides distinct results from machines that employ different algorithms.

The operations described in this specification can be implemented as operations performed by a data processing apparatus on data stored on one or more computer-readable storage devices or received from other sources.

The term "client or "server" includes a variety of apparatuses, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, a code that creates an execution environment for the computer program in question, e.g., a code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The architecture may be CISC, RISC, SISD, SIMD, MIMD, loosely-coupled parallel processing, etc. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone (e.g., a smartphone), a personal digital assistant (PDA), a mobile audio or video player, a game console, or a portable storage device (e.g., a universal serial bus (USB) flash drive). Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a LCD (liquid crystal display), OLED (organic light emitting diode), TFT (thin-film transistor), plasma, other flexible configuration, or any other monitor for displaying information to the user and a keyboard, a pointing device, e.g., a mouse, trackball, etc., or a touch screen, touch pad, etc., by which the user can provide input to the computer. Other kinds of devices can be used to provide for interaction with a user as well. For example, feedback provided to the user can be any form of sensory feedback, e.g., visual feedback, auditory feedback, or tactile feedback and input from the user can be received in any form, including acoustic, speech, or tactile input. In addition, a computer can interact with a user by sending documents to and receiving documents from a device that is used by the user. For example, by sending webpages to a web browser on a user's client device in response to requests received from the web browser. In general, real-time user interaction with respect to the technology is not required.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are considered in a particular order, this should not be understood as requiring that such operations be performed in the particular order shown, in sequential order or that all operations be performed to achieve desirable results. In certain circumstances, multitasking and parallel processing may be advantageous. Moreover, the separation of various system components in the implementations described above should not be understood as requiring such separation in all implementations and it should be understood that the described program components and systems can generally be integrated together in a single software product or packaged into multiple software products.

The processes depicted in the accompanying figures do not necessarily require the particular order shown, or sequential order, to achieve desirable results. In certain implementations, multitasking or parallel processing may be utilized.

The invention may be embodied in other specific forms without departing from the spirit or essential characteristics thereof. The present embodiments are, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

The term "comprising", as used herein, shall be interpreted as including, but not limited to inclusion of other elements not inconsistent with the structures and/or functions of the other elements recited.

What is claimed is:
1. A multi-hypervisor system, comprising:
a plurality of hypervisors comprising a first transient hypervisor and a second hypervisor; and
at least one Span VM, concurrently executing on each of the first transient hypervisor and the second hypervisor, the first transient hypervisor being adapted to be dynamically at least one of injected and removed under the at least one Span VM concurrently with execution of the at least one Span VM on the second hypervisor, wherein the at least one Span VM has a single and consistent at least one of memory space, virtual CPU state, and set of input/output resources, shared by the first transient hypervisor and the second hypervisor.

2. The multi-hypervisor system according to claim 1, wherein the first transient hypervisor and the second hypervisor have respectively different sets of execution privileges.

3. The multi-hypervisor system according to claim 1, wherein existence of the first transient hypervisor and the second hypervisor is transparent to an application or operating system executing on the at least one Span VM.

4. The multi-hypervisor system according to claim 1, wherein the at least one Span VM comprises a plurality of Span VMs, concurrently executing on each of the first transient hypervisor and the second hypervisor.

5. The multi-hypervisor system according to claim 1, wherein the first transient hypervisor and the second hypervisor provide different services to the at least one Span VM.

6. The multi-hypervisor system according to claim 1, wherein the first transient hypervisor executes hierarchically under the second hypervisor.

7. The multi-hypervisor system according to claim 1, wherein at least one of memory space, virtual CPU state, virtual CPU scheduling, and set of input/output resources for the at least one Span VM is managed by the first transient hypervisor and the second hypervisor.

8. The multi-hypervisor system according to claim 1, wherein the first transient hypervisor relays input/output requests on behalf of the at least one Span VM to the second hypervisor, which controls an input/output resource dependent thereon.

9. The multi-hypervisor system according to claim 1, wherein the second hypervisor relays interrupts to the at least one Span VM on behalf of the first transient hypervisor.

10. The multi-hypervisor system according to claim 1, wherein each of the plurality hypervisors have a consistent view of the at least one Span VM's memory throughout execution.

11. The multi-hypervisor system according to claim 1, wherein at least two of the plurality of hypervisors distribute responsibility for at least one of scheduling a virtual CPU and controlling input/output devices employed by the at least one Span VM.

12. The multi-hypervisor system according to claim 1, wherein the at least one Span VM comprises a plurality of SpanVMs.

13. The multi-hypervisor system according to claim 1, wherein the second hypervisor comprises a second transient hypervisor, and the at least one Span VM is configured to execute on the first transient hypervisor and the second transient hypervisor, wherein the multi-hypervisor system is configured to remove the first transient hypervisor on which the at least one Span VM executes and inject the second transient hypervisor on which the at least one Span VM executes, thus permitting a transition of execution of the at least one Span VM substantially without interruption from the first transient hypervisor to the second transient hypervisor on a single multi-hypervisor system.

14. A method of operating a virtualized execution environment, comprising:
providing a plurality of hypervisors, comprising at least one transient hypervisor;
dynamically injecting at least one of the at least one transient hypervisor under a Span VM during execution of the Span VM;
concurrently executing portions of the Span VM, on at least a portion of the plurality of hypervisors comprising the at least one transient hypervisor, wherein the Span VM has a consistent at least one of virtual memory, virtual CPU state, and input/output communication stream, coordinated by the plurality of hypervisors;
dynamically removing at least one of the at least one transient hypervisor from under the Span VM during execution of the Span VM on the plurality of hypervisors.

15. The method according to claim 14, wherein the Span VM comprises a plurality of Span VMs, concurrently executing on each of the plurality of hypervisors, wherein at least two of the plurality of hypervisors offer different services to the Span VM.

16. The method according to claim 14, wherein the plurality of hypervisors comprise a first hypervisor and a second hypervisor, and the first hypervisor executes under the second hypervisor.

17. The method according to claim 14, wherein the Span VM has a single and consistent memory space shared by the plurality of hypervisors.

18. The method according to claim 14, wherein the Span VM has consistent states of virtual CPUs shared by the plurality of hypervisors.

19. The method according to claim 14, wherein the plurality of hypervisors comprises a plurality of transient hypervisors, and the Span VM executes on the plurality transient hypervisors, the method further comprising removing a first transient hypervisor on which the Span VM executes and injecting a second transient hypervisor on which the Span VM executes, thus permitting a transition of execution of the Span VM substantially without interruption from the first transient hypervisor to the second hypervisor on a single multi-hypervisor system.

20. A computer readable memory, storing thereon non-transitory instructions for operating a virtualized execution environment, comprising instructions for:
- defining a plurality of hypervisors, comprising at least one transient hypervisor; and
- concurrently executing portions of at least one Span VM, on at least a portion of the plurality of hypervisors, wherein the at least one Span VM has a single and consistent at least one of virtual memory, virtual CPU state, and input/output communication stream, coordinated by the plurality of hypervisors;
- dynamically injecting the at least one transient hypervisor under the at least one Span VM concurrently with at least one of execution and control of the at least one Span VM on another hypervisor; and
- dynamically removing the at least one transient hypervisor from under the at least one Span VM concurrently with execution of the at least one Span VM on another hypervisor.

* * * * *